( 12 ) United States Patent
Lee et al.

(10) Patent No.: US 10,365,879 B2
(45) Date of Patent: Jul. 30, 2019

(54) IMAGE OUTPUT DEVICE, MOBILE TERMINAL, AND METHOD FOR CONTROLLING A PLURALITY OF IMAGE OUTPUT DEVICES

(71) Applicant: LG ELECTRONICS INC., Seoul (KR)

(72) Inventors: Jihye Lee, Seoul (KR); Jinyeong Byeon, Seoul (KR); Seonghwan Kim, Seoul (KR); Youngsoo Park, Seoul (KR); Jieun Jung, Seoul (KR); Aryun Kim, Seoul (KR); Bongsu Lee, Seoul (KR); Chala Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/522,750

(22) PCT Filed: Mar. 3, 2015

(86) PCT No.: PCT/KR2015/002055
§ 371 (c)(1),
(2) Date: Apr. 27, 2017

(87) PCT Pub. No.: WO2016/072565
PCT Pub. Date: May 12, 2016

(65) Prior Publication Data
US 2017/0315772 A1    Nov. 2, 2017

(30) Foreign Application Priority Data

Nov. 5, 2014   (KR) .................. 10-2014-0153031
Dec. 3, 2014   (KR) .................. 10-2014-0172365

(51) Int. Cl.
*G06F 3/14*       (2006.01)
*H04N 21/434*     (2011.01)
(Continued)

(52) U.S. Cl.
CPC ....... *G06F 3/1446* (2013.01); *G06K 9/00664* (2013.01); *G06T 7/0002* (2013.01);
(Continued)

(58) Field of Classification Search
CPC ..................................................... G06F 3/1446
See application file for complete search history.

(56) References Cited

U.S. PATENT DOCUMENTS 8,872,924 B1 * 10/2014 Lin .................. G06F 3/1446
348/181
9,141,329 B1 *  9/2015 Reicher ............. G06F 3/1446
(Continued)

FOREIGN PATENT DOCUMENTS

JP       5093607       12/2012
JP    2013251768       12/2013
(Continued)

OTHER PUBLICATIONS

European Patent Office Application Serial No. 15857942.5, Partial Search Report dated May 9, 2018, 22 pages.
(Continued)

*Primary Examiner* — Ryan McCulley
(74) *Attorney, Agent, or Firm* — Lee, Hong, Degerman, Kang & Waimey

(57) ABSTRACT

The present invention relates to an image output device having an image quality adjustment function. A method for controlling a mobile terminal so as to control the image quality of a plurality of image output devices according to an embodiment of the present invention comprises the steps of: generating a preview image on the basis of images corresponding to the plurality of image output devices, received through a camera, and extracting image quality information of the plurality of image output devices using the images corresponding to the plurality of image output devices,
(Continued)

included in the preview image; and transmitting the extracted image quality information or image quality correction data corresponding to the image quality information to at least one image output device, the image quality of which is to be adjusted, among the plurality of image output devices.

19 Claims, 27 Drawing Sheets

(51) Int. Cl.

| | | |
|---|---|---|
| *H04N 21/4402* | (2011.01) | |
| *G06T 7/73* | (2017.01) | |
| *G06T 7/90* | (2017.01) | |
| *G06K 9/00* | (2006.01) | |
| *G06T 7/00* | (2017.01) | |
| *G09G 5/02* | (2006.01) | |
| *G09G 5/10* | (2006.01) | |
| *G09G 5/12* | (2006.01) | |
| *H04N 21/41* | (2011.01) | |
| *G06F 16/955* | (2019.01) | |
| *G06F 3/0481* | (2013.01) | |
| *G06F 3/0482* | (2013.01) | |
| *G06F 3/0488* | (2013.01) | |
| *G06K 7/10* | (2006.01) | |
| *H04N 5/232* | (2006.01) | |
| *H04W 88/02* | (2009.01) | |

(52) U.S. Cl.
CPC ............... *G06T 7/74* (2017.01); *G06T 7/90* (2017.01); *G09G 5/02* (2013.01); *G09G 5/10* (2013.01); *G09G 5/12* (2013.01); *H04N 21/4126* (2013.01); *H04N 21/434* (2013.01); *H04N 21/4402* (2013.01); *G06F 3/0482* (2013.01); *G06F 3/0488* (2013.01); *G06F 3/04817* (2013.01); *G06F 16/9554* (2019.01); *G06K 7/1095* (2013.01); *G06T 2207/30168* (2013.01); *G09G 2320/0626* (2013.01); *G09G 2320/0666* (2013.01); *G09G 2354/00* (2013.01); *G09G 2370/06* (2013.01); *H04N 5/23293* (2013.01); *H04N 2201/3269* (2013.01); *H04W 88/02* (2013.01)

(56) References Cited

U.S. PATENT DOCUMENTS

| | | | |
|---|---|---|---|
| 2007/0285342 A1* | 12/2007 | Morikawa | G06F 3/1446 345/1.3 |
| 2011/0069841 A1* | 3/2011 | Angeloff | H03G 3/30 381/17 |
| 2011/0242142 A1 | 10/2011 | Hussain et al. | |
| 2012/0226736 A1* | 9/2012 | Falchuk | G06F 9/5061 709/203 |
| 2012/0280898 A1* | 11/2012 | Lucero | G06F 3/1446 345/156 |
| 2013/0278483 A1* | 10/2013 | Buld | G06F 3/1431 345/2.1 |
| 2014/0009366 A1* | 1/2014 | Chang | G09G 3/2092 345/1.1 |
| 2014/0193037 A1* | 7/2014 | Stitzinger | G09G 5/12 382/103 |
| 2014/0293017 A1* | 10/2014 | Fei | G09F 9/3026 348/51 |
| 2014/0300620 A1 | 10/2014 | Cheng et al. | |
| 2014/0315489 A1* | 10/2014 | Lee | G06F 3/1454 455/41.2 |
| 2014/0316543 A1* | 10/2014 | Sharma | G06F 3/1454 700/94 |
| 2015/0061971 A1* | 3/2015 | Choi | G06F 3/1446 345/2.3 |
| 2016/0155410 A1* | 6/2016 | Nam | G06F 3/1438 715/745 |

FOREIGN PATENT DOCUMENTS

| | | |
|---|---|---|
| KR | 1020110066145 | 6/2011 |
| KR | 101432830 | 8/2014 |
| KR | 101447969 | 10/2014 |
| WO | 2014042100 | 3/2014 |

OTHER PUBLICATIONS

PCT International Application No. PCT/KR2015/002055, International Search Report dated Jul. 7, 2015, 2 pages.

* cited by examiner

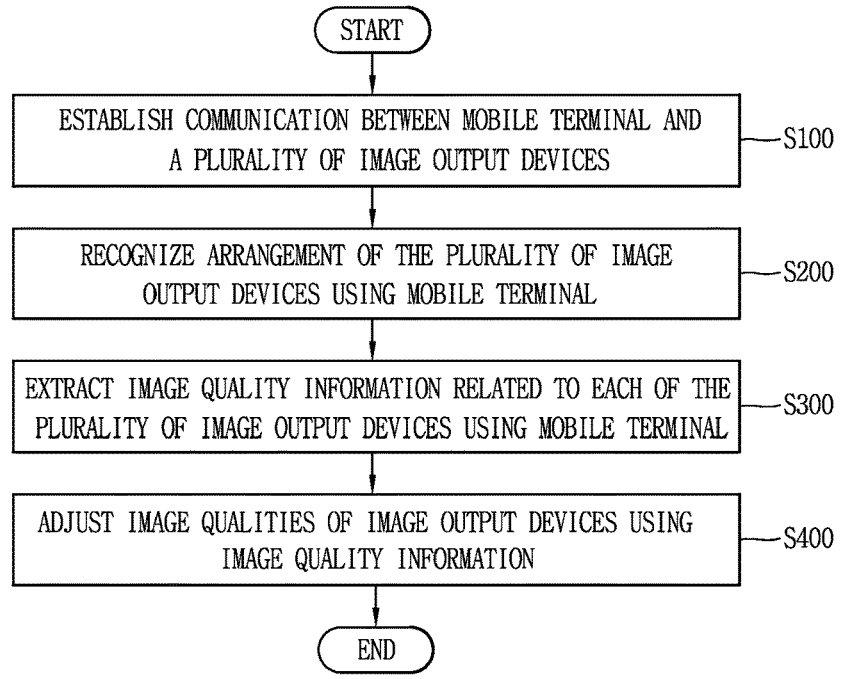
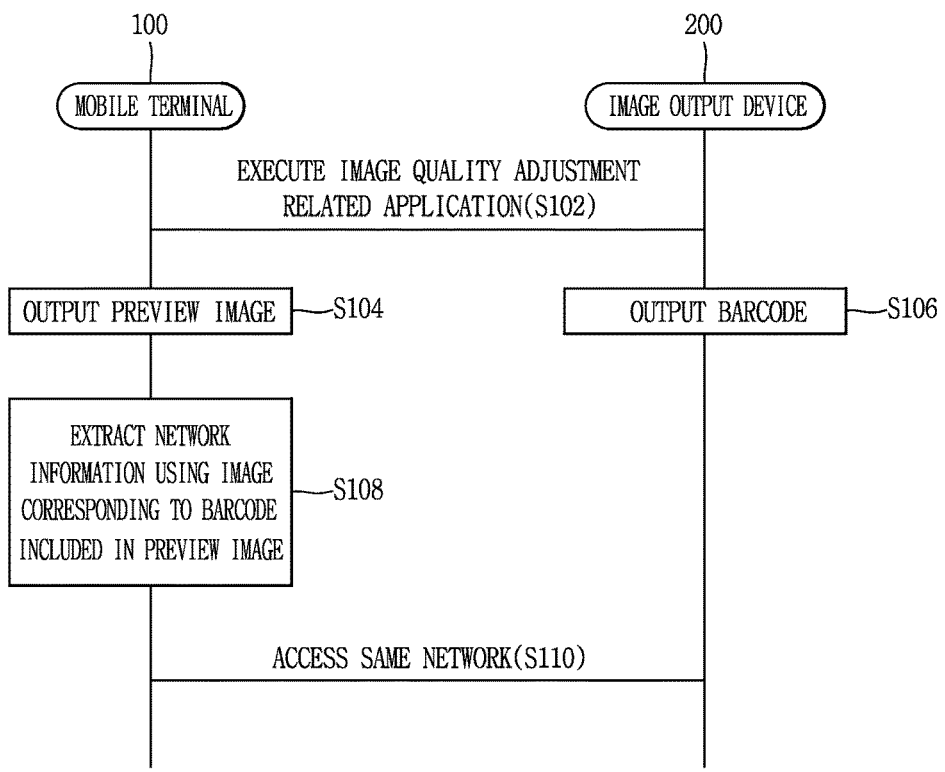

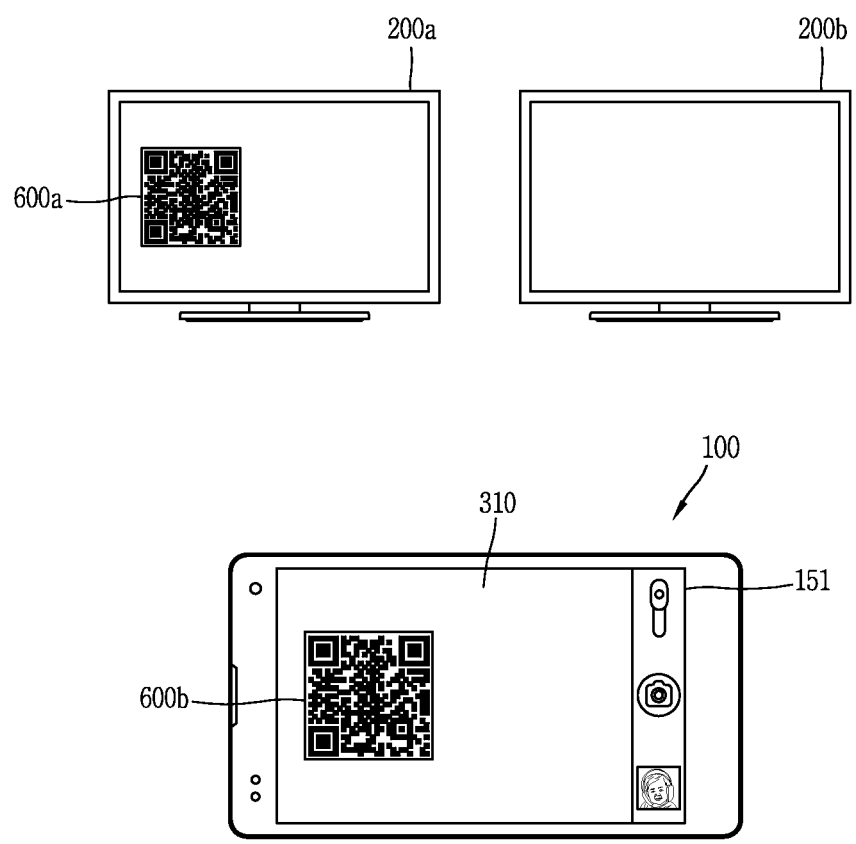

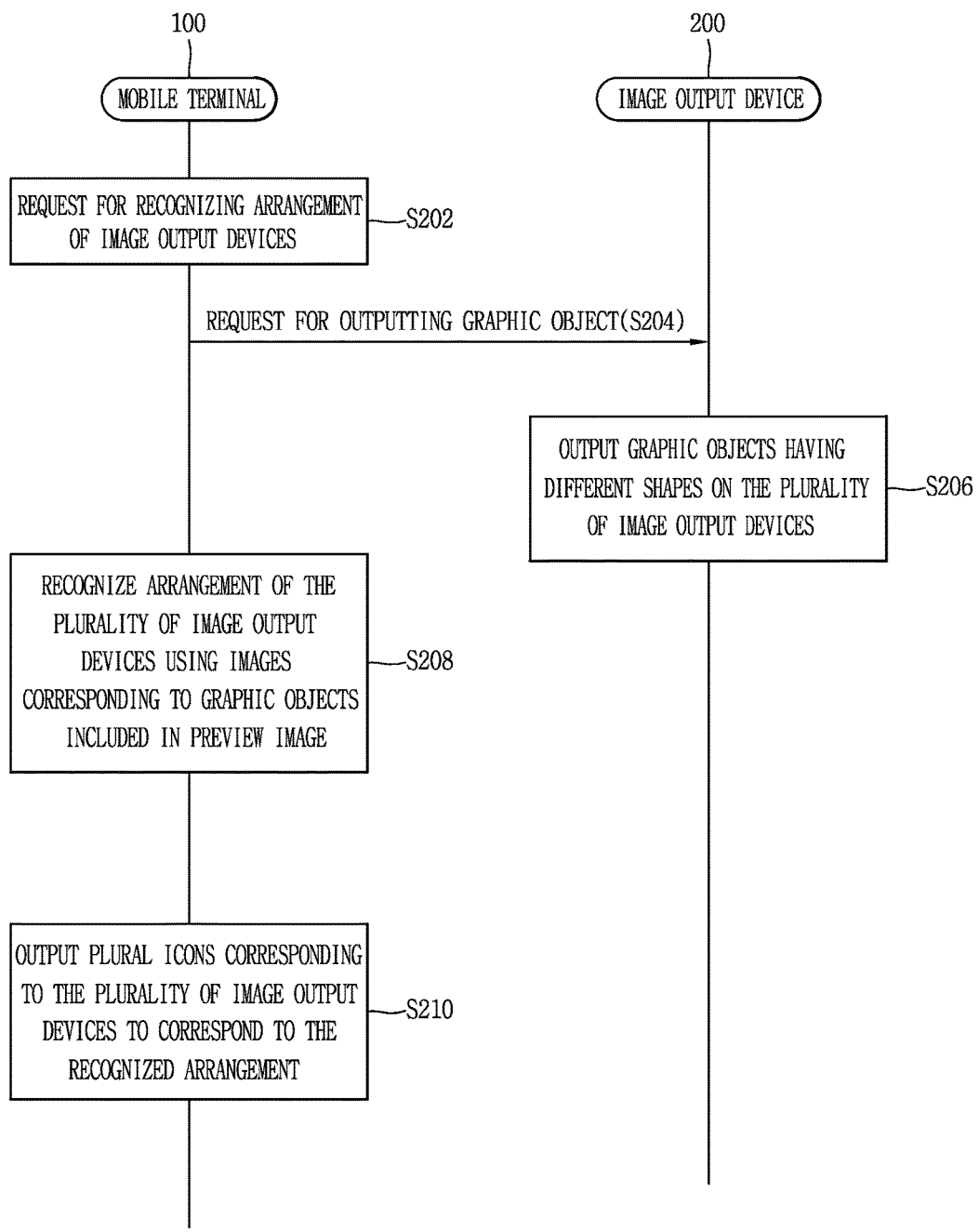

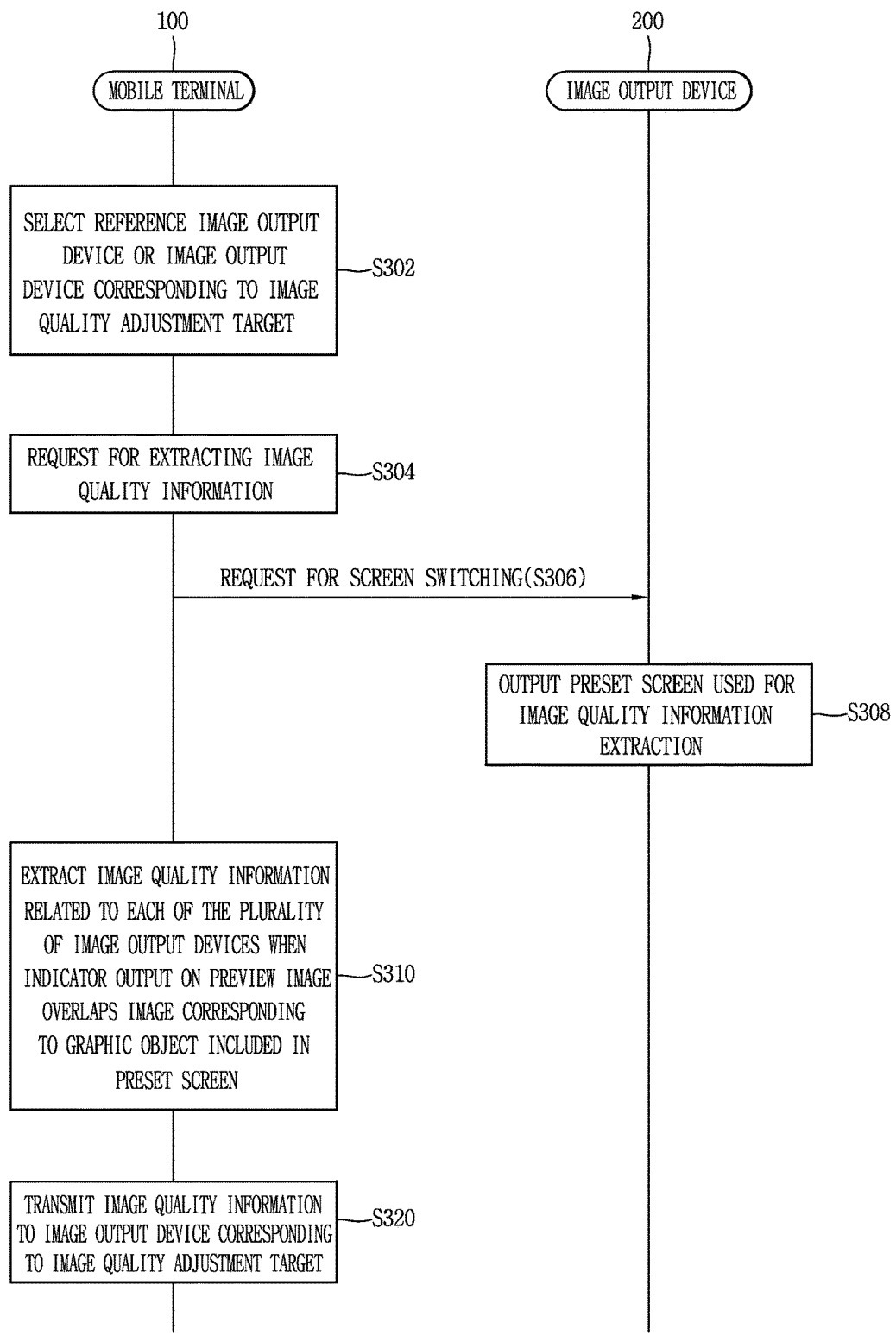

FIG. 13A
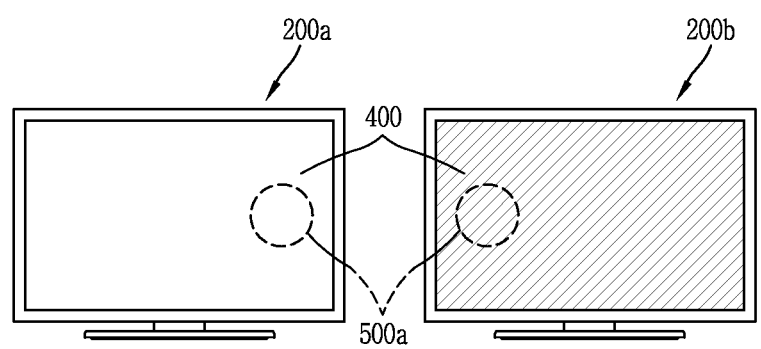
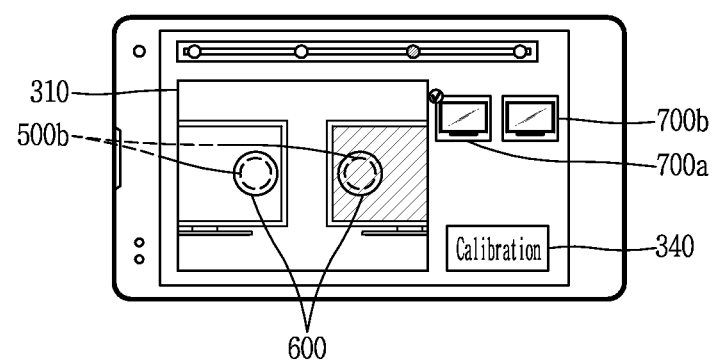

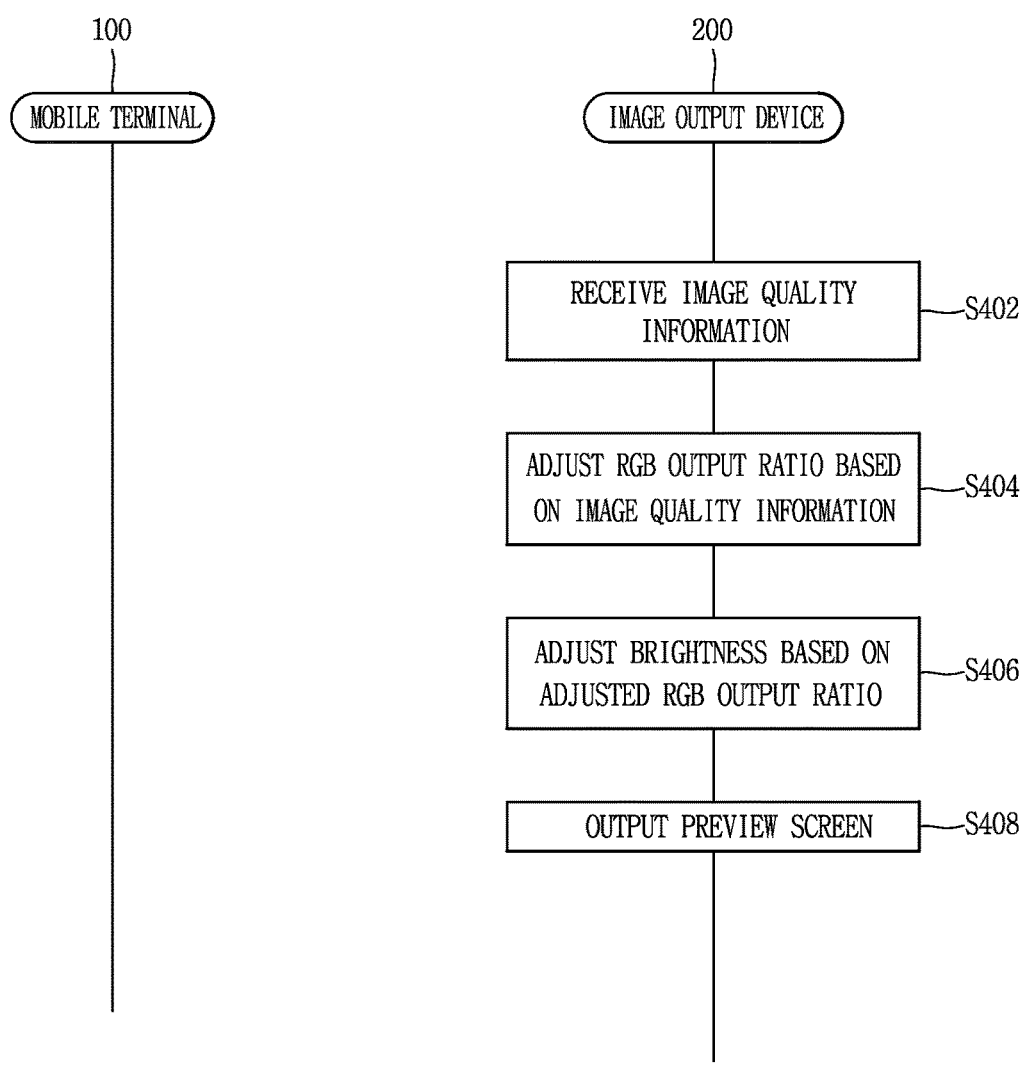

FIG. 17A
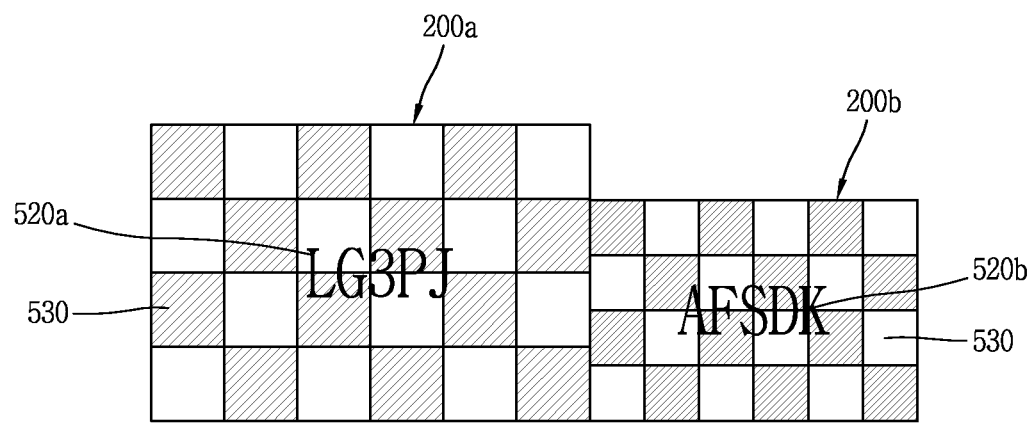
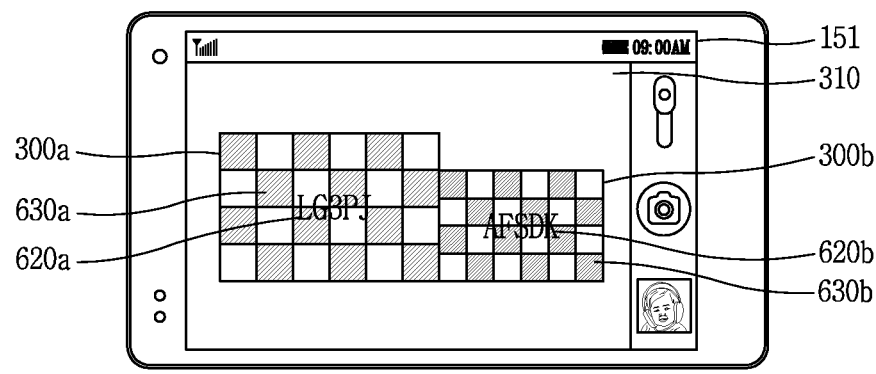
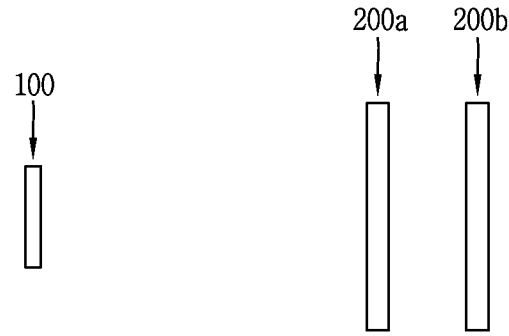

FIG. 17B
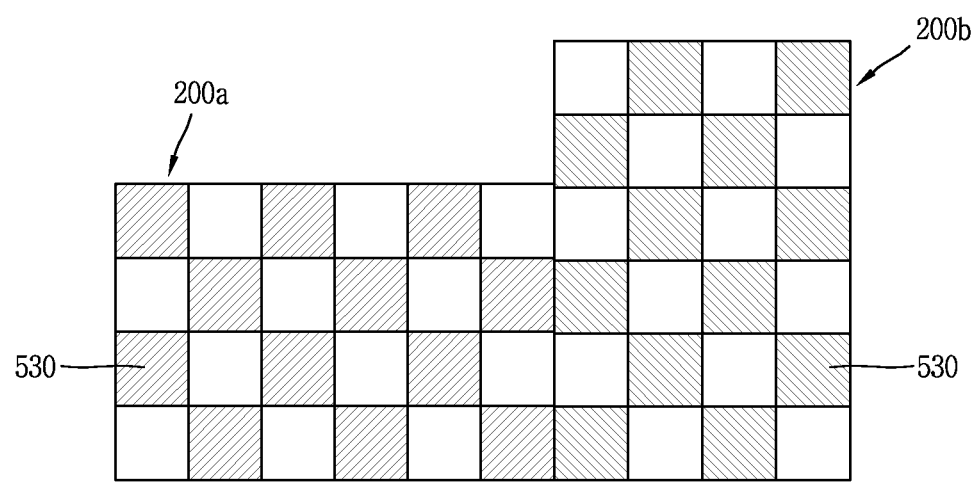
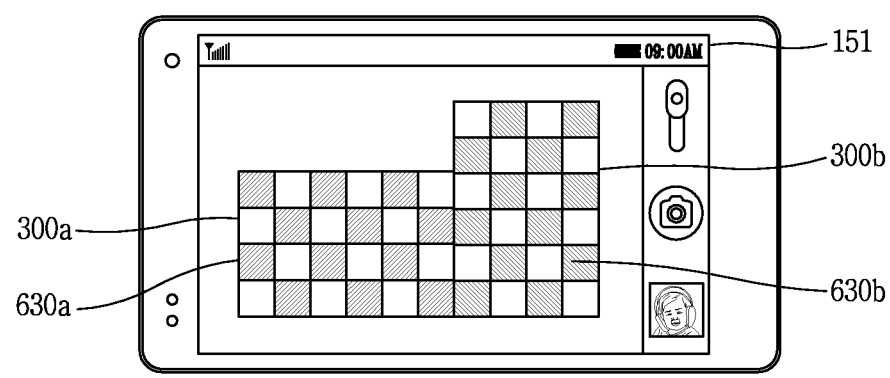

IMAGE OUTPUT DEVICE, MOBILE TERMINAL, AND METHOD FOR CONTROLLING A PLURALITY OF IMAGE OUTPUT DEVICES

CROSS-REFERENCE TO RELATED APPLICATIONS

This application is the National Stage filing under 35 U.S.C. 371 of International Application No. PCT/KR2015/002055, filed on Mar. 3, 2015, which claims the benefit of earlier filing date and right of priority to Korean Application Nos. 10-2014-0153031, filed on Nov. 5, 2014 and 10-2014-0172365, filed on Dec. 3, 2014, the contents of which are all hereby incorporated by reference herein in their entirety.

TECHNICAL FIELD

The present invention relates to an image output device having an image quality adjustment function, a mobile terminal capable of controlling the image output device, and a method for controlling the same.

BACKGROUND ART

Image output devices include all of devices that receive and output broadcasting or record and reproduce videos and devices that record and reproduce audios. Examples of the image output device include televisions, smart TVs, computer monitors, all-in-one or integral PCs in which a monitor and a main body are coupled to each other, laptop computers, projectors, tablets, mobile terminals and the like.

As it becomes multifunctional, an image output device can be allowed to reproduce broadcast, music or video files, capture still images or moving images, play games, receive broadcast and the like, so as to be implemented as an integrated multimedia player. In addition, an image output device is currently realized as a smart device (e.g., smart television). Accordingly, the image output device executes an Internet and the like, and also operates in cooperation with a mobile terminal, a computer or a server.

Meanwhile, in recent years, cases in which a user outputs screen information using a plurality of image output devices are increasing, and accordingly, function and method for adjusting image qualities of the plurality of image output devices are being continuously developed.

In recent years, with the increase in the cases in which the user outputs the screen information using the plurality of image output devices, a method of controlling the plurality of image output devices using a mobile terminal may be considered.

DISCLOSURE OF THE INVENTION

One aspect of the detailed description is to provide an image output device capable of adjusting image qualities of a plurality of image output devices using a mobile terminal, the mobile terminal, and a control method thereof.

Another aspect of the detailed description is to provide an image output device capable of adjusting image qualities of a plurality of image output devices based on image quality information extracted through a mobile terminal, the mobile terminal and a control method thereof.

Another aspect of the detailed description is to provide an image output device capable of controlling a plurality of image output devices using a mobile terminal, the mobile terminal and a control method thereof.

Another aspect of the detailed description is to provide an image output device, capable of recognizing an arrangement of a plurality of image output devices using a mobile terminal and outputting one content on the plurality of image output devices in a dividing manner, the mobile terminal, and a control method thereof.

Another aspect of the detailed description is to provide an image output device capable of synchronizing a plurality of image output devices using a mobile terminal, the mobile terminal and a control method thereof.

To achieve these and other advantages and in accordance with the purpose of the present invention, as embodied and broadly described herein, there is provided a method for controlling a mobile terminal to control image qualities of a plurality of image output devices, the method including generating a preview image based on images corresponding to the plurality of image output devices, received through a camera, and extracting image quality information related to each of the plurality of image output device using the images corresponding to the plurality of image output devices included in the preview image, and transmitting the extracted image quality information or image quality correction data corresponding to the image quality information to at least one of the plurality of image output devices, the at least one image output device corresponding to an image quality adjustment target.

In an embodiment disclosed herein, the extracting the image quality information may be configured to extract the image quality information from an image corresponding to a preset screen included in the preview image, when the preset screen used for extracting the image quality information is output on each of the plurality of image output devices based on a user request.

In an embodiment disclosed herein, a graphic object for guiding an image quality information extraction area may be output on the preset screen of each of the plurality of image output devices. An indicator corresponding to the graphic object may be output on the preview image. The extracting the image quality information may be performed, in response to the indicator overlapping an image corresponding to the graphic object output on each of the plurality of image output devices.

In an embodiment disclosed herein, an output position of the graphic object for guiding the image quality information extraction area may be decided based on an arranged position of each of the plurality of image output devices, and the indicator may be arranged at a position to correspond to the graphic object.

In an embodiment disclosed herein, the image quality information may include at least one of brightness information, color temperature information, RGB pixel values, contract information, sharpness information, and hue information. The extracting the image quality information may include extracting brightness information related to each of the plurality of image output devices using the images corresponding to the plurality of image output devices, determining whether output brightness of each of the plurality of image output devices is included in a reference range based on the extracted brightness information, transmitting the extracted brightness information to at least one of the plurality of image output devices such that the at least one image output device has brightness within the reference range, when the output brightness of the at least one image output device is out of the reference range, and extracting the color temperature information using the images corresponding to the plurality of image output devices in a state where each of the plurality of image output devices has brightness within the reference range.

In an embodiment disclosed herein, the image quality information transmitted to the at least one image output device corresponding to the image quality adjustment target may be color temperature information extracted using the images corresponding to the plurality of image output devices.

In an embodiment disclosed herein, the method may further include prior to extracting the image quality information, recognizing an arrangement of the plurality of image output devices using the images corresponding to the plurality of image output devices included in the preview image.

In an embodiment disclosed herein, the recognizing may be configured to recognize the arrangement of the plurality of image output devices based on an image corresponding to a graphic object with a different color or shape, included in the preview image, when the graphic object having the different color or shape is output on each of the plurality of image output devices based on a user request.

In an embodiment disclosed herein, the method may further include outputting a plurality of icons corresponding to the arrangement of the plurality of image output devices on the display unit when the arrangement of the plurality of image output devices is recognized.

In an embodiment disclosed herein, the at least one image output device corresponding to the image quality adjustment target may be selected using the plurality of icons.

In an embodiment disclosed herein, the mobile terminal may belong to the same network as the plurality of image output devices.

In an embodiment disclosed herein, a barcode including network information may be output on each of the plurality of image output devices. When an image corresponding to the barcode is output on the preview image, the mobile terminal may extract the network information using the image corresponding to the barcode, and access the same network as the plurality of image output devices using the extracted network information.

A method for controlling an image output device allowed to perform communication with a mobile terminal according to one embodiment of the present invention may include adjusting an RGB output ratio based on received image quality information or image quality correction data corresponding to the image quality information when the image quality information or the image quality correction data corresponding to the image quality information is received from the mobile terminal, and adjusting brightness based on the adjusted RGB output ratio.

In an embodiment disclosed herein, the received image quality information may include color temperature information related to each of the plurality of image output devices, and the RGB output ratio may be decided based on color temperature information related to one of the plurality of image output devices, the one image output device corresponding to a reference for adjusting image quality.

In an embodiment disclosed herein, the adjusting the brightness may be configured to decide a degree of the brightness to be adjusted by applying preset weights associated with the RGB output ratio.

In an embodiment disclosed herein, the method may further include prior to adjusting the RGB output ratio, outputting a graphic object used for recognizing the arrangement of image output devices based on a request of the mobile terminal, and outputting a preset screen used for extracting image quality information based on a request of the mobile terminal.

In an embodiment disclosed herein, a graphic object for guiding an image quality information extraction area may be output on the preset screen, and an output position of the graphic object for guiding the image quality information extraction area may differ depending on the arranged position of the image output device.

A mobile terminal for controlling image qualities of a plurality of image output devices according to one embodiment of the present invention may include a camera, a display unit configured to generate a preview image based on images corresponding to the plurality of image output devices, received through the camera, and outputting the preview image, and extracting image quality information related to each of the plurality of image output devices using the images corresponding to the plurality of image output devices included in the preview image, and transmitting the extracted image quality information or image quality correction data corresponding to the image quality information to at least one image output device corresponding to an image quality adjustment target among the plurality of image output devices.

In an embodiment disclosed herein, when a preset screen used for extracting the image quality information related to each of the plurality of image output devices is output based on a user request, the controller may extract the image quality information corresponding to the preset screen included in the preview image.

In an embodiment disclosed herein, a guide object for guiding the image quality information extraction area may be output on the preset screen of each of the plurality of image output devices. An indicator corresponding to the graphic object may be output on the preview image. The controller may extract the image quality information, in response to the indicator overlapping the image corresponding to the graphic object output on each of the plurality of image output devices.

A method for controlling a mobile terminal to control a plurality of image output devices according to another embodiment of the present invention may include requesting each of the plurality of image output devices to output different identification information, recognizing an arrangement of the plurality of image output devices using images corresponding to the different identification information included in a preview image receive through a camera while the different identification information is output on each of the plurality of image output devices, and controlling the plurality of image output devices using images corresponding to the plurality of image output devices included in the preview image, when the arrangement of the plurality of image output devices is recognized.

In an embodiment disclosed herein, the recognizing the arrangement of the plurality of image output devices may include identifying a number and positions of the plurality of image output devices using the images corresponding to the different identification information included in the preview image, requesting each of the plurality of image output devices to output screen information including a preset grid pattern, and recognizing a relative arrangement of the plurality of image output devices using the images corresponding to the screen information included in the preview image when the screen information is output on each of the plurality of image output devices.

In an embodiment disclosed herein, the relative arrangement of the plurality of image output devices may be recognized based on a size of the grid pattern included in the image corresponding to each of the plurality of image output devices included in the preview image.

In an embodiment disclosed herein, the recognizing the relative arrangement of the plurality of image output devices may be configured to recognize that a first image output device is arranged at a closer position to the mobile terminal than a second image output device different from the first image output device, when a size of the grid pattern included in an image corresponding to the first image output device, among the grid patterns included in the images corresponding to the plurality of image output devices included in the preview image, is greater than a size of the grid pattern included in an image corresponding to the second output device.

In an embodiment disclosed herein, the recognizing the arrangement of the plurality of image output devices may further include determining postures of the plurality of image output devices using the images corresponding to the screen information included in the preview image.

In an embodiment disclosed herein, the identification information may be outputtable together with the screen information including the preset grid pattern.

In an embodiment disclosed herein, the controlling may be configured to control the plurality of image output devices to output one content thereon in a dividing manner based on the arrangement of the plurality of image output devices.

In an embodiment disclosed herein, the controlling may be configured to decide portions of the one content output on each of the image output devices based on the images corresponding to the plurality of image output devices included in the preview image.

In an embodiment disclosed herein, the plurality of image output devices may output different portions of the one content. The portions output on each of the plurality of image output devices may differ according to the arrangement of the plurality of image output devices.

In an embodiment disclosed herein, one of the plurality of image output devices may output a first portion of the one content based on a first position when the one image output device is arranged at the first position. The one image output device may output a second portion of the one content, different from the first portion, based on a second position when the one image output device is arranged at the second position different from the first position.

In an embodiment disclosed herein, sizes of the portions of the one content, output on each of the plurality of image output devices, may differ according to the relative arrangement of the plurality of image output devices, when the plurality of image output devices have the same screen size.

In an embodiment disclosed herein, the size of the portion output on the first image output device of the plurality of image output devices may be greater than the size of the portion output on the second image output device, when the first image output device is arranged closer to the mobile terminal than the second image output device.

In an embodiment disclosed herein, the controlling may be configured to synchronize the plurality of image output devices based on an image output device corresponding to one of the images corresponding to the plurality of image output devices included in the preview image, when a touch is applied to the one image.

In an embodiment disclosed herein, the synchronized category may include at least one of streaming, image quality and volume.

In an embodiment disclosed herein, the controlling may be configured to control the plurality of image output devices to output different volumes based on a relative arrangement of the plurality of image output devices when the synchronized category is the volume.

A mobile terminal for controlling a plurality of image output devices according to another embodiment of the present invention may include a camera, a display unit configured to output a preview image received through the camera, and a controller configured to recognize an arrangement of the plurality of image output devices using images corresponding to different identification information included in the preview image while the different identification information is output on each of the plurality of image output devices, and control the plurality of image output devices using images corresponding to the plurality of image output devices included in the preview image.

In an embodiment disclosed herein, each of the plurality of image output devices may output screen information including a preset grid pattern based on a user request. The controller may recognize a relative arrangement of the plurality of image output devices using images corresponding to the screen information included in the preview image when the screen information is output on each of the plurality of image output devices.

In an embodiment disclosed herein, the controller may control the plurality of image output devices to output one content thereon in a dividing manner, on the basis of the arrangement of the plurality of image output devices.

In an embodiment disclosed herein, the controller may decide portions of the one content output on each of the plurality of image output devices, on the basis of the images corresponding to the plurality of image output devices included in the preview image.

In an embodiment disclosed herein, the controller may synchronize the plurality of image output devices based on an image output device corresponding to one of the images corresponding to the plurality of image output devices included in the preview image, when a touch is applied to the one image.

Advantageous Effect

In accordance with the detailed description, image qualities of a plurality of image output devices can be adjusted using a mobile terminal. Accordingly, the present invention can adjust the image qualities of the plurality of image output devices more conveniently using the mobile terminal, instead of performing a complicated image quality adjustment process for the plurality of image output devices.

When image qualities of a plurality of image output devices are different from each other according to a type and characteristic of a panel of each image output device or a difference of a structure, a fabricating method or an output method of each image output device, the image qualities of the plurality of image output devices can be adjusted based on image quality information extracted by the mobile terminal (from outside of the image output devices. This may allow the user to be provided with a screen without a sense of difference when viewing the plurality of image output devices.

The present invention can recognize an arrangement of a plurality of image output devices using images corresponding to the plurality of image output devices included in a preview image received through a camera. Also, a number and positions of the plurality of image output devices can be determined using images corresponding to different identification information included in the image corresponding to the plurality of image output devices. The present invention can determine a relative arrangement and postures of the plurality of image output devices using images corresponding to screen information having a preset grid pattern, included in each of the images corresponding to the plurality of image output devices. Therefore, the present invention can solve burdens, caused in the related art, namely, having to set the number, the arranged positions, the relative arrangement and the arranged postures of the image output devices in an individual manner, in order to control the plurality of image output devices.

The present invention can also control a plurality of image output devices to output one content in a dividing manner. In this instance, the present invention can set portions of the one content to be output on each of the plurality of image output devices using images corresponding to the plurality of image output devices included in the preview image of the mobile terminal. Therefore, the present invention can provide a GUI optimized for outputting the content on the plurality of image output devices.

Also, the present invention can select one reference image output device using images corresponding to a plurality of image output devices included in a preview image of a mobile terminal, and synchronize the plurality of image output devices based on the reference image output device. Therefore, the present invention can solve the inconvenience caused in the related art due to an individual synchronization of each image output device and also perform more optimized synchronization from a position of the mobile terminal, namely, from a user's position.

BRIEF DESCRIPTION OF THE DRAWINGS

FIG. 6 is a flowchart illustrating an image adjusting method in accordance with one embodiment of the present invention.

FIG. 7 is a flowchart illustrating a method of establishing a communication between a mobile terminal and a plurality of image output devices in accordance with one embodiment of the present invention.

FIG. 8 is a conceptual view illustrating the communication establishing method illustrated in FIG. 7.

FIG. 9 is a flowchart illustrating a method in which a mobile terminal recognizes an arrangement of a plurality of image output devices in accordance with one embodiment of the present invention.

FIGS. 11 and 12 are flowcharts illustrating a method of extracting image quality information regarding each of a plurality of image output devices using a mobile terminal in accordance with one embodiment of the present invention.

FIGS. 13A and 13B are conceptual views illustrating the method of extracting the image quality information illustrated in FIGS. 11 and 12.

FIG. 14 is a flowchart illustrating a method of adjusting image quality of an image output device in accordance with one embodiment of the present invention.

FIGS. 17A, 17B and 17C are conceptual views illustrating a method in which a mobile terminal recognizes an arrangement of a plurality of image output devices using images corresponding to the plurality of image output devices included in a preview image.

MODES FOR CARRYING OUT THE PREFERRED EMBODIMENTS

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
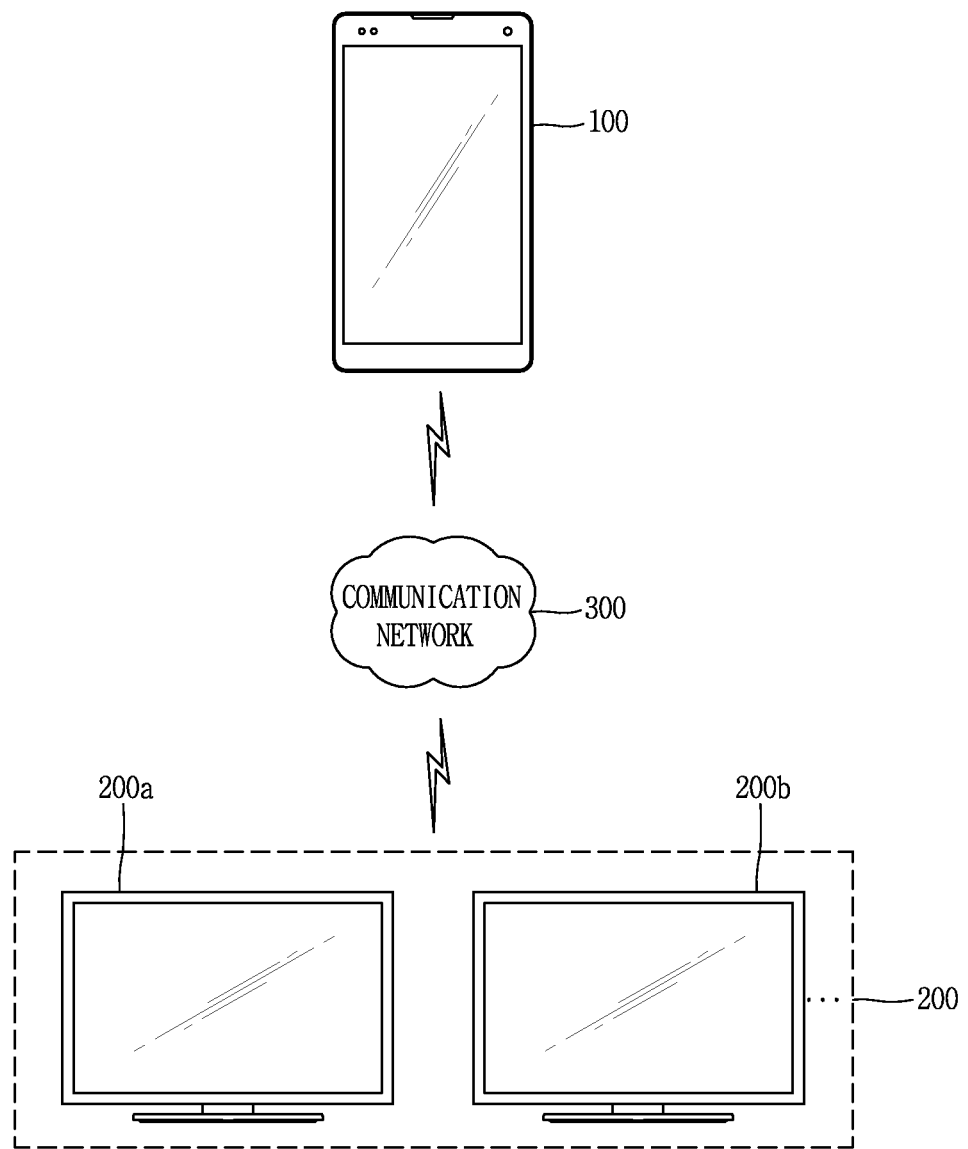
FIG. 1 is a conceptual view of a system related to the present invention.

Referring to FIG. 1, FIG. 1 is a conceptual view illustrating a system according to the present invention.

A system according to one embodiment of the present invention may include a mobile terminal 100, an image output device 200, a communication network 300 and the like.

Mobile terminals presented herein may be implemented using a variety of different types of terminals. Examples of such terminals include cellular phones, smart phones, laptop computers, digital broadcast terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

Although not mentioned above, examples of the mobile terminals may include any type of device if it is a terminal which is capable of performing communication with another device and has a function of analyzing an image received through a camera.

In this specification, examples of the image output device 200 may include a television, a smart TV, a digital TV, a computer monitor, an all-in-one PC (or an integral PC) with a monitor and a main body coupled to each other, a laptop computer, a projector, a tablet, a digital signage, a video wall, a mobile terminal and the like. That is, the image output device 200 may include various types of devices capable of outputting screen information.

Meanwhile, the mobile terminal 100 and the image output device 200 may be connected to each other so as to perform communication through the communication network 300. The mobile terminal 100 and the image output device 200 connected to each other through the communication network 300 may perform data transmission and reception, or transfer control command signals.

The communication network 300 through which the mobile terminal 100 and the image output device 200 can perform communication therebetween refers to a network connecting the mobile terminal 100 and the image output device 200 to each other, namely, every communication network supporting wired/wireless communication. The communication network 300 may be a closed network such as a local area network (LAN), a wide area network (WAN) and the like, or preferably be an open network such as an Internet. The Internet refers to a global open-type computer network structure which provides TCP/IP protocols and several services existing at an upper layer, namely, Hyper-Text Transfer Protocol (HTTP), Telnet, File Transfer Protocol (FTP), Domain Name System (DNS), Simple Mail Transfer Protocol (SMTP), Simple Network Management Protocol (SNMP), Network File Service (NFS), and Network Information Service (NIS).

In addition, the communication network 300 may support short-range communication, by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (Wireless USB).

The mobile terminal 100 and the image output device 200 according to one embodiment of the present invention may access the same network through the communication network 300. Here, the image output device 200 may be present in plurality 200a, 200b, . . . , 200n. The mobile terminal 100 may transmit a signal (or a request) for controlling the plurality of image output devices 200 to at least one of the plurality of image output devices 200 to extract image quality information related to each of the plurality of image output devices 200.

Also, the mobile terminal 100 may transmit the extracted image quality information to the image output device corresponding to an image quality adjustment target (i.e., a device of which image quality is to be adjusted), so that the image quality of at least one of the plurality of image output devices is adjusted.

Hereinafter, the components constituting the mobile terminal and the image output device according to the one embodiment of the present invention will be described in more detail with reference to FIGS. 2 and 3.

Figure 2:
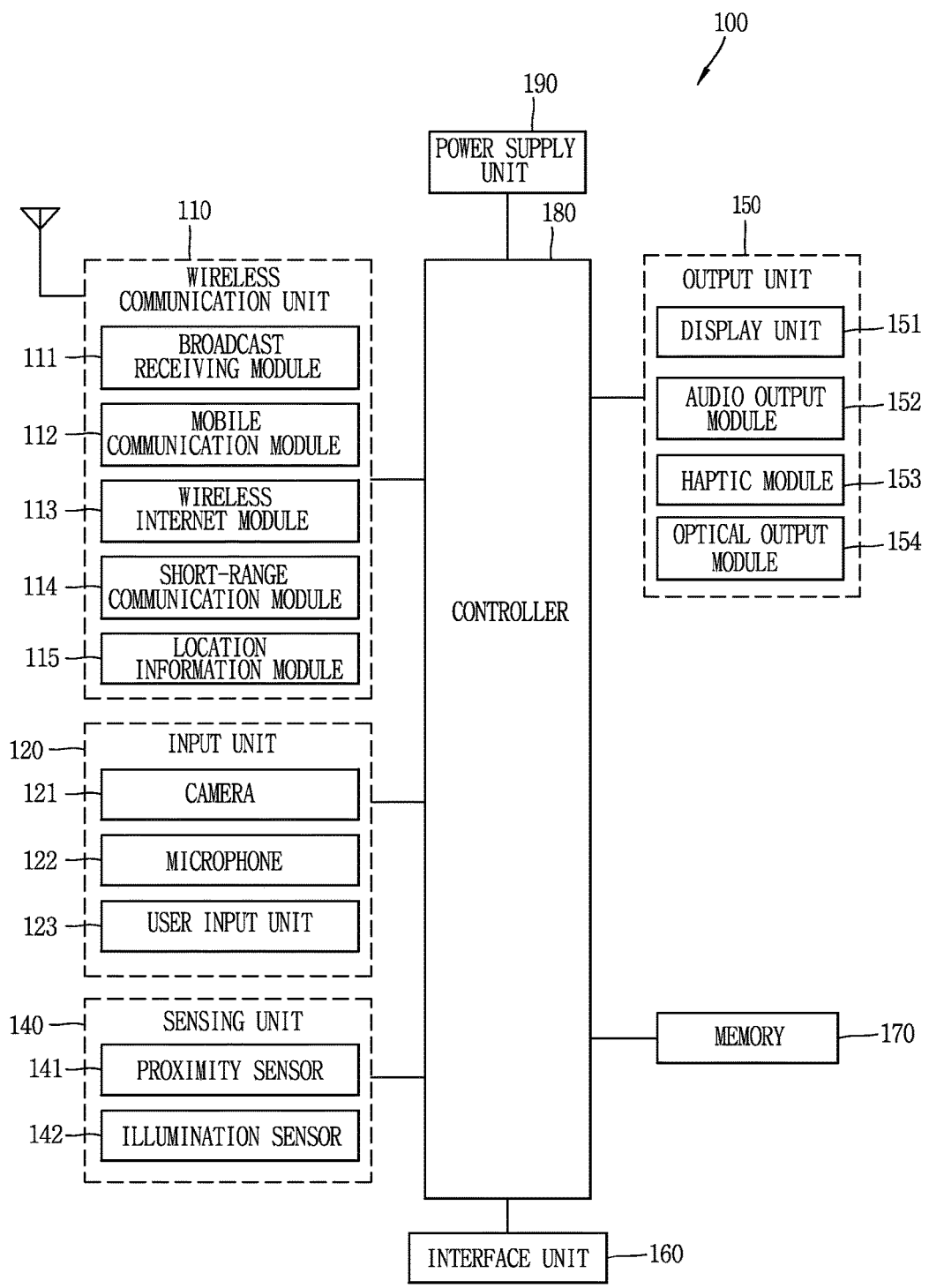
FIG. 2 is a block diagram illustrating a mobile terminal in accordance with the present invention.

Referring to FIG. 2, FIG. 2 is a block diagram of a mobile terminal according to the present invention.

The mobile terminal 100 may be shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 controls some or all of the components illustrated in FIG. 1A according to the execution of an application program that have been stored in the memory 170. In addition, the controller 180 may control at least two of those components included in the mobile terminal to activate the application program.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), Enhanced Voice-Date Optimized or Enhanced Voice-Data Only (EV-DO), Wideband CDMA (WCDMA), High Speed Downlink Packet access (HSDPA), High Speed Uplink Packet Access (HSUPA), Long Term Evolution (LTE), LTE-advanced (LTE-A) and the like).

Examples of the wireless signals include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LET-A, and the like, as part of a mobile communication network, the wireless Internet module 113 may be understood as a type of the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

Here, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

The input unit 120 may be configured to permit various types of inputs to the mobile terminal 100. Examples of such inputs include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operation of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor can sense a touch (or a touch input) applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched region, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

Meanwhile, the touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the mobile terminal. The photo sensor may be configured to scan movement of the physical object in proximity to the touch screen. In more detail, the photo sensor may include photo diodes and transistors (TR) at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the flexible display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule alarm, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control an operation associated with an application program and the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Hereinafter, the image output device 200 capable of executing communication with the mobile terminal illustrated in FIG. 2 will be described in more detail, with reference to FIG. 3. FIG. 3 is a block diagram of an image output device in accordance with the present invention. An image output device 200 according to one embodiment of the present invention includes a tuner 210, a demodulator 220, a signal input/output unit 230, an interface unit 240, a controller 250, a storage unit (or memory) 260, a display unit 270, and an audio output unit 280. However, an external input device is a separate device from the image output device 200, but may be included as one component of the image output device 200.

Figure 3:
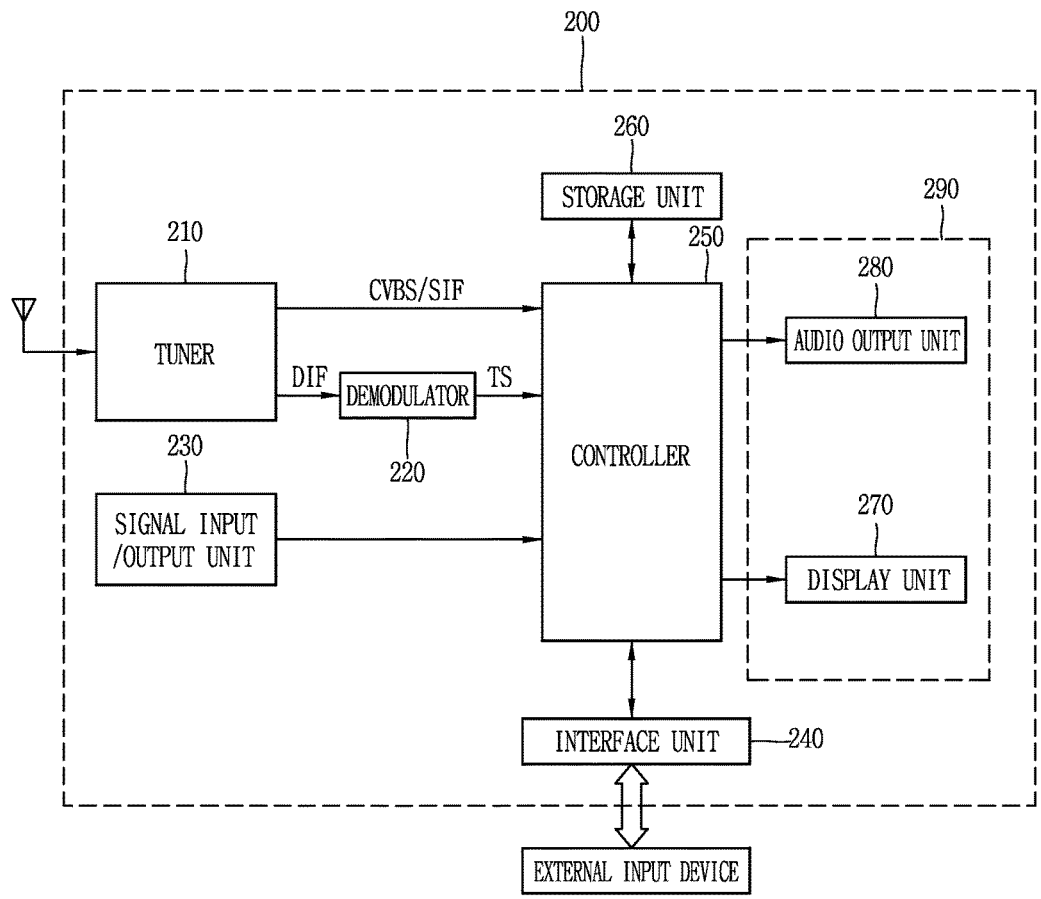
FIG. 3 is a block diagram illustrating an image output device in accordance with the present invention.

Referring to FIG. 3, the tuner 210 selects a radio frequency (RF) broadcast signal corresponding to a channel selected by a user among RF broadcast signals received through an antenna, and converts the RF broadcast signal into an intermediate frequency signal or a baseband video/audio signal. For example, if the RF broadcast signal is a digital broadcast signal, the tuner 210 converts the RF broadcast signal into a digital IF signal (DIF). On the other hand, if the RF broadcast signal is an analog broadcast signal, the tuner 210 converts the RF broadcast signal into an analog baseband video/audio signal (CVBS/SIF). As described above, the tuner 210 may be a hybrid tuner capable of processing a digital broadcast signal and an analog broadcast signal.

The digital IF signal (DIF) output from the tuner 210 is input to the demodulator 220 and the analog baseband video/audio signal (CVBS/SIF) output from the tuner 210 is input to the controller 260. The tuner 220 may receive an RF broadcast signal of a single carrier according to an Advanced Television Systems Committee (ATSC) scheme or an RF broadcast signal of a plurality of carriers according to a Digital Video Broadcasting (DVB) scheme.

Although one tuner 210 is shown in the drawing, the present invention is not limited thereto. The image output device 200 may include a plurality of tuners, for example, first and second tuners. In this case, the first tuner may receive a first RF broadcast signal corresponding to a broadcast channel selected by the user, and the second tuner may sequentially or periodically receive a second RF broadcast signal corresponding to a previously-stored broadcast channel. The second tuner may convert the RF broadcast signal into a digital IF signal (DIF) or an analog baseband video/audio signal (CVBS/SIF) in the same manner as the first tuner.

The demodulator 220 receives the digital IF signal (DIF) converted by the tuner 210 and demodulates the received signal. For example, if the digital IF signal (DIF) output from the tuner 210 is a signal according to the ATSC standard, the demodulator 220 performs an 8-VSB (8-Vestigial Side Band) demodulation. At this time, the demodulator 220 may perform channel decoding such as trellis decoding, de-interleaving, Reed-Solomon decoding, and the like. For this, the demodulator 220 may include a trellis decoder, a de-interleaver, a Reed Solomon decoder, and the like.

In another example, if the digital IF signal (DIF) output from the tuner 210 is a signal according to DVB standard, the demodulator 220 performs Coded Orthogonal Frequency Division Modulation (COFDMA) demodulation. At this time, the demodulator 220 may perform channel decoding such as convolutional decoding, de-interleaving, Reed-Solomon decoding, and the like. For this, the demodulation unit 220 may include a convolution decoder, a de-interleaver, a Reed-Solomon decoder, and the like.

The signal input/output unit 230 may be connected to an external device to perform a signal input and output operation. To this end, the signal input/output unit 230 may include an A/V input/output unit (not illustrated) and a wireless communication unit (not illustrated).

The A/V input/output unit may include an Ethernet terminal, a USB terminal, a Composite Video Banking Sync (CVBS) terminal, a component terminal, an S-video terminal (analog), a digital visual interface (DVI) terminal, a High Definition Multimedia Interface (HDMI), a Mobile High-Definition Link (MHL) terminal, an RGB terminal, a D-SUB terminal, an IEEE 1394 terminal, a SPDIF terminal, and a Liquid HD terminal. Digital signals input through these terminals may be transmitted to the controller 250. At this time, analog signals input through the CVBS terminal and the S-video terminal may be converted into the digital signals through an analog-digital converter (not illustrated) and transmitted to the controller 250. The wireless communication unit may perform a wireless Internet access. For example, the wireless communication unit may perform a wireless Internet access using WLAN (Wi-Fi), Wireless broadband (Wibro), World Interoperability for Microwave Access (Wimax), High Speed Downlink Packet Access (HSDPA), and the like. In addition, the wireless communication unit may perform short-range wireless communication with other electronic devices. For example, the wireless communication unit may perform near field wireless communication using Bluetooth, Radio Frequency Identification (RFID), infrared data association (IrDA), ultra wideband (UWB), ZigBee, and the like.

The signal input/output unit 230 may transfer to the controller 250 a video signal, an audio signal and a data signal, which are provided from external devices, such as a Digital Versatile Disk (DVD) player, a Blu-ray player, a game device, a camcorder, a computer (laptop computer), a portable device, a smart phone and the like. In addition, the signal input/output unit 230 may transfer a video signal, an audio signal and a data signal of various media files stored in an external storage device such as a memory device, a hard disk, or the like, to the controller 250. Also, the signal input/output unit 230 may output the video signal, the audio signal and the data signal processed by the controller 250 to another external device.

The signal input/output unit 230 may be connected to a set-top box, for example, a set-top box for Internet Protocol TV (IPTV) through at least one of the various terminals described above, to perform signal input and output operations. For example, the signal input/output unit 230 may transmit a video signal, an audio signal, and a data signal processed by the IPTV set-top box to the controller 250 so as to enable bidirectional communication, or transfer signals processed by the controller 250 to the IPTV set-top box. Here, the IPTV may include ADSL-TV, VDSL-TV, FTTH-TV, etc. classified according to a transfer network.

The digital signal output from the demodulator 220 and the signal output unit 230 may include a stream signal TS. The stream signal TS may be a multiplexed signal of a video signal, an audio signal, and a data signal. For example, the stream signal TS may be an MPEG-2 TS (Transport Stream) signal obtained by multiplexing an MPEG-2 standard video signal, a Dolby AC-3 standard audio signal and the like. Here, the MPEG-2 TS may include a header of 4 bytes and a payload of 184 bytes.

The interface unit 240 may receive an input signal for power control, channel selection, screen setting, etc. from the external input device 200 or may transmit a signal processed by the controller 260 to the external input device 200. The interface unit 240 and the external input device 200 may be connected in a wired or wireless manner.

As an example of the interface unit 240, a sensor unit may be provided, and the sensor unit is configured to sense the input signal from a remote controller.

The network interface unit (not illustrated) provides an interface for connecting the image output device 200 to a wired/wireless network including an Internet network. The network interface unit 230 may include an Ethernet terminal or the like for an access to a wired network and may use communication standards for the access to the wireless network. Examples of the communication standards may include Wireless LAN (WLAN) (Wi-Fi), Wireless Broadband (Wibro), World Interoperability for Microwave Access (Wimax), High Speed Downlink Packet Access (HSDPA), and the like.

The network interface unit (not illustrated) may access a predetermined web page via the network. That is, the network interface unit may access a predetermined web page through the network to perform data transmission or reception with a corresponding server. In addition, a content provider or a network operator may receive contents or data. That is, the network interface unit may receive contents, such as a movie, an advertisement, a game, a VOD, and a broadcast signal, and related information, which are provided from the content provider or the network operator, through the network. Also, the network interface unit may receive update information and an update file of a firmware provided by the network operator. In addition, the network interface unit may transmit data to the Internet or the content provider or network operator.

In addition, the network interface unit (not illustrated) may selectively receive a desired application among applications open to the public through the network.

The controller 250 may control the overall operation of the image output device 200. More specifically, the controller 250 is configured to control generation and output of a video. For example, the controller 250 may control the tuner 210 to tune an RF broadcast signal corresponding to a channel selected by the user or a previously-stored channel. Although not illustrated, the controller 250 may include a demultiplexer, an image processor, a voice processor, a data processor, an On Screen Display (OSD) generator, and the like. In addition, the controller 250 may include a CPU, a peripheral device, and the like in hardware configuration.

The controller 250 may demultiplex a stream signal TS, for example, an MPEG-2 TS, into a video signal, an audio signal, and a data signal.

The controller 250 may perform image processing, e.g., decoding, with respect to a demultiplexed video signal. In more detail, the controller 250 may decode an encoded video signal of an MPEG-2 standard using an MPEG-2 decoder, and decode an encoded video signal of an H.264 standard according to a Digital Multimedia Broadcasting (DMB)

using an H.264 decoder. Also, the controller 250 may perform image processing such that brightness, tint, and color of the video signal are adjusted. The video signal processed by the controller 250 may be transmitted to the display unit 270 or to an external output device (not illustrated) through an external output terminal.

The controller 150 may execute voice processing, e.g., decoding, with respect to a demultiplexed audio (voice) signal. More specifically, the controller 150 may decode an encoded audio signal of an MPEG-2 standard by using an MPEG-2 decoder, and may decode an encoded audio signal of an MPEG-4 bit sliced arithmetic coding (B SAC) standard based on a DMB method by using an MPEG-4 decoder. And the controller 150 may decode an encoded audio signal of an MPEG-2 advanced audio codec (AAC) standard based on a DMB method or a DVB-H method by using an AAC decoder. The controller 150 may control a base, a treble, a sound, etc. The audio signal processed by the controller 150 may be transmitted to the audio output unit 171, e.g., a speaker, or may be transmitted to an external output device.

The controller 250 may perform signal processing with respect to the analog baseband video/audio signal (CVBS/SIF). The analog baseband video/audio signal (CVBS/SIF) input to the controller 250 may be an analog baseband video/audio signal output from the tuner 210 or the signal input/output unit 230. The signal-processed video signal is displayed through the display unit 270, and the signal-processed audio signal is output through the audio output unit 280.

The controller 250 may perform data processing, for example, decoding, with respect to a demultiplexed data signal. Here, the data signal may include EPG (Electronic Program Guide) information including broadcast information such as start time and end time of a broadcast program broadcasted on each channel. The EPG information, for example, may include ATSC-Program and System Information Protocol (ATSC-PSIP) information based on an ATSC method, and DVB-Service Information (DVB-SI) based on a DVB method. The ATSC-PSIP information or the DVB-SI information may be included in a header (4 bytes) of an MPEG-2 TS.

The controller 250 may execute a control operation for an OSD processing. More specifically, the controller 150 may generate an OSD signal for displaying various types of information in the form of a graphic or a text, based on at least one of an image signal and a data signal, or based on an input signal received from the external input device 200. The OSD signal may include various data such as a user interface screen, a menu screen, a widget, and an icon of the image display device 100.

The storage unit 260 may store therein a program for signal processing and control of the controller 250, or may store therein a video signal, an audio signal and a data signal which have been processed. The storage unit 160 may include at least one storage medium of a flash memory-type storage medium, a hard disc-type storage medium, a multimedia card micro-type storage medium, a card-type memory (for example, SD or XD memory), a random access memory (RAM), a read-only memory (ROM), an electrically erasable programmable ROM (EEPROM), a programmable ROM (PROM), a magnetic memory, a magnetic disk, and an optical disk.

The display unit 270 may convert a video signal, a data signal, an OSD signal, etc. processed by the controller 250 into an RGB signal, thereby generating a driving signal. With such a configuration, the display unit 172 outputs a video. The display unit 270 may be implemented as a plasma display panel (PDP), a liquid crystal display (LCD), a thin film transistor-liquid crystal display (TFT-LCD), an organic light emitting diode (OLED), a flexible display, a 3-dimensional (3D) display, an e-ink display, etc. The display unit 172 may serve as an input device by being implemented as a touch screen.

The audio output unit 280 outputs the audio signal processed by the controller 250, for example, a stereo signal or a 5.1-channel signal. The audio output unit 280 may be implemented by various types of speakers.

On the other hand, a capturing unit (not shown) for capturing a user may be further provided. The capturing unit (not shown) may be implemented by a single camera, however, the present invention is not limited thereto and the capturing unit may be implemented by a plurality of cameras. Image information captured by the capturing unit (not shown) is input to the controller 270.

In order to detect a user gesture, a sensing unit (not shown) having at least one of a touch sensor, a voice sensor, a position sensor, and an operation sensor may be further provided in the image output device 200. A signal sensed by the sensing unit (not shown) may be transmitted to the controller 250 through the user input interface unit 240.

The controller 250 may sense the user gesture by using images captured by the capturing unit (not illustrated) or signals sensed by the sensing unit (not illustrated) in an individual manner or a combining manner.

The power supply unit (not illustrated) supplies corresponding power to the entire image output device 200. Particularly, the power supply unit may supply power to the controller 250 that can be implemented in a form of a system on chip (SOC), the display unit 270 for image output, and the audio output unit 280 for audio output.

To this end, the power supply unit (not illustrated) may include a converter (not illustrated) for converting AC power to DC power. Meanwhile, for example, when the display unit 270 is implemented as a liquid crystal panel having a plurality of backlight lamps, the power supply unit may further include an inverter (not shown) in which a PWM operation is allowed for brightness variability and dimming.

The external input device is connected to the interface unit 240 in a wired or wireless manner, and transmits an input signal generated according to a user input to the interface unit 240. The external input device may include a remote controller, a mouse, a keyboard, and the like. The remote controller may transmit an input signal to the interface unit 240 through Bluetooth, RF communication, infrared communication, Ultra Wideband (UWB), ZigBee, or the like. The remote controller may be implemented as a spatial remote controller. The spatial remote controller may sense an operation of a main body in a space and generate an input signal. The external input device may include the mobile terminal according to the one embodiment of the present invention.

The image output device 200 may be realized as a fixed type digital broadcast receiver which is capable of receiving at least one of an ATSC type (8-VSB type) digital broadcast, a digital broadcast, a DVB-T type (COFDM type) digital broadcast, and an ISDB-T type (BST-OFDM type) digital broadcast. Alternatively, the image display device 100 may be realized as a mobile type digital broadcast receiver capable of receiving at least one of a ground wave DMB type digital broadcast, a satellite DMB type digital broadcast, an ATSC-M/H type digital broadcast, a DVB-H type (COFEM type) digital broadcast, and a media forward link-only type digital broadcast. Alternatively, the image display apparatus 200 may be implemented as a digital broadcast receiver for cable communication, satellite communication or IPTV.

The image output device according to one embodiment of the present invention, which may include at least one of the above-described components, may perform an image quality adjustment function. Here, image quality (picture quality) refers to quality of an image such as color tone and brightness in the image output device. The image quality adjustment function refers to a function of adjusting (correcting, calibrating) brightness of a backlight, contrast, color, brightness, chroma (hue), saturation, luminance, sharpness, tint, white balance, color temperature, RGB pixel values, and the like. The image output device 200 may adjust the image quality according to a user request or under the control of the controller.

The image output device 200 according to the one embodiment of the present invention may perform color calibration through the image quality adjustment function. The color calibration refers to a process of setting output characteristics of the image output device 200 to match reference colors or another device (for example, another image output device 200). The color calibration may be named color compensation or color correction.

The image output device 200 may adjust a color balance (white balance), for example, by using the image quality adjustment function. The white balance may be adjusted using color temperature. The color temperature is one of methods of displaying light of a light source. Specifically, the color temperature may be understood as a numerical value of the color of the light source using absolute temperature. A measurement unit of the color temperature is Kelvin (K).

The color temperature may be defined by the International Commission on Illumination (CIE) 1931 color space chromaticity diagram (hereinafter referred to as 'CIE color chart'). The color temperature defined through the CIE color chart may indicate correlated color temperature.

In general, colors with low color temperatures (e.g., 2700-3000K) are referred to as warm colors (yellowish white through red), and colors with high color temperatures (e.g., 5000K or more) are referred to as cool colors (bluish white). That is, the light source emits reddish light as the color temperature is low, and emits bluish light as the color temperature is high.

Meanwhile, the plurality of image output devices 200 according to one embodiment of the present invention may have different image qualities (for example, white balances) from each other, in spite of the same settings. Specifically, the plurality of image output devices 200 may have different image qualities depending on panel types and characteristics of the image output devices, regardless of the same output setting (setting). This also corresponds to a case of having different image qualities depending on an inherent characteristic of a hardware configuration constituting a panel, for the same products (for example, at least two products produced in one production line).

As another example, the case where the plurality of image output devices have the different image qualities may further include a case where the same products are set to different settings based on a user request.

As another example, the plurality of image output devices may have different image qualities depending on the structure of the image output device (the structure of the panel), a manufacturing method of the image output device, or an output method of the image output device.

The present invention, as aforementioned, may perform the image quality adjustment function (for example, color calibration) for the plurality of image output devices having the different image qualities. In detail, the image output device 200 according to the present invention may control RGB signals (RGB output values, RGB output ratio) to adjust image quality (e.g., white balance). Specifically, the image output device 200 according to the present invention can calibrate color temperature by controlling the RGB signals to correct the white balance.

That is, the present invention can perform the image quality adjustment function to correct the white balance of an image output device 200, which is an image quality adjustment target, to correspond to a white balance of an image output device 200 as a reference image output device, which serves as a reference for adjusting image quality, among the plurality of image output devices 200.

For example, when the color temperature of the image output device corresponding to the image quality adjustment target is higher than the color temperature of the reference image output device, the image output device corresponding to the image quality adjustment target may be set to emit more bluish light than the reference image output device. At this time, the image output device corresponding to the image quality adjustment target may lower the color temperature by decreasing an output of a Blue (B) signal of the RGB signals or increasing an output of a Red (R) signal.

On the other hand, when the color temperature of the image output device corresponding to the image quality adjustment target is lower than the color temperature of the reference image output device, the image output device corresponding to the image quality adjustment target may be set to emit more reddish light than the reference image output device. At this time, the image output device corresponding to the image quality adjustment target may lower the color temperature by increasing the output of the B signal of the RGB signals or decreasing the output of the R signal.

Thus, the image output device according to the present invention can perform the image quality adjustment function so as to correspond to the image quality of any one reference device of the plurality of image output devices.

Meanwhile, the present invention may use a mobile terminal to perform an image quality adjustment function such that image quality of an image output device corresponding to the image quality adjustment target among a plurality of image output devices corresponds to image quality of one reference image output device.

Hereinafter, a control method of a mobile terminal used for performing an image quality adjustment function of an image output device according to one embodiment of the present invention will be described in more detail with reference to the accompanying drawings.

Figure 4:
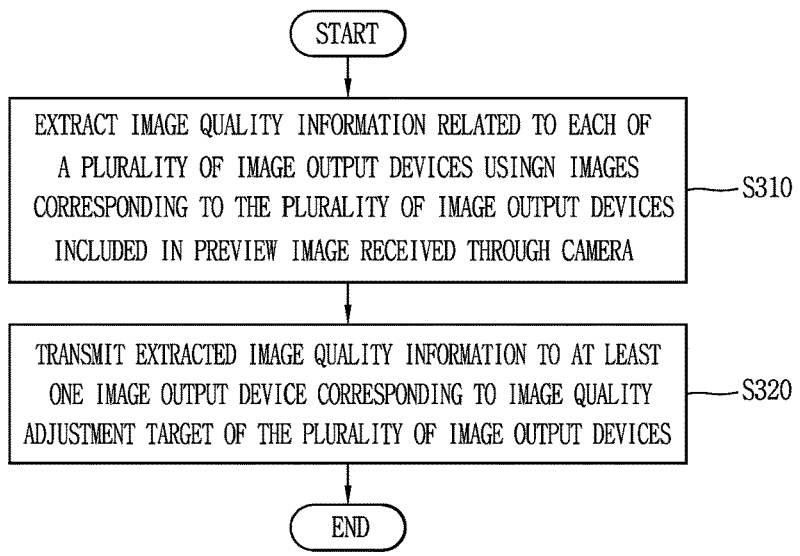
FIG. 4 is a flowchart representatively illustrating a method of controlling a mobile terminal in accordance with one embodiment of the present invention.
Figure 5:
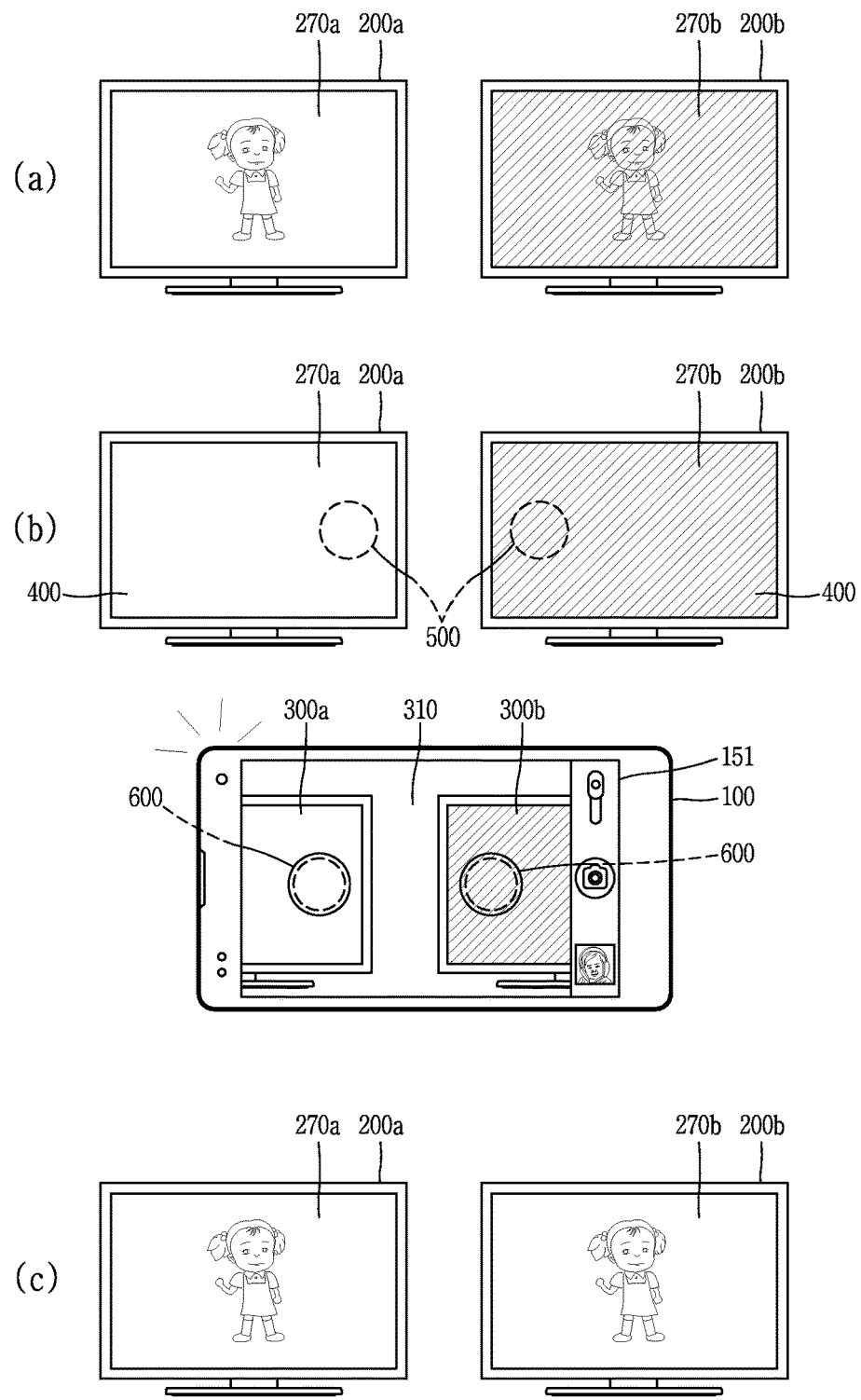
FIG. 5 is a conceptual view illustrating the control method illustrated in FIG. 4.

FIG. 4 is a flowchart representatively illustrating a method of controlling a mobile terminal according to one exemplary embodiment of the present invention, and FIG. 5 is a conceptual view illustrating the control method illustrated in FIG. 4.

First, the mobile terminal 100 according to the present invention may output an image (hereinafter referred to as 'preview image') 310, which is received through a camera 121 provided in the mobile terminal, on a display unit 151. Specifically, the mobile terminal 100 may generate the preview image 310 based on images corresponding to the plurality of image output devices received through the camera, and output the preview image 310 on the display unit 151.

The preview image 310 may be output on the display unit 151 based on an execution of an application including a function of activating the camera 121. The execution of the application may be performed in response to an icon of the application being selected (or touched).

In addition, the mobile terminal 100 may perform an image analysis for the preview image 310 output on the display unit 151. The image analysis may refer to extracting color information, brightness information, and the like related to at least a part of images included in the preview image 310.

In the mobile terminal 100 according to the one exemplary embodiment of the present invention, which may include the above-described functions, image quality information related to each of a plurality of image output devices 200a and 200b is extracted by using images 300a and 300b corresponding to the plurality of image output devices 200a and 200b included in the preview image 310 received through the camera (S310).

The preview image 310 received through the camera may be output on the display unit 151 of the mobile terminal 100 based on an execution of an application associated with a camera activation function.

The preview image 310 may include the images 300a and 300b corresponding to the plurality of image output devices 200a and 200b according to a user's control. More specifically, the images 300a and 300b corresponding to the plurality of image output devices may be included in the preview image 310 in a manner that the user controls the mobile terminal to direct the camera 121 provided in the mobile terminal 100 toward the plurality of image output devices 200a and 200b. That is, the mobile terminal 100 may generate the preview image 310 based on the images corresponding to the plurality of image output devices received through the camera, and transmit the preview image 310 to the display unit 151.

Hereinafter, for convenience of explanation, it is assumed that there are two image output devices. However, the following description is not limited to the case where the plurality of image output devices are two, but may be applied to a case where three or more image output devices are present in the same/like manner.

The output preview image 310 may include an image 300a corresponding to at least part of a first image output device 200a of the plurality of image output devices 200a and 200b, and an image 300b corresponding to at least part of a second image output device 200b.

The controller 180 of the mobile terminal 100 may extract image quality information related to each of the plurality of image output devices 200a and 200b using the images 300a and 300b corresponding to the plurality of image output devices included in the preview image 310. The extracted image quality information is information extracted through the images 300a and 300b corresponding to the plurality of image output devices included in the preview image 310. The extracted image quality information may include color information (color temperature information, RGB pixel values, contrast, sharpness, saturation (hue), and brightness information.

At this time, the mobile terminal 100 may request each of the plurality of image output devices 200a and 200b to output a preset screen 400 used for the extraction of the image quality information. The preset screen 400 may be implemented in various forms, for example, a white screen.

For example, the preset screen 400 may be a screen which is output in a state that the RGB signal values of the image output device 200 are 255, respectively (e.g., (R, G, B)= (255, 255, and 255)). In this case, the plurality of image output devices 200 may output the preset screens having different image qualities according to panel characteristics.

As another example, the preset screen 400 may be a white screen that is output as a file (data) formed by the same algorithm is executed. In this case, even if the preset screen is output by the same file on each of the plurality of image output devices 200, the preset screen may be output with a different image quality (e.g., white balance) depending on settings (for example, RGB output ratio, brightness, etc.) which are set in each of the plurality of image output devices.

A graphic object 500 may be output on each preset screen 400. The graphic object 500 may serve to guide an image quality information extraction area. Meanwhile, an indicator 600 corresponding to the graphic object may be output on the preview image 310 of the mobile terminal 100.

The controller 180 may extract the image quality information related to each of the plurality of image output devices, in response to the indicator 600 overlapping an image corresponding to the graphic object included in the preview image 310. Specifically, the controller 180 may process the overlap of the indicator 600 with the image corresponding to the graphic object 500 as an image quality information extraction command.

In the state that the preset screen 400 is output on each of the plurality of image output devices 200, the controller 180 may extract the image quality information related to each of the plurality of image output devices using the images 300a and 300b corresponding to the plurality of image output devices included in the preview image 310.

For example, the controller 180 may extract the image quality information related to the first image output device 200a using the image 300a corresponding to the first image output device 200a included in the preview image 310. The controller 180 may extract the image quality information related to the second image output device 200b using the image 300b corresponding to the second image output device 200b included in the preview image 310.

More specifically, the preset screen 400 may be output on each of the first and second image output devices 200a and 200b. In this state, the controller 180 may extract the image quality information related to the first image output device 200a using the image corresponding to the preset screen 400 output on the first image output device 200a, included in the preview image 310. Also, the controller 180 may extract the image quality information related to the second image output device 200b using the image corresponding to the preset image 400 output on the second image output device 200b, included in the preview image 310.

Afterwards, in the present invention, the extracted image quality information or image quality correction data corresponding to the image quality information is transmitted to at least one image output device corresponding to the image quality adjustment target of the plurality of image output devices (S320).

In detail, when one image output device 200b of the plurality of image output devices 200a and 200b corresponds to the image quality adjustment target, the controller 180 may transmit the extracted image quality information or the image quality correction data corresponding to the image quality information to the one image output device 200b. In other words, the controller 180 may transmit the extracted image quality information or the image quality correction data corresponding to the image quality information to at least one of the plurality of image output devices, such that the image quality of the at least one image output device is adjusted.

The image quality information transmitted to the one image output device may be the image quality information related to each of the plurality of image output devices. Also, the image quality correction data corresponding to the image quality information may be an image quality difference value (e.g., brightness difference value or color temperature difference value) based on the image quality information related to a reference image output device and the image quality information related to the one image output device.

The image output device 200*b* corresponding to the image quality adjustment target, which has received the extracted image quality information or the image quality correction data corresponding to the image quality information from the mobile terminal, may adjust the image quality using the received image quality information or the image quality correction data corresponding to the image quality information. A more detailed method of adjusting the image quality will be described later with reference to FIG. 14.

The foregoing description will be more clearly understood with reference to FIG. 5.

Referring to FIG. 5, a plurality of image output devices 200*a* and 200*b* having different image qualities may be output in (a) of FIG. 5. Specifically, when the same file (image) is output on display units 270*a* and 270*b* of the plurality of image output devices, the plurality of image output devices 200*a* and 200*b* may have the different image qualities.

At this time, the controller 180 may extract image quality information related to each of the plurality of image output devices 200*a* and 200*b*, using images 300*a* and 300*b* corresponding to the plurality of image output devices included in a preview image 310 received through a camera.

In this instance, the controller 180 of the mobile terminal may request the plurality of image output devices 200*a* and 200*b* to output preset screens 400 used for the image quality information extraction. Responsive to this, as illustrated in (b) of FIG. 5, the preset screens 400 may be output on the plurality of image output devices 200*a* and 200*b*, respectively.

As illustrated in (b) of FIG. 5, graphic objects 500 each guiding the image quality information extraction area may be output on the preset screens 400, respectively. Also, indicators 600 corresponding to the graphic objects may be output on the preview image 310 output on the mobile terminal.

As illustrated in (b) of FIG. 5, when the indicators 600 output on the preview image 310 correspond to images corresponding to the graphic objects 500 output on the plurality of image output devices 200*a* and 200*b* by a user request (movement), the controller 180 of the mobile terminal may extract the image quality information related to each of the plurality of image output devices 200*a* and 200*b*.

Afterwards, the controller 180 of the mobile terminal may transmit the extracted image quality information or image quality correction data corresponding to the image quality information to at least one image output device (for example, 200*b*) corresponding to an image quality adjustment target of the plurality of image output devices 200*a* and 200*b*.

The image output device 200*b* that has received the image quality information or the image quality correction data corresponding to the image quality information, as illustrated in (c) of FIG. 5, may adjust the image quality by using the received image quality information or the image quality correction data.

With the configuration, the present invention can more easily adjust the image qualities of the plurality of image output devices using the mobile terminal. This may result in removing user inconvenience in individually adjusting the image qualities of the image output devices through various stages.

Further, according to the present invention, even though the plurality of image output devices output specific screens according to the same output settings, when the image output devices have different image qualities according to panel characteristics, the image qualities of the plurality of image output devices can be adjusted based on image quality information measured from outside of the plurality of image output devices (or measured in the mobile terminal). Therefore, the present invention can provide the user with a screen without a sense of difference by adjusting the image qualities of the plurality of image output devices.

Hereinafter, description will be given in more detail of a method for controlling a mobile terminal and an image output device according to one embodiment of the present invention, including the contents described in FIGS. 4 and 5, with reference to the accompanying drawings. First, an overall control method according to one embodiment of the present invention will be described with reference to FIG. 6. FIG. 6 is a flowchart illustrating an image quality adjusting method according to one embodiment of the present invention.

As described above, image output devices according to one embodiment of the present invention can independently perform data transmission and reception with the mobile terminal, or adjust the image qualities by themselves.

Meanwhile, when the image output device is connected to a control device and controlled by the control device (for example, when the image output device corresponds to a monitor and the control device corresponds to a main body (PC)), the contents described for the image output device and contents to be described for the image output device hereinafter may be applied to the control device (for example, the main body (PC)) in the same/like manner.

First, the image quality adjustment of the plurality of image output devices 200 using the mobile terminal 100 according to the one embodiment of the present invention may be performed through an image quality adjustment related application. The image quality adjustment related application may include a function of transmitting and receiving data and control commands between the mobile terminal 100 and the image output devices 200. In addition, the image quality adjustment related application may be implemented as at least one user interface for each stage performed during the image quality adjustment of the plurality of image output devices 200.

The image quality adjustment related application may perform different operations (functions) according to a target in which the application is installed (stored). For example, the image quality adjustment related application installed in the mobile terminal 100 and the image quality adjustment related application installed in the image output device 200 may perform different operations.

In other words, the mobile terminal 100 and the plurality of image output devices 200 may execute the image quality adjustment related applications based on a user request. The image quality adjustment related applications may be received from a server or installed in the mobile terminal 100 and the plurality of image output devices 200 through portable recording media such as USB, USIM, SD card, CD, and the like.

If the image quality adjustment related application is installed only in the image output device 200 and not installed in the mobile terminal 100, the image output device 200 may output thereon a barcode (for example, a QR code) including link information installable in the mobile terminal.

The controller 180 of the mobile terminal 100 may output a preview image on the display unit 151 by activating the camera, and output an image corresponding to the barcode on the preview image based on a user request. The controller 180 may extract the link information using an image corresponding to the barcode, and receive (download) the image quality adjustment related application from an external device (e.g., a server) using the extracted link information.

When the image quality adjustment related applications are executed on the mobile terminal 100 and the plurality of image output devices 200, a communication-establishing process between the mobile terminal 100 and the plurality of image output devices 200 is executed (S100).

Hereinafter, the method for establishing the communication between the mobile terminal 100 and the plurality of image output devices 200 will be described in more detail with reference to FIGS. 7 and 8.

FIG. 7 is a flowchart illustrating a method of establishing communication between a mobile terminal and a plurality of image output devices according to one embodiment of the present invention, and FIG. 8 is a conceptual diagram illustrating the communication establishment method illustrated in FIG. 7.

The image quality adjustment related applications may be executed on the mobile terminal 100 and the plurality of image output devices 200 (S102).

As described above, the image quality adjustment related application installed in the mobile terminal 100 may be linked with the function of activating the camera. At this time, the controller 180 of the mobile terminal 100 may activate the camera based on the execution of the image quality adjustment related application and output the preview image 310 received through the camera on the display unit 151 (S104). Here, the preview image 310 may be generated based on images corresponding to the plurality of image output devices 200 received through the camera.

On the other hand, the plurality of image output devices 200 may be in a state of being accessed to the same network by user settings. Each of the plurality of image output devices 200 may output thereon a barcode (for example, a QR code) 600a including network information (for example, a network name, a network address (IP address), etc.) related to the accessed network. The barcode 600a may further include information related to the plurality of image output devices 200 accessed to the network (for example, a model name, a serial number, and the like of the image output device).

When the plurality of image output devices 200 are connected to a control device (for example, PC) to perform communication, the barcode 600a may further include information related to the control device (for example, a model name, a serial number, etc. of the control device).

The preview image 310 output on the display unit 151 of the mobile terminal 100 may include an image 600b corresponding to the barcode 600a output on any one of the plurality of image output devices 200 according to a user request. The controller 180 of the mobile terminal 100 may extract information (for example, network information) included in the barcode using the image 600b corresponding to the barcode 600a included in the preview image 310 (S108).

For example, as illustrated in FIG. 8, the barcode 600a including the network information may be output on one (e.g., 200a) of the plurality of image output devices 200. At this time, the preview image 310 output on the display unit 151 of the mobile terminal 100 may include an image 600b corresponding to the barcode. The controller 180 of the mobile terminal may extract the network information using the image 600b corresponding to the barcode.

Thereafter, the controller 180 of the mobile terminal 100 may access the same network as the plurality of image output devices 200 using the extracted network information (S110).

For example, if the plurality of image output devices 200 has accessed the same network (for example, short-range communication network or Wi-Fi), the mobile terminal 100 may access the network accessed by the plurality of image output devices 200 using the extracted network information.

Going back to FIG. 6, an arrangement of the plurality of image output devices are recognized using the mobile terminal (S200).

Hereinafter, a method in which the mobile terminal 100 recognizes the arrangement of the plurality of image output devices 200 will be described in more detail with reference to FIGS. 9 to 10B.

Figure 10A:
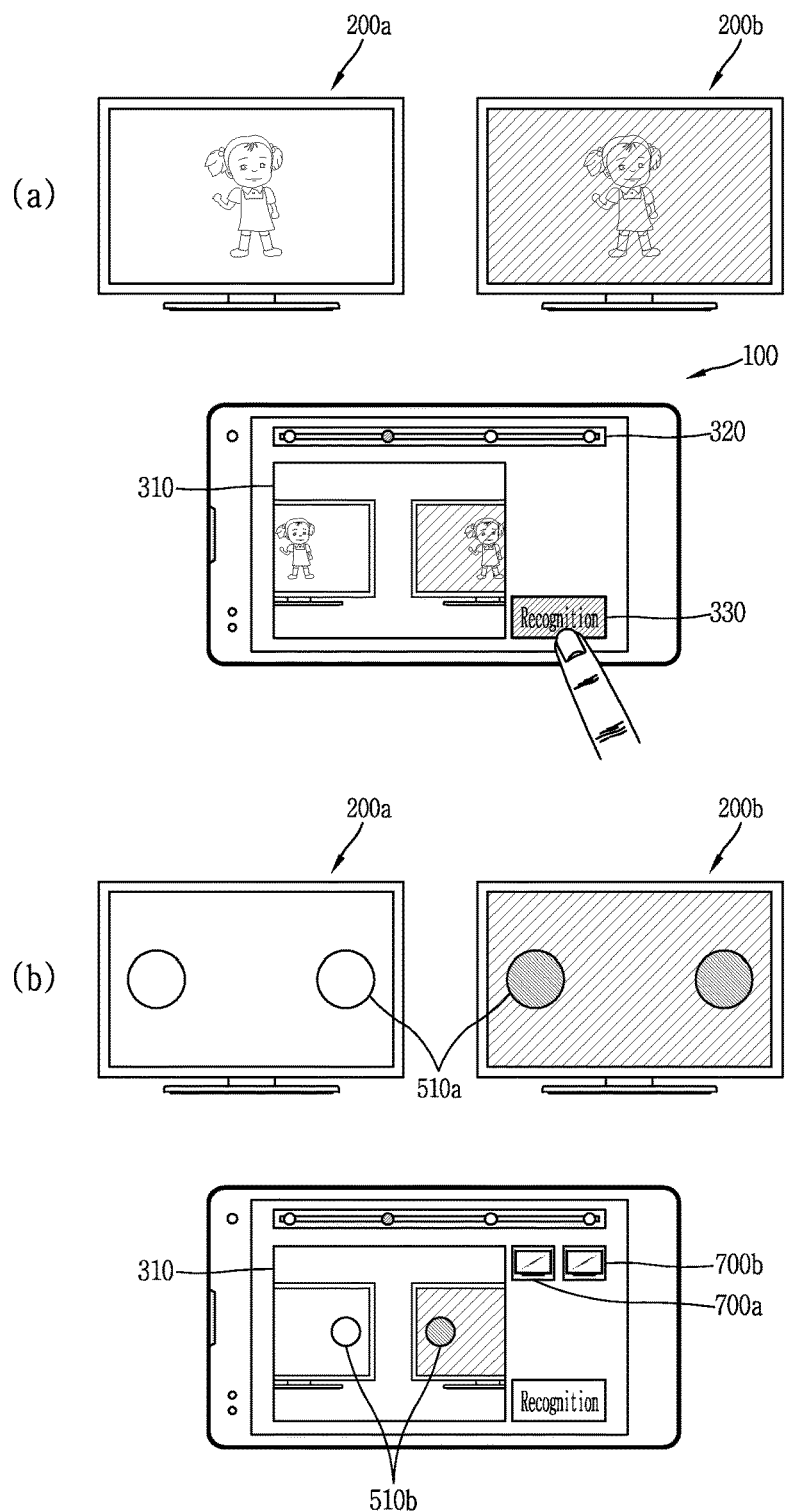
FIGS. 10A and 10B are conceptual views illustrating the method of recognizing the arrangement of the plurality of image output devices illustrated in FIG. 9.

FIG. 9 is a flowchart illustrating a method in which a mobile terminal recognizes an arrangement of a plurality of image output devices according to one embodiment of the present invention. FIGS. 10A and 10B are conceptual views illustrating the method of recognizing the arrangement of the plurality of image output devices illustrated in FIG. 9.

The mobile terminal 100 according to the present invention may recognize the arrangement of the plurality of image output devices 200 for selecting an image output device corresponding to an image quality adjustment target or one image output device as a reference image output device for the image quality adjustment, from the plurality of image output devices 200 (S200).

To this end, the mobile terminal 100 may sense a user request for recognizing the arrangement of the plurality of image output devices (S202). A button 330 linked with a function of recognizing the arrangement of the plurality of image output devices may be output on the display unit 151 of the mobile terminal 100. The user request may be a selection of (or a touch applied to) the button 330.

For example, as illustrated in (a) of FIG. 10A, the display unit 151 of the mobile terminal may output thereon at least one of a preview image 310 received through the camera, a progress bar 320 for guiding a step of adjusting image quality, and the button 330 linked with the function of recognizing the arrangement of the plurality of image output devices.

When the user request is applied, the controller 180 of the mobile terminal may request the plurality of image output devices to output graphic objects (S204).

In response to the request, each of the plurality of image output devices 200a and 200b may output a graphic object 510a having a different color or shape (S206). Specifically, a graphic object having a first shape may be output on the first image output device 200a of the plurality of image output devices 200, and a graphic object having a second shape different from the first shape may be output on the second image output device 200b.

Here, having different shapes may include not only a case where the shapes of the graphic objects are different but also a case where the graphic objects have different colors (brightness, saturation, etc.).

For example, as illustrated in (a) of FIG. 10A, when the button 330 linked with the function of recognizing the arrangement of the plurality of image output devices is touched, the controller 180 of the mobile terminal may request the plurality of image output devices 200a and 200b to output the graphic objects 510a. Each of the plurality of image output devices 200a and 200b, as illustrated in (b) of FIG. 10A, may then output the graphic object 510a, in response to the request. In this instance, each of the plurality of image output devices 200a and 200b may output the graphic object 510a having a different color or shape.

Figure 10B:
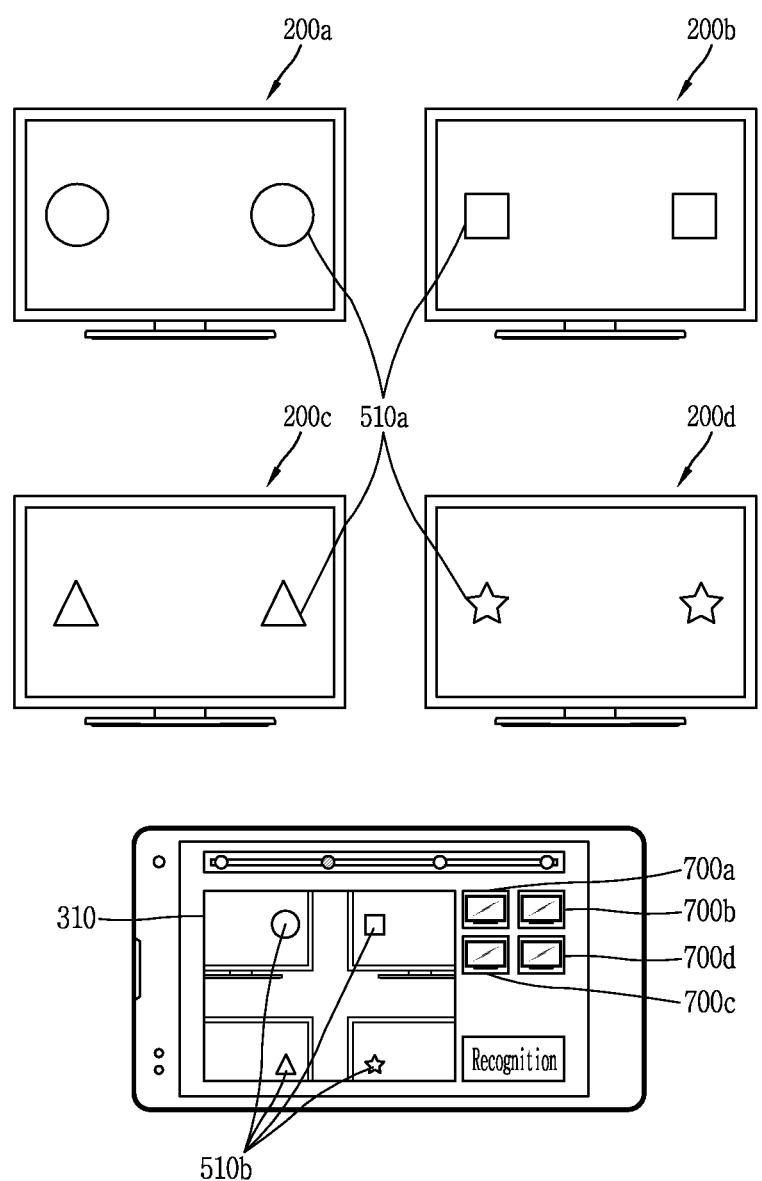

As illustrated in (b) of FIG. 10A, the graphic objects 510a having the different colors or shapes output on the plurality of image output devices 200a and 200b may have different colors from each other, or as illustrated in FIG. 10B, may have different shapes.

When the graphic objects having the different shapes are output on the plurality of image output devices 200, images corresponding to the graphic objects may be output on the preview image 310 which is output on the mobile terminal.

The controller 180 of the mobile terminal may then recognize the arrangement of the plurality of image output devices using the images 510b corresponding to the graphic objects included in the preview image 310 (S208). For example, when an image corresponding to a graphic object having a first shape is output at a left side and an image corresponding to a graphic object having a second shape is output at a right side on the preview image 310, the controller 180 of the mobile terminal may recognize (or determine) that the image output device 200a which has output the graphic object having the first shape is arranged at the left side and the image output device 200b which has output the graphic object having the second shape is arranged at the right side.

Afterwards, the controller 180 of the mobile terminal may output a plurality of icons corresponding to the plurality of image output devices on the display unit 151 to correspond to the recognized arrangement (S210). More specifically, when recognizing the arrangement of the plurality of image output devices 200, the controller 180 of the mobile terminal may recognize a number of the plurality of image output devices 200 using a number of graphic objects 510a having different colors or shapes, and output icons 700 as many as the number. In addition, the controller 180 of the mobile terminal may decide output positions of the plurality of icons 700 based on the arrangement of the plurality of image output devices recognized through the images 510b corresponding to the graphic objects.

As another example, the plurality of icons 700 may be output in advance before recognizing the arrangement of the plurality of image output devices 200. In this case, the number of the plurality of icons 700 may be decided based on the number of the plurality of image output devices 200 accessed to the same network while performing the communication establishment. If the plurality of icons 700 are output before the recognition of the arrangement, when the arrangement recognition process is performed, the controller 180 of the mobile terminal may link the plurality of image output devices 200 with the plurality of icons 700, and move the plurality of icons 700 for output so as to correspond to the arrangement of the plurality of image output devices 200 recognized in the arrangement recognition process.

As illustrated in (b) of FIG. 10A, the plurality of icons 700a and 700b may be linked with the plurality of image output devices 200a and 200b, respectively. Specifically, the first icon 700a of the plurality of icons may be linked with the first image output device 200a, and the second icon 700b may be linked with the second image output device 200b.

Furthermore, the plurality of icons 700a and 700b may be output to correspond to the arrangement of the plurality of image output devices 200a and 200b. For example, as illustrated in FIG. 10B, the controller 180 of the mobile terminal may output a plurality of icons 700a, 700b, 700c, and 700d on the basis of a number of a plurality of image output devices 200a, 200b, 200c, and 200d determined through graphic objects 510a having different colors or shapes. The controller 180 of the mobile terminal may output the plurality of icons 700a, 700b, 700c, and 700d to correspond to arranged positions of the plurality of image output devices 200a, 200b, 200c, and 200d, respectively.

On the other hand, although not illustrated, when a number of a plurality of image output devices is preset (for example, user setting or pre-recognition during a communication establishment process), an indicator corresponding to a graphic object output on each of the image output devices may be output on the preview image of the mobile terminal. When the graphic objects are output on the plurality of image output devices based on a user request, the controller 180 of the mobile terminal may recognize an arrangement of the plurality of image output devices, in response to the indicators overlapping images corresponding to the graphic objects output on the plurality of image output devices.

Accordingly, the present invention can solve the related art problem that the mobile terminal 100 fails to recognize the arrangement of the plurality of image output devices 200 only by the established communication even when the mobile terminal 100 and the plurality of image output devices 200 establish the communication therebetween. Also, the user can more intuitively recognize the arranged positions of the plurality of image output devices through the mobile terminal, and select an image output device corresponding to an image quality adjustment target or one image output device as a reference image output device of the plurality of image output devices more conveniently based on the recognition.

Going back to FIG. 6, image quality information related to each of the plurality of image output devices is extracted using the mobile terminal (S300).

Hereinafter, the method in which the mobile terminal 100 recognizes an arrangement of the plurality of image output devices 200 will be described in more detail with reference to FIGS. 11 to 13B.

Figure 12:
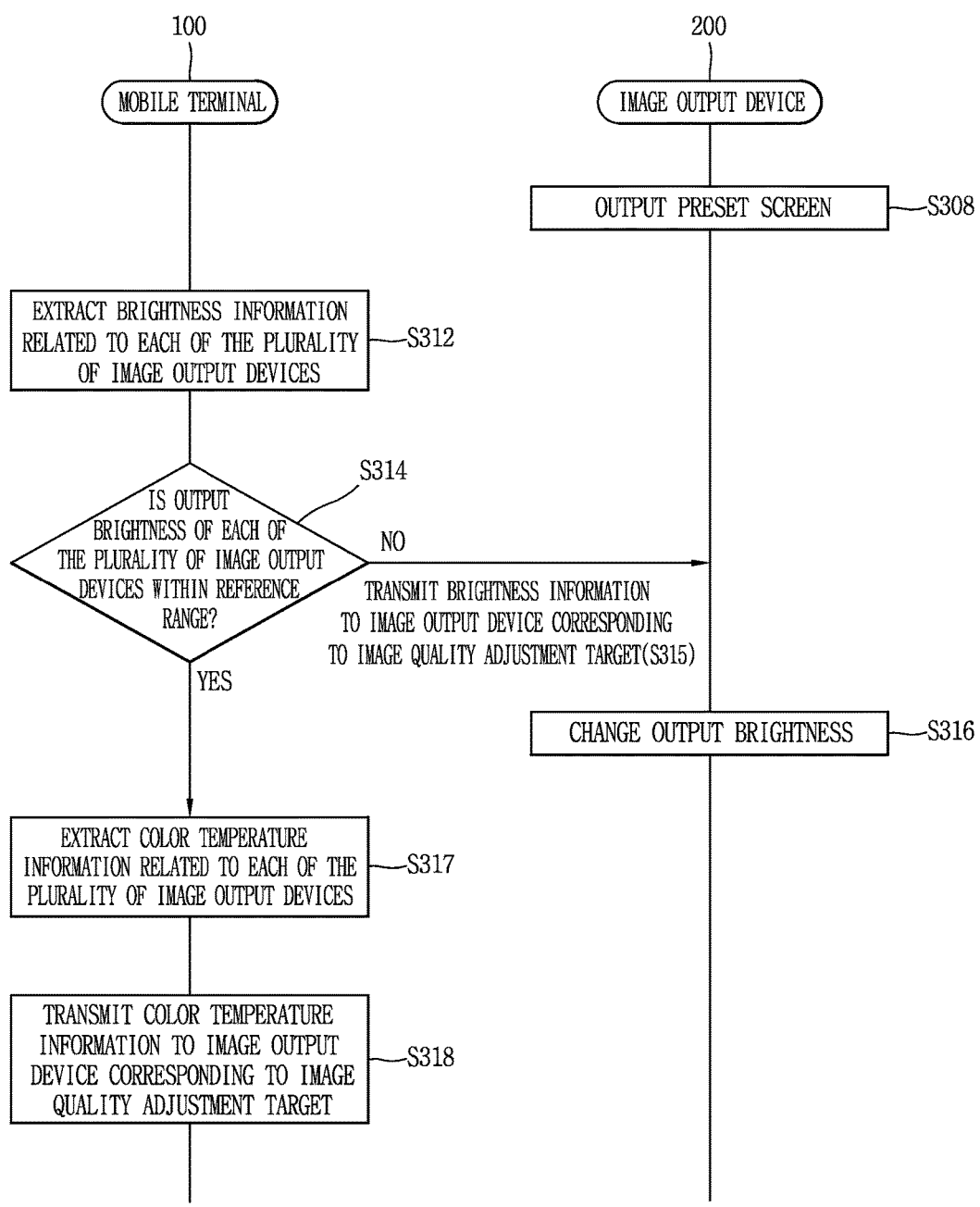
Figure 13B:
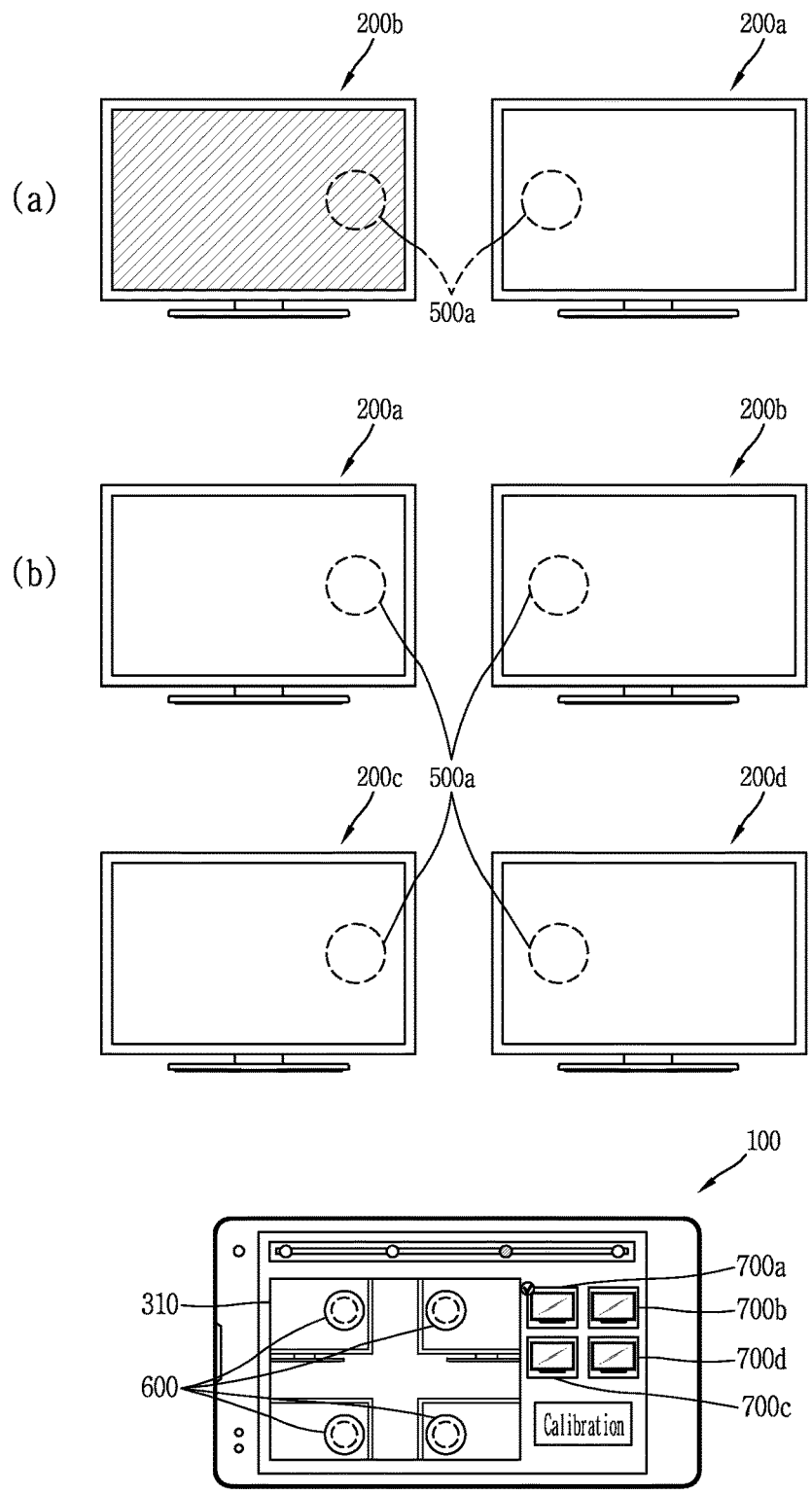

FIGS. 11 and 12 are flowcharts illustrating a method of extracting image quality information related to each of a plurality of image output devices using a mobile terminal according to one embodiment of the present invention, and FIGS. 13A and 13B are conceptual views illustrating the image quality information extracting method illustrated in FIGS. 11 and 12. In the mobile terminal of the present invention, one image output device that is a reference device for adjusting image quality or at least one image output device corresponding to an image quality adjustment target is selected from the plurality of image output devices (S302).

The one image output device which is the reference device for the adjusting the image quality or the at least one image output device corresponding to the image quality adjustment target may be selected through the plurality of icons 700 output in steps S200 to S210.

For example, as illustrated in FIG. 13A, when one icon 700*a* of the plurality of icons 700*a* and 700*b* output on the display unit 151 of the mobile terminal is selected, the controller 180 of the mobile terminal may select the image output device 200*a* corresponding to the selected icon 700*a* as the image output device serving as the reference for adjusting the image quality or the image output device corresponding to the image quality adjustment target.

Whether the image output device corresponding to the selected icon is either the image output device serving as the reference for adjusting the image quality or the image output device corresponding to the image quality adjustment target may be decided according to a user setting.

As another example, as illustrated in (b) of FIG. 13B, when at least three image output devices are present, at least three icons may be output on the display unit 151 of the mobile terminal. In this case, if any one of the at least three icons is selected, the controller 180 of the mobile terminal may select an image output device corresponding to the selected icon as the image output device serving as the reference for adjusting the image quality. On the other hand, when at least two icons among the three icons are selected, the controller 180 of the mobile terminal may select image output devices corresponding to the selected at least two icons as the image output device corresponding to the image quality adjustment target.

Afterwards, the mobile terminal receives an image quality information extraction request (S304). The display unit 151 of the mobile terminal may output a button linked with an image quality information extraction function. The image quality information extraction request may be a touch applied to the button.

When the image quality information extraction request is applied, the controller 180 of the mobile terminal may request for screen switching from the plurality of image output devices 200 (S306). The screen switching request may be understood to request for the output of the preset screen 400 used for the image quality extraction.

Each of the plurality of image output devices 200 which has received the screen switching request may output a preset screen to be used for the image quality information extraction (S308). As described above, the preset screen 400 may be implemented in various forms, for example, a white screen.

For example, the preset screen 400 may be a screen which is output in a state that RGB signals of the image output device 200 are set to 255, respectively (for example, (R, G, B)=(255, 255, and 255)). In this case, the plurality of image output devices 200 may output the preset screens having different image qualities, respectively, according to panel characteristics.

As another example, the preset screen 400 may be a white screen that is output as a file (data) formed by the same algorithm is executed. In this case, even if the preset screen is output by the same file, the plurality of image output devices 200 may output the preset screens having the different image qualities according to settings made in the plurality of image output devices.

A graphic object 500*a* may be output on each preset screen 400. The graphic object 500 may serve to guide the image quality information extraction area. Meanwhile, an indicator 600 corresponding to each graphic object may be output on the preview image 310 of the mobile terminal 100.

Output positions of the graphic objects 500*a* each guiding the image quality information extraction area may be decided based on the arranged positions of the plurality of image output devices. For example, as illustrated in FIG. 13A, when the first image output device 200*a* is arranged at a left side of the second image output device 200*b*, the graphic object 500*a* output on the first image output device 200*a* may be output on a right portion of the display unit of the first image output device. On the other hand, as illustrated in (a) of FIG. 13B, when the first image output device 200*a* is arranged at a right side of the second image output device 200*b*, the graphic object 500*a* output on the first image output device 200*a* may be output on a left portion of the display unit of the first image output device.

The output position of the graphic object in the image output device may be decided based on the screen switching request transmitted from the mobile terminal to the plurality of image output devices. Specifically, the screen switching request may include information related to the output position of the graphic object. The image output device which has received the screen switching request may output the graphic object based on the information related to the output position of the graphic object.

In addition, the indicator 600 output on the preview image 310 of the mobile terminal may be arranged at a position where the indicator 600 can correspond to each graphic object. The position to correspond to the graphic object indicates a position to correspond to the image 500*b* with respect to the graphic object included in the preview image 310.

For example, as illustrated in FIG. 13A, when the graphic objects 500*a* each guiding the image quality information extraction area are output on the preset screens 400 output on the plurality of image output devices, the preview image 310 of the mobile terminal may output thereon the images 500*b* corresponding to the graphic objects 500*a*. Here, the indicators 600 output on the preview image 310 of the mobile terminal may be output at positions to correspond to the images 500*b* with respect to the graphic objects.

As another example, as illustrated in (b) of FIG. 13B, the output positions may be decided based on a number and an arrangement of the plurality of image output devices 200*a* to 200*d*.

As illustrated in (b) of FIG. 13B, when there are at least three image output devices 200*a* to 200*d* (e.g., four), the preview image 310 of the mobile terminal may display thereon a plurality of indicators 600 (e.g., four) to correspond to the number of the plurality of image output devices. The plurality of indicators 600 may be output at positions to correspond to graphic objects output on the plurality of image output devices, that is, at positions to correspond to the images with respect to the graphic objects included in the preview image.

The output positions of the indicators 600 may correspond to the output positions of the images 510*b* with respect to the graphic objects 510*a* having different colors or shapes which the mobile terminal uses to recognize the arrangement of the plurality of image output devices in steps S200 to S210. In detail, the graphic object 500*a* guiding the image quality information extraction area may be output to correspond to at least one of the output positions of the graphic objects 510*a* having the different shapes, which are output to recognize the arrangement of the plurality of image output devices. In this instance, the controller 180 of the mobile terminal may decide the positions of the images 510*b* corresponding to the different graphic objects in the preview image 310. Afterwards, the controller 180 of the mobile terminal may output the indicators 600 at the decided positions when the image quality information extraction request is applied.

Afterwards, when the indicators output on the preview image 310 overlap the images corresponding to the graphic objects included in the preset screens, the image quality information related to each of the plurality of image output devices is extracted (S310).

The controller 180 of the mobile terminal may extract the image quality information related to each of the plurality of image output devices using the images 300a and 300b corresponding to the plurality of image output devices included in the preview image 310 received through the camera.

Specifically, when the preset screens 400 used for extracting the image quality information are output on the plurality of image output devices 200a and 200b, respectively, based on the user request (image quality information extraction request), the controller 180 of the mobile terminal may extract the image quality information from each of the preset screens included in the preview image 310.

As aforementioned, the graphic objects 500a each guiding the image quality information extraction area may be output one the preset screens 400 of the plurality of image output devices 200a and 200b, and the indicators 600 corresponding to the graphic objects 500a may be output on the preview image 310 of the mobile terminal. The controller 180 of the mobile terminal may extract the image quality information related to each of the plurality of image output devices, on the basis of whether the indicators 600 overlap the images 500b corresponding to the graphic objects 500a output on the plurality of image output devices.

Here, the extracted image quality information may refer to information extracted using the images 300a and 300b corresponding to the plurality of image output devices.

The controller 180 of the mobile terminal may transmit the extracted image quality information to an image output device corresponding to the image quality adjustment target among the plurality of image output devices (S320).

Hereinafter, a method of extracting image quality information related to each of a plurality of image output devices and a control method of the mobile terminal and the image output devices will be described in more detail with reference to FIG. 12.

As illustrated in FIG. 11, the plurality of image output devices 200 may output the preset screens each including the graphic object that guides the image quality information extraction area, based on the screen switching request of the mobile terminal (S308).

Then, the controller 180 of the mobile terminal may extract the image quality information related to each of the plurality of image output devices based on the fact that the indicators 600 overlap the images corresponding to the graphic objects output on the plurality of image output devices.

Here, the image quality information may include at least one of brightness information, color temperature information, RGB pixel values, contrast information, sharpness information, and saturation information. Specifically, the controller 180 of the mobile terminal may extract brightness information, color temperature information, RGB pixel values, contrast information, sharpness information, saturation information, and the like from the images corresponding to the preset screens of the plurality of image output devices included in the preview image.

The controller 180 may extract the image quality information related to each of the plurality of image output devices, in response to the indicators 600 overlapping the images corresponding to the graphic objects included in the preview image 310. Specifically, the controller 180 may process the overlap between the indicator 600 and the image 500b corresponding to the graphic object 500a as an image quality information extraction command.

First, in the mobile terminal, brightness information related to each of the plurality of image output devices may be extracted using the preset screen output on each of the plurality of image output devices (S312). Here, the controller 180 of the mobile terminal may determine backlight brightness of each of the plurality of image output devices by extracting the brightness information related to each of the plurality of image output devices.

Specifically, the preset screen may be a screen output by the same RGB output signals. At this time, even though the plurality of image output devices 200 output signals (the preset screens) each having the same RGB output ratio, the plurality of image output devices may have different color temperatures due to the difference of the backlight brightness (output brightness). For example, when an RGB output ratio of an image output device is 1:1:1 and backlight brightness is 100, the image output device may have a color temperature of a first value. However, when an RGB output ratio of an image output device is 1:1:1 and backlight brightness is 50, the image output device may have a color temperature of a second value different from the first value.

Therefore, in the present invention, the brightness information related to each of the plurality of image output devices may be extracted in order to adjust the image qualities (e.g., white balances) in a state where each of the plurality of image output devices has backlight brightness within a reference range.

Afterwards, the mobile terminal may determine whether the output brightness of each of the plurality of image output devices is within the reference range (S314).

The controller 180 of the mobile terminal may extract the RGB pixel values of each of the plurality of image output devices using the images corresponding to the preset screens of the plurality of image output devices included in the preview image. Here, the extracted RGB pixel values are RGB pixel values extracted through the images corresponding to the preset screens included in the preview image of the mobile terminal, and may be different from RGB pixel values actually output on the plurality of image output devices. This is because the RGB pixel values output on the plurality of image output devices may be measured differently from the outside according to the backlight brightness.

The controller 180 of the mobile terminal may determine whether the output brightness of each of the plurality of image output devices 200 is within the reference range based on the extracted RGB pixel values. For example, the controller 180 of the mobile terminal may determine whether the output brightness of each of the plurality of image output devices is within the reference range, based on a value extracted by multiplying the extracted brightness information (extracted RGB values) from each of the plurality of image output devices by a preset value (or a matrix) used for determining the backlight brightness.

When the output brightness of at least one of the plurality of image output devices is out of the reference range according to the determination result in step S314, the controller 180 of the mobile terminal may transmit the brightness information or brightness correction data corresponding to the brightness information to the at least one image output device having the output brightness out of the reference range. In other words, when the output brightness of the at least one of the plurality of image output devices is out of the reference range, the controller 180 of the mobile terminal may transmit the extracted brightness information or the brightness correction data to the at least one image output device such that the at least one image output device has brightness within the reference range.

The brightness information may be brightness information related to each of the plurality of image output devices. Also, the brightness correction data corresponding to the brightness information may be a brightness difference value between brightness information related to one image output device corresponding to a reference device and brightness information related to an image output device corresponding to an image quality adjustment target. That is, the controller 180 of the mobile terminal may determine whether or not the output brightness of each of the plurality of image output devices is within the reference range, based on the image output device that serves as the reference of the image quality adjustment among the plurality of image output devices.

When the brightness information or the brightness correction data is received, the image output device (e.g., the image output device corresponding to the image quality adjustment target) may adjust the output brightness based on the received brightness information or brightness correction data. Specifically, the image output device 200 which has received the brightness information may adjust brightness of its backlight so as to have the brightness within the reference range on the basis of the output brightness of the image output device as the reference for the image quality adjustment.

When the output brightness of the plurality of image output devices is within the reference range, steps S315 and S316 may be omitted.

Afterwards, the mobile terminal may extract the color temperature information using the images corresponding to the plurality of image output devices in the state that each of the plurality of image output devices has the brightness within the reference range (S317).

Specifically, the controller 180 of the mobile terminal may extract the color temperature of each of the plurality of image output devices 200 using the images corresponding to the preset screens 400 included in the preview image 310.

Afterwards, the controller 180 of the mobile terminal may transmit the extracted color temperature information to the image output device corresponding to the image quality adjustment target (S318). Specifically, the controller 180 of the mobile terminal may extract the color temperature information related to each of the plurality of image output devices 200, and transmit the color temperature information to at least one of the plurality of image output devices corresponding to the image quality adjustment target.

That is, in step S320, the image quality information transmitted to the at least one image output device corresponding to the image quality adjustment target may be the color temperature information extracted using the images corresponding to the plurality of image output devices in step S318.

With such a configuration, according to the present invention, image quality information can be extracted by the mobile terminal (outside the image output device). Also, according to the present invention, the user can extract image quality information related to each of a plurality of image output devices as long as indicators included in the preview image correspond to images of graphic objects output on the image output devices, and transmit the extracted image quality information to an image output device corresponding to an image quality adjustment target, thereby enhancing user convenience.

Going back to FIG. 6, the image output device may adjust the image quality thereof using the image quality information (S400).

Hereinafter, a method in which an image output device adjusts image quality thereof based on image quality information will be described more specifically with reference to the accompanying drawings.

FIG. 14 is a flowchart illustrating a method of adjusting image quality by an image output device according to one embodiment of the present invention.

An image output device 200 corresponding to an image quality adjustment target may receive image quality information or image quality correction data corresponding to the image quality information from the mobile terminal (S402).

The image quality information may include at least one of brightness information, color temperature information, RGB pixel values, contrast information, sharpness information, and saturation (hue) information related to a plurality of image output devices.

The image output device corresponding to the image quality adjustment target may adjust an RGB output ratio based on the image quality information (S404). In detail, the image output device 200 corresponding to the image quality adjustment target may adjust the RGB output ratio based on the received image quality information, when the image quality information is received from the mobile terminal 100.

The received image quality information may include image quality information related to each of the plurality of image output devices, that is, image quality information extracted through each of images corresponding to preset screens of the plurality of image output devices included in a preview image of the mobile terminal.

The image quality information may include color temperature information related to each of the plurality of image output devices. For example, the image quality information may include color temperature information related to an image output device, which is a reference of an image quality adjustment among the plurality of image output devices, and color temperature information related to the image output device corresponding to the image quality adjustment target.

That is, a white balance of the image output device 200 corresponding to the image quality adjustment target may be adjusted to correspond to a white balance of the reference image output device of the plurality of image output devices, through an image quality adjustment function.

For example, when the color temperature of the image output device corresponding to the image quality adjustment target is higher than the color temperature of the reference image output device, the image output device corresponding to the image quality adjustment target emits more bluish light than the reference image output device. In this instance, the image output device corresponding to the image quality adjustment target may decrease an output of a Blue (B) signal among the RGB signals or increase an output of a Red (R) signal so as to lower the color temperature.

On the other hand, when the color temperature of the image output device corresponding to the image quality adjustment target is lower than the color temperature of the reference image output device, the image output device corresponding to the image quality adjustment target emits more reddish light than the reference image output device. In this instance, the image output device corresponding to the image quality adjustment target may increase the output of the B signal among the RGB signals or decrease the output of the R signal so as to increase the color temperature.

Adjusting the RGB output ratio described above may be understood to change a gain of each of the RGB signals.

However, the present invention is not limited to this, and the image output device 200 corresponding to the image quality adjustment target may alternatively control at least one of R, G, and B signals so as to correspond to the color temperature of the reference image output device.

Afterwards, the image output device 200 corresponding to the image quality adjustment target adjusts brightness based on the adjusted RGB output ratio (S406).

In detail, the image output device 200 corresponding to the image quality adjustment target may perform the image quality adjustment function by adjusting the RGB output ratio based on the image quality information (color temperature information). In this instance, when the RGB output ratio is adjusted, the brightness (or brightness) of the image output device 200 can be changed.

In this instance, the image output device 200 corresponding to the image quality adjustment target may adjust (control) backlight brightness based on the adjusted RGB output ratio. Here, the image output device 200 corresponding to the image quality adjustment target may decide a degree of brightness to be adjusted by applying preset weights related to the RGB output values.

Each of R, G, and B signals has a different brightness characteristic depending on an inherent color. Accordingly, brightness that the R signal outputs at a specific signal value and brightness that the G or B signal outputs at the specific signal value may be different from each other.

The image output device 200 corresponding to the image quality adjustment target may decide the degree of the backlight brightness to be adjusted by adjusting preset weight values associated with the RGB output values.

For example, it is assumed that the preset weights for R, G, and B are 2:7:1. When the RGB output ratio before adjustment is 1:1:1, the image output device 200 may multiply the RGB output ratio (1:1:1) before the adjustment by the preset weights (2:7:1) and add the multiplied values so as to obtain a specific value. Here, the specific value may be a value associated with brightness (luminance) of the image output device. When the calculation is executed ($1*2+1*7+1*1=10$), the brightness before the adjustment of the RGB output ratio may be 10.

Meanwhile, the image output device corresponding to the image quality adjustment target may adjust the RGB output ratio so as to have the color temperature of the image output device as the reference for the image quality adjustment.

For example, the RGB output ratio of the image output device 200 corresponding to the image quality adjustment target may be changed from 1:1:1 to 1:0.5:1.

In this instance, the image output device 200 corresponding to the image quality adjustment target may adjust the RGB output ratio by multiplying the changed RGB output ratio (1:0.5:1) by the preset weights (2:7:1), thereby calculating a value associated with the brightness (luminance) of the image output device ($1*2+0.5*7+1*1=7.5$).

The image output device 200 corresponding to the image quality adjustment target may decide a degree of the brightness to be adjusted based on the brightness (e.g., 10) before the adjustment of the RGB output ratio and the brightness (e.g., 7.5) after the adjustment of the RGB output ratio.

In this instance, the image output device 200 corresponding to the image quality adjustment target may increase the backlight brightness by a value corresponding to 2.5.

On the other hand, when an output ratio of any one of R, G, and B signals increases, the image output device 200 corresponding to the image quality adjustment target may decide the degree of the brightness to be adjusted by applying the preset weights, and reduce the backlight brightness based on the decided value.

The method of adjusting the brightness or color temperature using the image quality adjustment function of the image output device 200 has been described above. The above description may be applied in the same/like manner to a manner of adjusting various attributes related to image quality, such as RGB pixel values, contrast, sharpness, saturation, etc. Through this process, the image quality adjustment function (color calibration) may be executed with respect to the plurality of image output devices by using the mobile terminal.

Afterwards, preview screens for confirming the image quality adjustment results may be output on the plurality of image output devices 200 after the image quality adjustment (S408). The preview screen may be a specific image (arbitrary image) output on each of the plurality of image output devices 200.

Although not illustrated, when the preview screens are output on the plurality of image output devices, a button linked with a function of terminating the image quality adjustment function or a button linked with a function of performing the image quality adjustment function again may be output on the mobile terminal 100.

Here, when the button linked with the function of performing the image quality adjusting function again is selected, the process may go back to one of steps S300 through S306 to sequentially execute those steps again.

The operations of the image output device 200 described above can be understood to be performed by the controller 250 of the image output device 200. When the plurality of image output devices are connected to a control device and controlled by the control device (e.g., the image output device corresponds to a monitor and the control device corresponds to a main body (computer (PC) or server)), the contents described above in relation to the image output device can be understood to be performed by a controller (e.g., a processor) provided in the control device (e.g., the computer (PC) or the server).

As described above, the present invention can adjust the image qualities of the plurality of image output devices using the mobile terminal. Thus, the present invention can more easily adjust the image qualities of the plurality of image output devices using the mobile terminal, instead of executing complicated processes for adjusting the image qualities of the plurality of image output devices.

In addition, the present invention can adjust the image qualities of the plurality of image output devices based on the image quality information extracted by the mobile terminal (outside the image output device) when the plurality of image output devices have different image qualities according to type and characteristic of a panel of the image output device or a structure, a manufacturing method or an output method of the image output device, in spite of the same output setting. Accordingly, the user can be provided with a screen with no image disturbance due to the difference in image quality when viewing the plurality of image output devices.

Hereinafter, embodiments related to a control method that can be implemented in a mobile terminal configured as above will be described with reference to the accompanying drawings. It will be apparent to those skilled in the art that the present invention may be embodied in other specific forms without departing from the spirit or essential characteristics thereof.

In the following description, referring to the accompanying drawings, when at least two images in one drawing (FIG. N) are shown in the form of 2 by 2, an image shown at an upper left is referred to as "first image," an image shown at an upper right is referred to as "second image," an image shown at a lower right is referred to as "third image," and an image shown at a lower left is referred to as "fourth image."

On the other hand, when at least two images are shown in a row from top to bottom in one drawing (FIG. N), the images are sequentially referred to as "first image, second image, . . . ," starting from a top image.

In the mobile terminal according to one exemplary embodiment of the present invention, which may include at least one of the components as illustrated in FIG. 2, an image (hereinafter, referred to as 'preview image') 310 received through the camera 121 provided in the mobile terminal 100 may be output.

In detail, the mobile terminal 100 of the present invention may generate the preview image 310 based on images corresponding to the plurality of image output devices received through the camera, and display the preview image 310 on the display unit 151.

The preview image 310 may be output on the display unit 151 based on an execution of an application including a function of activating the camera 121. The execution of the application may be performed in response to a selection of (or a touch applied to) an icon of the application.

In addition, the mobile terminal 100 of the present invention may perform an image analysis with respect to the preview image 310 output on the display unit 151. The image analysis may refer to extracting shape information, color information, brightness information, and the like for at least some of the images included in the preview image 310.

The mobile terminal 100 of the present invention may control the plurality of image output devices 200 based on the result of the image analysis.

Specifically, the mobile terminal 100 may transmit and receive data or control commands to and from the plurality of image output devices 200 in an independent manner. Each of the plurality of image output devices 200 may perform a specific function based on the data or control command. The specific function may include changing attribute information such as content output, streaming, image quality, volume, and the like.

On the other hand, when the plurality of image output devices are connected to a control device and controlled by the control device (e.g., when the image output device corresponds to a monitor and the control device corresponds to a main body (PC)), the mobile terminal may transmit and receive data or control commands to and from the control device. Afterwards, the control device may control the plurality of image output devices connected to the control device based on the transmitted and received data or control command.

The image output device 200 according to one exemplary embodiment of the present invention, which may include at least one of the components as illustrated in FIG. 3, may perform communication with the mobile terminal 100. For example, the image output device 200 may perform communication with the mobile terminal 100 independently through a wireless communication unit. The image output device 200 may perform a specific function based on the data or control commands received from the mobile terminal 100.

On the other hand, when the image output device 200 is connected to the control device, the image output device 200 may perform a specific function based on the control of the control device. The control of the control device may be performed based on the data or control commands transmitted and received between the mobile terminal and the control device.

Hereinafter, description will be given of an example in which the image output device 200 and the mobile terminal 100 independently perform communication with each other. The same will be applied in the same/like manner to the case where the communication between the mobile terminal 100 and the control device is performed and the image output device 200 is controlled by the control device.

On the other hand, a content may be output on the image output device 200 of the present invention. The content may include all kinds of data (or screen information) that can be output on the image output device, and may be, for example, an image, a video, a web page, an application, or functions executable on the image output device.

The content may be output on the image output device 200 based on a user request or the control of the control device. Also, the image output device 200 of the present invention may output the content under the control of the mobile terminal 100. In detail, when the content is transmitted from the mobile terminal 100, the transmitted content may be output on the image output device 200. Here, the content output on the image output device 200 may be at least a part of one content.

On the other hand, the plurality of image output devices 200 may be synchronized with each other based on the control of the mobile terminal 100. The synchronization refers to matching execution timing between tasks performed in the plurality of image output devices or matching output information output from the plurality of image output devices with each other.

The image output device 200 may control at least one of streaming, image quality, and volume. The streaming refers to a method of reproducing in real time a content (file), such as video, audio, animation or the like, which has been reproduced by being downloaded in the memory on the Internet. That is, the streaming refers to a method of receiving a part of a content and simultaneously reproducing the received part of the content, other than reproducing the entire content after fully downloading it.

The streaming in the present invention may refer to not only reproducing the content on the Internet in the streaming manner, but also reproducing the content transmitted from the mobile terminal in the streaming manner. In addition, the streaming in the present invention may refer to a reproduction time point of a video. In detail, when one video is reproduced on the plurality of image output devices 200 of the present invention, the reproduction time point of the video reproduced on each image output device 200 may be referred to as streaming. When the reproduction time points (steaming) of the video reproduced on the plurality of image output devices 200 are different from each other, the mobile terminal 100 may control the image output devices with the different reproduction time points of the video, such that the video can be reproduced on the plurality of image output devices at the same reproduction time point.

On the other hand, in the plurality of image output devices 200, synchronization with respect to image quality or volume may be executed based on data or a control command transmitted from the mobile terminal 100. Here, the synchronization with respect to the image quality may refer to controlling the plurality of image output devices to output the video with the same image quality, and the synchronization with respect to the volume may refer to controlling the plurality of image output devices to output the video with the same volume.

Here, the synchronization with respect to the image quality and the synchronization with respect to the volume may be performed on the basis of the mobile terminal. Specifically, the plurality of image output devices may be synchronized with each other so that the image qualities of the plurality of image output devices extracted in the mobile terminal and the volumes of the plurality of image output devices extracted in the mobile terminal can be the same.

For example, even though the first and second image output devices of the plurality of image output devices output the same volume (for example, level 3), when the volumes extracted by the mobile terminal are different (for example, the volume level 3 of the first image output device, and the volume level 2 of the second image output device), the first and second image output devices can be synchronized to have the same volume based on (with respect to) the mobile terminal. In this case, the second image output device may be disposed at a position distant from the mobile terminal rather than the first image output device, and the volume of the second image output device may be increased to be the same as that of the first image output device, measured by the mobile terminal. That is, when the synchronization based on the mobile terminal of the present invention is performed, the plurality of image output devices may have different output values. However, the output values of the plurality of image output devices that are viewed on the basis of the mobile terminal may be the same.

That is, the synchronization described in the present invention may refer to controlling the plurality of image output devices to have the same image quality or volume based on the mobile terminal, on the basis of data (information) measured (extracted) by the mobile terminal.

With this configuration, the plurality of image output devices can be synchronized based on the mobile terminal when the plurality of image output devices output a specific content with different image qualities or volumes due to the arrangement of the plurality of image output devices, a component characteristic (e.g., a panel) of each image output device, and an external factor (e.g., shadow or surrounding object) even though the specific content is output with the same setting value on the plurality of image output devices. Therefore, according to the present invention, the plurality of image output devices can be synchronized based on externally-measured data (information), thereby providing (outputting) the content without any sense of difference to the user through the plurality of image output devices.

Figure 15:
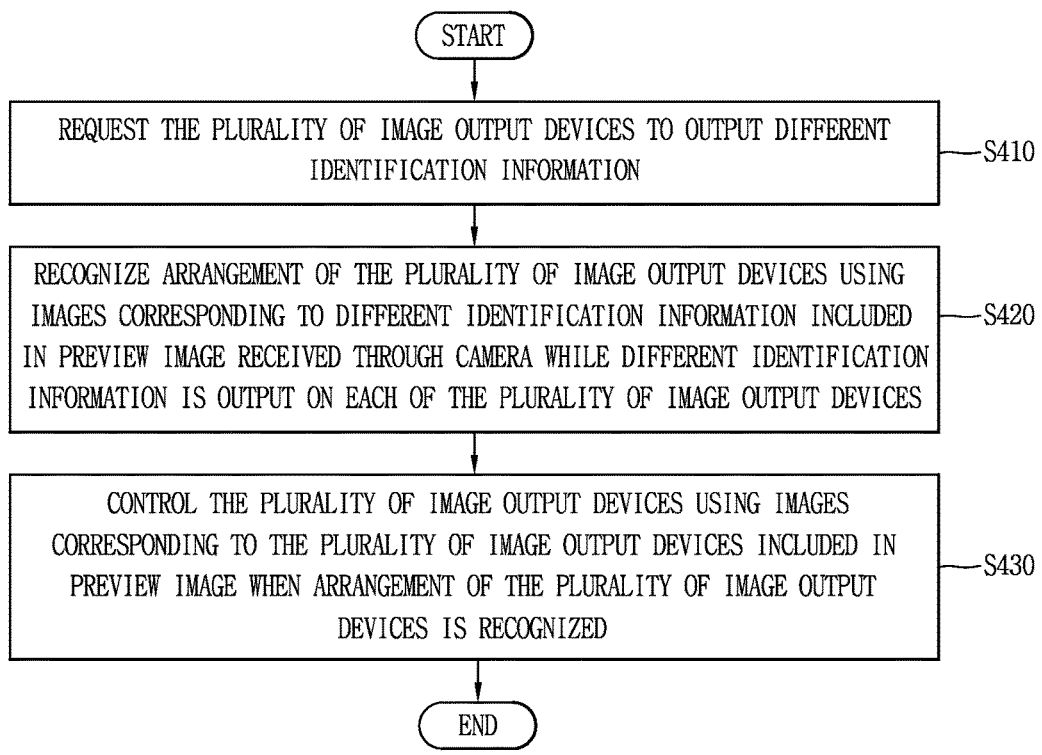
FIG. 15 is a flowchart representatively illustrating a method of controlling a mobile terminal in accordance with another embodiment of the present invention.
Figure 16:
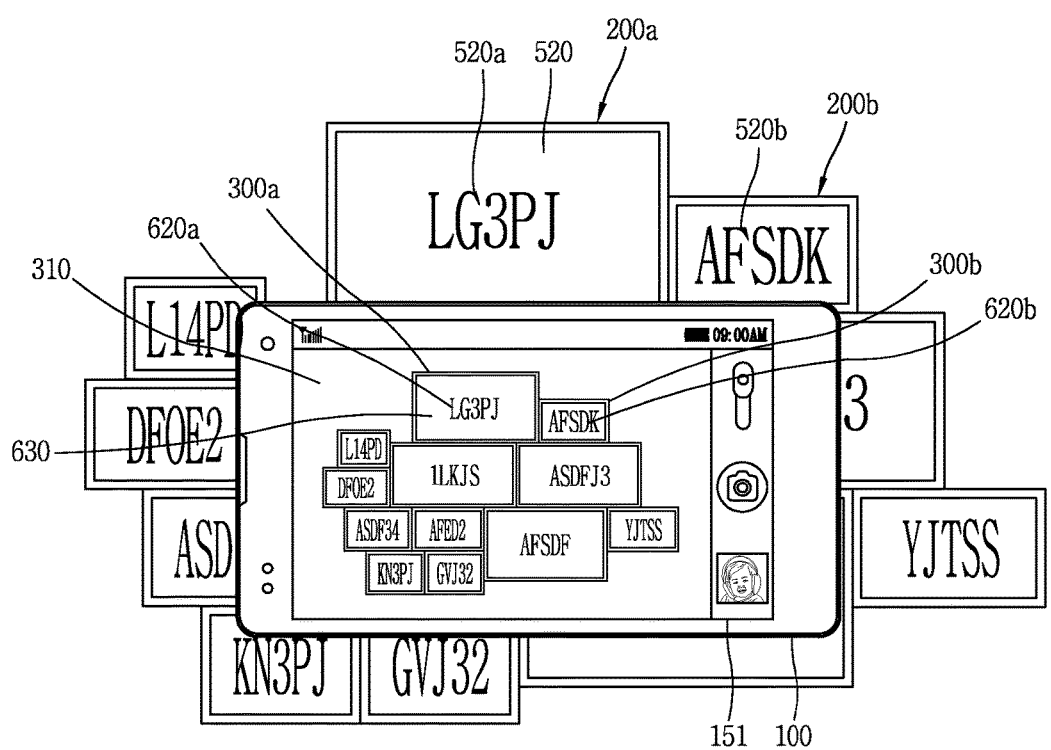
FIG. 16 is a conceptual view of the control method illustrated in FIG. 15.

Hereinafter, a method of controlling a plurality of image output devices using a mobile terminal will be described in more detail with reference to the accompanying drawings. FIG. 15 is a flowchart representatively illustrating a control method of a mobile terminal according to another embodiment of the present invention, and FIG. 16 is a conceptual view illustrating the control method illustrated in FIG. 15.

First, description will be given in detail of a method of recognizing a plurality of image output devices 200 using a mobile terminal 100 to control the plurality of image output devices using the mobile terminal.

The mobile terminal 100 and the plurality of image output devices 200 may access the same network based on user settings. For example, when the plurality of image output devices 200 have accessed the same network (e.g., a short-range communication network or Wi-Fi), the mobile terminal 100 may access the network accessed by the plurality of image output devices 200 on the basis of a user setting.

As another example, each of the plurality of image output devices 200 may output a barcode including network information based on a user request or a request of the mobile terminal. The mobile terminal 100 may extract the network information using a camera (from an image corresponding to the barcode included in the preview image 310) and access the network accessed by the plurality of image output devices using the extracted network information.

Afterwards, in the present invention, a request for outputting different identification information is transmitted to each of the plurality of image output devices 200 (S410). The plurality of image output devices 200 that have received the request for the output of the identification information may be at least two image output devices accessed to the same network as the mobile terminal 100.

The request for the different identification information 520 may be performed in various manners.

For example, when the preview image 310 is output, the controller 180 of the mobile terminal may request the plurality of image output devices 200 to output the different identification information 520, in response to a preset touch being applied to an output area of the preview image 310. The preset touch may be a touch linked with a function of requesting for the output of the identification information from the plurality of image output devices 200, for example, may include a short touch, a long touch, a multi-touch, a drag touch, a flick touch, a pinch-in touch, a pinch-out touch, a swipe touch, a hovering touch, and the like. The controller 180 may request the plurality of image output devices to output the different identification information, in response to the preset touch being applied to images 300 corresponding to the plurality of image output devices 200 included in the preview image 310.

As another example, an icon linked with the function of requesting for the output of the different identification information from the plurality of image output devices 200 may be output on the display unit 151. The icon may overlap the preview image 310 on the display unit 151 or may be output on an area other than the output area of the preview image 310. The controller 180 may request the plurality of image output devices 200 to output the different identification information, in response to a touch being applied to the icon (the icon being selected).

As another example, the mobile terminal 100 may execute an application linked with a function of controlling the image output devices based on a user request. The application may be linked with a function of activating the camera. The controller 180 may activate the camera based on the execution of the application linked with the function of controlling the image output devices and output the preview image 310 received through the camera on the display unit 151. The controller 180 may also request the plurality of image output devices 200 to output the different identification information 520 based on the execution of the application linked with the function of controlling the image output devices.

The identification information 520 refers to information used for recognizing the arrangement of the plurality of image output devices 200. The identification information 520 may be an inherent number of each of the plurality of image output devices, or may be identification information transmitted from the mobile terminal.

For example, when the request for outputting the identification information 520 is received from the mobile terminal 100, the image output devices 200 may output the inherent number of each of the image output devices 200 on the display units 270 of the image output devices. The inherent number of each of the image output devices 200 may be different from each other.

As another example, the image output devices 200 may receive the identification information 520 together with the request for the output of the identification information 520 from the mobile terminal 100. The mobile terminal 100 may transmit the different identification information 520 to the plurality of image output devices 200. Each of the image output devices 200 may output the identification information 520 received from the mobile terminal in response to the request.

Afterwards, in the present invention, in the state that the different identification information 250 is output on each of the plurality of image output devices 200, the mobile terminal 100 may recognize the arrangement of the plurality of image output devices 200 using images corresponding to the different identification information 520 included in the preview image received through the camera 121 (S420).

The preview image 310 output on the display unit 151 of the mobile terminal may output the images 300 corresponding to the plurality of image output devices 200 as the camera 121 provided in the mobile terminal is arranged to face the plurality of image output devices 200.

In this state, when the different identification information 520 is output to each of the plurality of image output devices 200, the preview image 310 may include images 620 corresponding to the different identification information 520 on the images 300 corresponding to the plurality of image output devices.

The controller 180 may recognize (determine) the number and arrangement of the plurality of image output devices 200 by using the images 620 corresponding to the different identification information 520 included in the preview image 310.

In detail, the controller 180 may identify the number of the plurality of image output devices and arranged positions of the plurality of image output devices using the images 620 corresponding to the different identification information 520 included in the preview image 310.

For example, if the number of the images 620 corresponding to the identification information included in the preview image 310 is n, the controller 180 may determine that there are n image output devices 200. In addition, when an image 620a corresponding to a first identification information (e.g., LG3PJ) 520a is output at a first position and an image 620b corresponding to a second identification information (e.g., AFSDK) 520b is output at a second position different from the first position, the controller 180 may recognize that the image output device 200a outputting the first identification information 520a has been arranged at the first position and the image output device 200a outputting the second identification information 520b has been arranged at the second position.

Meanwhile, the identification information 520 may be a graphic object having a different shape or color. For example, the plurality of image output devices 200 may output graphic objects transmitted together with the request for the different identification information from the mobile terminal. Here, the mobile terminal 100 may transmit data (information) related to the output of graphic object having the different shape to each of the plurality of image output devices 200. Alternatively, the mobile terminal 100 may transmit data (information) related to the output of the graphic object having the different color to each of the plurality of image output devices 200. When the image output devices 200 output the graphic objects 520 having the different shapes or colors, respectively, the controller 180 of the mobile terminal 100 may determine the number and positions of the plurality of image output devices 200 using images corresponding to the graphic objects having the different shapes or colors included in the preview image 310.

Thereafter, when the arrangement of the plurality of image output devices 200 is recognized, the mobile terminal may control the plurality of image output devices 200 using the images 300 corresponding to the plurality of image output devices 200 included in the preview image 310 (S430).

For example, the controller 180 may control the plurality of image output devices 200 so that one content is output on the plurality of image output devices 200 in a dividing manner by using the images 300 corresponding to the plurality of image output devices 200.

As another example, the controller 180 may synchronize the plurality of image output devices with each other using the images 300 corresponding to the plurality of image output devices.

A method of dividing one content for output or synchronizing a plurality of image output devices will be described later in more detail with reference to FIGS. 18A to 19D.

The above description may be more clearly understood with reference to FIG. 16.

Referring to FIG. 16, the preview image 310 received through the camera may be output on the display unit 151 of the mobile terminal 100. The preview image 310 may also include images 300a, 300b, . . . , corresponding to the plurality of image output devices 200a, 200b, . . . , as the camera 121 faces the plurality of image output devices 200a, 200b, . . . .

Hereinafter, for the sake of explanation, description will be given of an example in which two image output devices are present. However, the following description is not limited to the case where the plurality of image output devices are two, but may be applied in the same/like manner even to a case where the plurality of image output devices are at least three.

Here, the plurality of image output devices 200a and 200b may belong to the same network as the mobile terminal 100.

The controller 180 of the mobile terminal 100 may request the plurality of image output devices 200a and 200b to output different identification information 520a and 520b. The different identification information 520a and 520b may be output on the plurality of image output devices 200a and 200b, in response to the request. As the identification information 520a and 520b are output on the plurality of image output devices 200a and 200b, the preview image 310 output on the display unit 151 of the mobile terminal 100 may include images 620a and 620b corresponding to the different identification information 520a and 520b.

The controller 180 of the mobile terminal may recognize the arrangement of the plurality of image output devices 200a and 200b using the images 620a and 620b corresponding to the different identification information included in the preview image 310. In detail, the controller 180 may identify the number of the image output devices 200a and 200b and respective positions of the image output devices 200a and 200b based on the images 620a and 620b corresponding to the identification information.

For example, as illustrated in FIG. 16, when the number of the images corresponding to the different identification information included in the preview image 310 is determined to be 12, the controller 180 may recognize that 12 image output devices 200 are arranged. Also, the controller 180 may recognize the arranged position of each of the plurality of image output devices 200, based on the image corresponding to the different identification information. Afterwards, when the arrangement of the plurality of image output devices is recognized, the controller 180 may control the plurality of image output devices 200 using the images 300 corresponding to the plurality of image output devices included in the preview image 310.

Figure 17C:
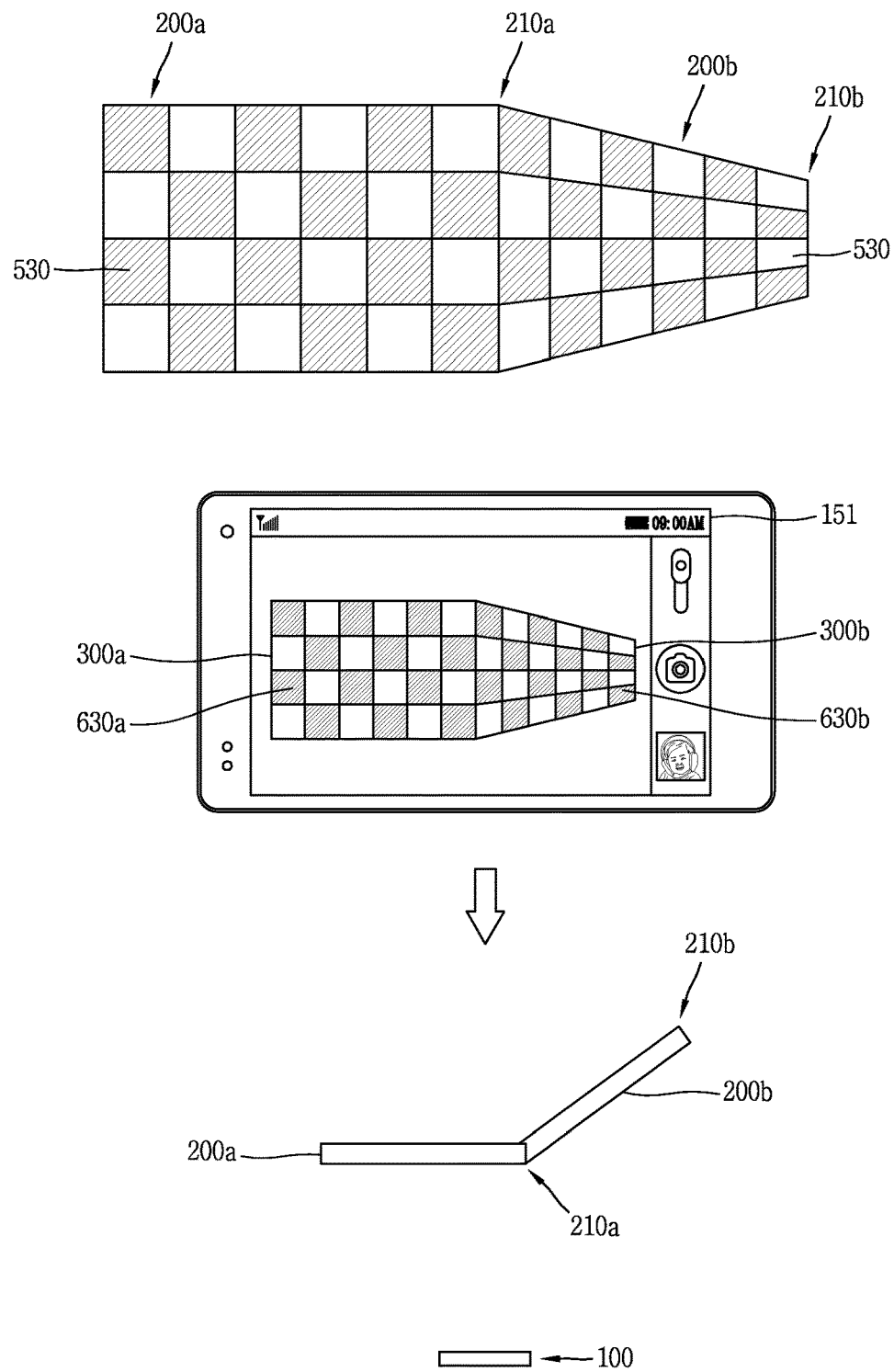

Hereinafter, a method of recognizing an arrangement of a plurality of image output devices will be described more specifically with reference to the accompanying drawings. FIGS. 17A, 17B, and 17C are conceptual views illustrating a method in which a mobile terminal recognizes an arrangement of a plurality of image output devices using images corresponding to the plurality of image output devices included in a preview image.

The controller 180 of the mobile terminal may request each of the plurality of image output devices 200 to output screen information 630 including a preset grid pattern. The screen information 630 including the preset grid pattern may be requested together with the request for the different identification information in step S410.

As another example, the screen information including the preset grid pattern may be understood to be included in the different identification information. That is, when the different identification information is requested in step S410, the plurality of image output devices 200 may output the identification information 520 together with the screen information including the preset grid pattern in an overlapping manner. In this instance, the different identification information 520 may overlap the screen information 530 including the preset grid pattern which has already been output.

The screen information 530 including the preset grid pattern according to one embodiment of the present invention may be used for determining a relative arrangement of the plurality of image output devices or determining arranged postures of the plurality of image output devices. The preset grid pattern refers to a pattern in which vertically and horizontally straight lines intersect with each other at right angles at the same interval. As illustrated in FIG. 17A, the preset grid pattern may be formed in a manner that two colors (e.g., white and black) with a preset color difference are alternately filled (intersect with each other) in figures (e.g., squares) generated by the vertically and horizontally straight lines without overlapping each other.

The same screen information 530 including the preset grid pattern may be output on each of the plurality of image output devices 200. For example, as illustrated in FIG. 17A, the first image output device 200a of the plurality of image output devices 200 may include squares of 6 by 4, and output the screen information 530 including a black grid pattern at (1, 1). At this time, among the plurality of image output devices 200, another image output device (for example, the second image output device 200b) other than the first image output device 200a may include squares of 6 by 4, similar to the screen information 530 output on the first image output device 200a, and output the screen information 530 having the black grid pattern at (1, 1).

Meanwhile, the screen information 530 may include various images to be used for determining the relative arrangement or the arranged postures of the plurality of image output devices. For example, the screen information 530 may include an image in which the same graphic objects (e.g., black circles) are output at preset intervals in up, down, left, and right directions in an n×m matrix configuration.

Hereinafter, description will be given of an example that the screen information 630 includes the preset grid pattern, but the related contents may be applied in the same/like manner even to a case where the various images are included in the screen information.

As the screen image information 530 including the preset grid pattern is output on each of the plurality of image output devices 200, the preview image 310 may include images each corresponding to the screen information 530 including the preset grid pattern.

When the screen information 530 is output on each of the plurality of image output devices 200a and 200b, the controller 180 of the mobile terminal may recognize the relative arrangement of the plurality of image output devices 200 using the images each corresponding to the screen information 530 included in the preview image.

The relative arrangement of the plurality of image output devices 200 refers to the arranged positions of the plurality of image output devices 200 on the basis of the mobile terminal 100. In other words, the relative arrangement of the plurality of image output devices 200 may refer to positions where one and another of the plurality of image output devices are arranged based on the one image output device.

The relative arrangement of the plurality of image output devices 200 may be recognized based on a distance between the mobile terminal 100 and each image output device 200. At this time, as the screen information 530 including the preset grid pattern is output on each of the plurality of image output devices 200, the controller 180 of the mobile terminal 100 may recognize the relative arrangement of the plurality of image output devices 200a and 200b using images 630a and 630b corresponding to the screen information 530 included in the preview image 310.

More specifically, the relative arrangement of the plurality of image output devices 200a and 200b may be recognized based on the size of the grid pattern included in each of the images 300a and 300b corresponding to the plurality of image output devices included in the preview image 310. Here, it is assumed that screen sizes of the plurality of image output devices 200a and 200b are all the same.

For example, when the grid pattern 630a included in the image 300a corresponding to the first image output device 200a of the grid patterns included in the images 300a and 300b corresponding to the plurality of image output devices included in the preview image 310 is greater in size than the grid pattern 630b included in the image 300b corresponding to the second image output device 200b different from the first image output device 200a, the controller 180 of the mobile terminal may recognize that the first image output device 200a is located closer to the mobile terminal 100 than the second image output device 200b.

As illustrated in a first drawing of FIG. 17A, the screen information 530 including the preset grid pattern may be output on each of the plurality of image output devices 200a and 200b having the same screen size based on a request of the mobile terminal. The identification information 520a or 520b may be output on the screen information 530 including the preset grid pattern.

The preview image 310 output on the display unit 151 of the mobile terminal 100 may thus include the images 300a and 300b corresponding to the plurality of image output devices 200a and 200b, the images 620a and 620b corresponding to the different identification information 520a and 520b, and the grid patterns 630a and 630b.

The controller 180 of the mobile terminal 100 may determine the relative arrangement of the plurality of image output devices 200a and 200b, based on the fact that the grid patterns 530 output on the plurality of image output devices 200a and 200b having the same screen size have different sizes on the preview image 310.

Here, the controller 180 of the mobile terminal may extract attribute information from each of the plurality of image output devices that have accessed the same network based on a user setting, and recognize that the plurality of image output devices 200a and 200b have the same screen size.

As illustrated in the first drawing of FIG. 17A, when the size of the grid pattern 630a included in the image 300a corresponding to the first image output device 200a is smaller than the size of the grid pattern 630b included in the image 300b corresponding to the second image output device 200b, the controller 180, as illustrated in a second drawing of FIG. 17A, may recognize that the first image output device 200a is located closer to the mobile terminal 100 than the second image output device 200b. The second drawing of FIG. 17A is a side view of the system including the mobile terminal and the plurality of image output devices according to the present invention.

As described above, the screen information 530 including the preset grid pattern output on each of the plurality of image output devices 200a and 200b may be output based on the request for outputting the different identification information 520 from the mobile terminal or based on a separate output request for the screen information 530 including the preset grid pattern from the mobile terminal. In addition, the identification information 520 and the screen information 530 including the preset grid pattern may be output together.

On the other hand, when the screen sizes of the plurality of image output devices are different from each other, the sizes of the preset grid patterns output on the plurality of image output devices may be different. In this instance, the controller 180 of the mobile terminal 100 may determine that the screen sizes of the plurality of image output devices are different from each other based on a user setting or on attribute information extracted from the plurality of image output devices accessed to the same network.

Meanwhile, in the state where the screen information 530 having the preset grid pattern is output on each of the plurality of image output devices 200a and 200b, the controller 180 of the mobile terminal may determine the postures of the plurality of image output devices 200a and 200b using the images 630a and 630b corresponding to the screen information 530 included in the preview image 310.

For example, as illustrated in a first drawing of FIG. 17B, the first image output device 200a of the plurality of image output devices 200 may be arranged horizontally, and the second image output device 200b different from the first image output device 200a may be arranged vertically. In this instance, the controller 180 of the mobile terminal may determine whether the first and second image output devices 200a and 200b are arranged horizontally or vertically, on the basis of the screen information (the grid patterns 630a and 630b) included in the images 300a and 300b corresponding to the first and second image output devices included in the preview image 310.

More specifically, when the grid pattern 630a included in the image 300a corresponding to the first image output device 200a in the preview image 310 is n×m (for example, 6×4), the controller 180 may determine that the first image output device 200a is placed horizontally. On the other hand, when the grid pattern 630b included in the image 300b corresponding to the second image output device 200b is m×n (e.g., 4×6), the controller 180 may determine that the second image output device 200b is placed vertically.

As another example, in the state where the screen information 530 including the preset grid pattern is output on each of the plurality of image output devices 200a and 200b, the controller 180 of the mobile terminal may determine whether the plurality of image output devices 200a and 200b are arranged in an inclined manner, by using the images 630a and 630b corresponding to the screen information 530 included in the preview image 310.

As illustrated in a first drawing of FIG. 17C, the screen information 530 including the preset grid pattern may be output on each of the plurality of image output devices 200a and 200b based on the request of the mobile terminal 100. In this state, the preview image 310 output on the display unit 151 of the mobile terminal may include the images 300a and 300b corresponding to the plurality of image output devices 200a and 200b, and the images 300a and 300b may include the images 630a and 630b corresponding to the screen information 530.

In this instance, the controller 180 may determine the postures of the plurality of image output devices 200a and 200b using the images 630a and 630b corresponding to the screen information. Specifically, the controller 180 may determine whether or not the plurality of image output devices are arranged in the inclined manner based on the shapes of the grid patterns 630a and 630b included in the image 300a and 300b corresponding to the plurality of image output devices 200a and 200b.

For example, the controller 180 may determine that the first image output device 200a is located in parallel to the mobile terminal 100, on the basis of the fact that a shape of each figure included in the grid pattern 630a included in the image 300a corresponding to the first image output device 200a of the plurality of image output devices is a rectangular shape. The controller 180 may also determine that the second image output device 200b has been inclined from the mobile terminal 100 or the first image output device 200a, on the basis of the fact that a shape of each figure included in the grid pattern 630b included in the image 300b corresponding to the second image output device 200b of the plurality of image output devices is not the rectangular shape.

Here, the controller 180, as illustrated in a second drawing of FIG. 17C, may determine that one side 210a of the second image output device 200b is arranged closer to the mobile terminal than another side 210b of the second image output device 200b, on the basis of that a length (size) of the grid pattern adjacent to the one side 210a of the grid pattern 630b included in the second image output device is longer than (greater than) a length (size) of the grid pattern adjacent to the another side 210b opposite to the one side 210a. That is, the controller 180 may determine that the second image output device 200b is inclined as the another side 210b of the second image output device 200b is getting distant.

The second drawing of FIG. 17C is a planar view of the system including the mobile terminal and the plurality of image output devices according to the present invention.

Meanwhile, although not illustrated, the screen information 530 including the preset grid pattern may further include a graphic object corresponding to an edge. Accordingly, the mobile terminal can more easily distinguish each of the plurality of image output devices by using an image of the graphic object corresponding to the edge.

With this configuration, the present invention can eliminate the related art inconvenience in individually designating (setting) arranged positions of a plurality of image output devices when the plurality of image output devices are installed, and more intuitively determine (recognize) the arrangement of the plurality of image output devices in a convenient manner.

Hereinafter, the method for controlling the plurality of image output devices based on the recognition of the arrangement of the plurality of image output devices will be described in more detail with reference to the accompanying drawings. FIGS. 18A, 18B, 18C and 18D are conceptual views illustrating a method of outputting one content on a plurality of image output devices in a dividing manner using a mobile terminal.

The mobile terminal 100 of the present invention may control the plurality of image output devices 200 to output one content 810 thereon in a dividing manner. In detail, the controller 180 may control the plurality of image output devices 200 to output one content 810 thereon in the dividing manner based on the arrangement of the plurality of image output devices 200.

The display unit 151 of the mobile terminal 100 may output an icon 710 linked with a content output function. For example, the icon 710 may be output, in response to the recognition of the images 300a and 300b corresponding to the plurality of image output devices 200a and 200b in the preview image 310. As another example, the icon 710 may be output, in response to the output of the preview image 310, or in response to a preset touch being applied to the images 300 corresponding to the plurality of image output devices included in the preview image 310. For example, the preset touch may be a long touch applied to an output area of the preview image 310, or may be a long touch or multi-touch applied to at least one of the image 300a and 300b corresponding to the plurality of image output devices included in the preview image 310.

Figure 18A:
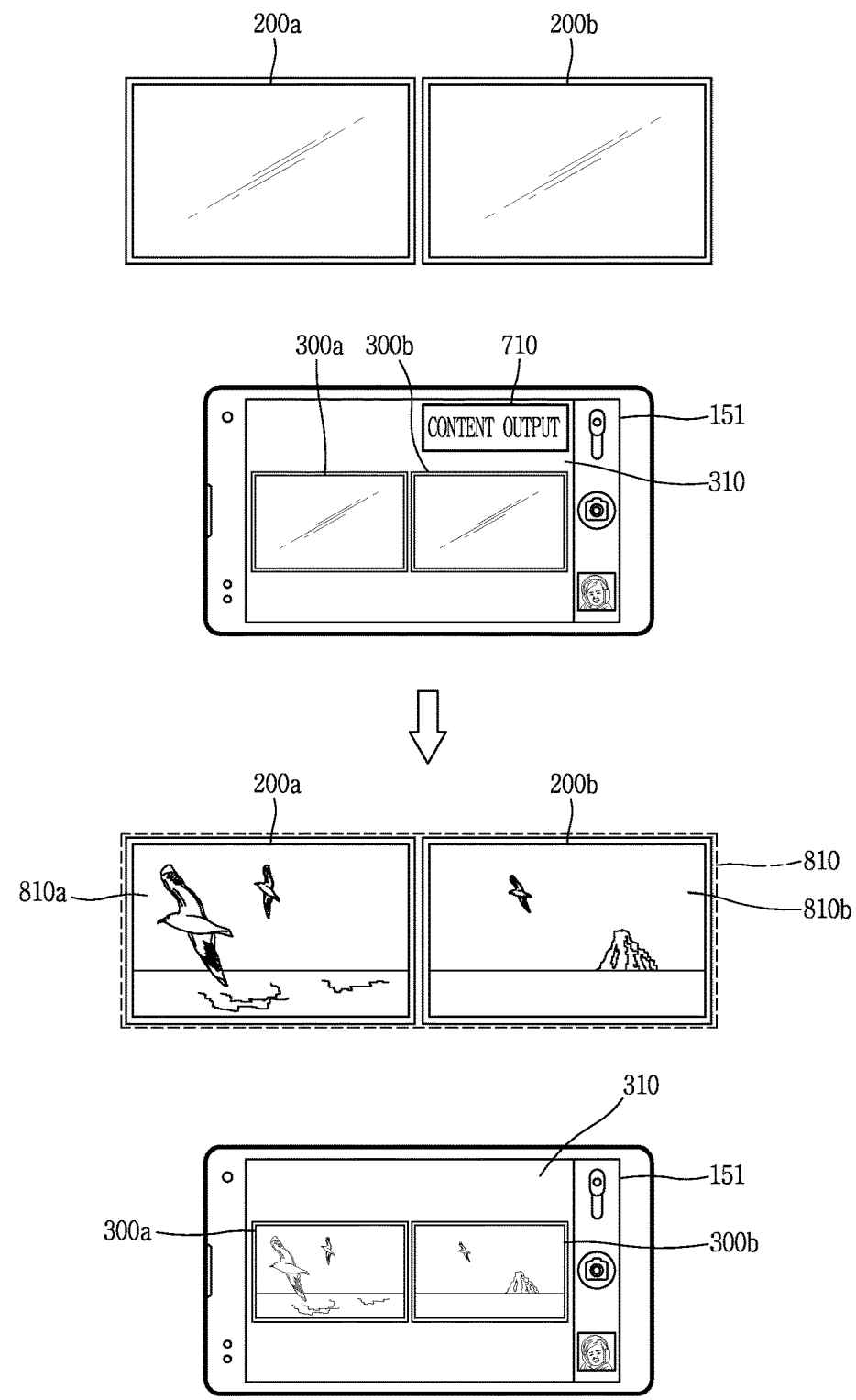
FIGS. 18A, 18B, 18C and 18D are conceptual views illustrating a method of outputting one content on a plurality of image output devices in a dividing manner using a mobile terminal.

As illustrated in a first drawing of FIG. 18A, when a touch is applied to the icon 710 linked with the content output function (when the icon 710 is selected), the one content 810, as illustrated in a second diagram of FIG. 18A, may be output on the plurality of image output devices 200a and 200b in the dividing manner.

Although not illustrated, the controller 180 of the mobile terminal may select at least one image output device to output one content in a dividing manner, in response to a preset touch being applied to the images 300a and 300b corresponding to the image output devices 200a and 200b included in the preview image 310 output on the display unit 151 of the mobile terminal 100. For example, in a state where images corresponding to four image output devices are output on the preview image 310, when a preset touch is applied images corresponding to two of the four image output devices (for example, a multi-touch simultaneously applied to the images corresponding to the two image output devices), the controller 180 may select the image output devices corresponding to the touch-applied images and output the one content on the selected image output devices in the dividing manner.

Hereinafter, a method of outputting the one content 810 on the plurality of image output devices 200a and 200b in the dividing manner will be described in more detail.

Figure 18B:
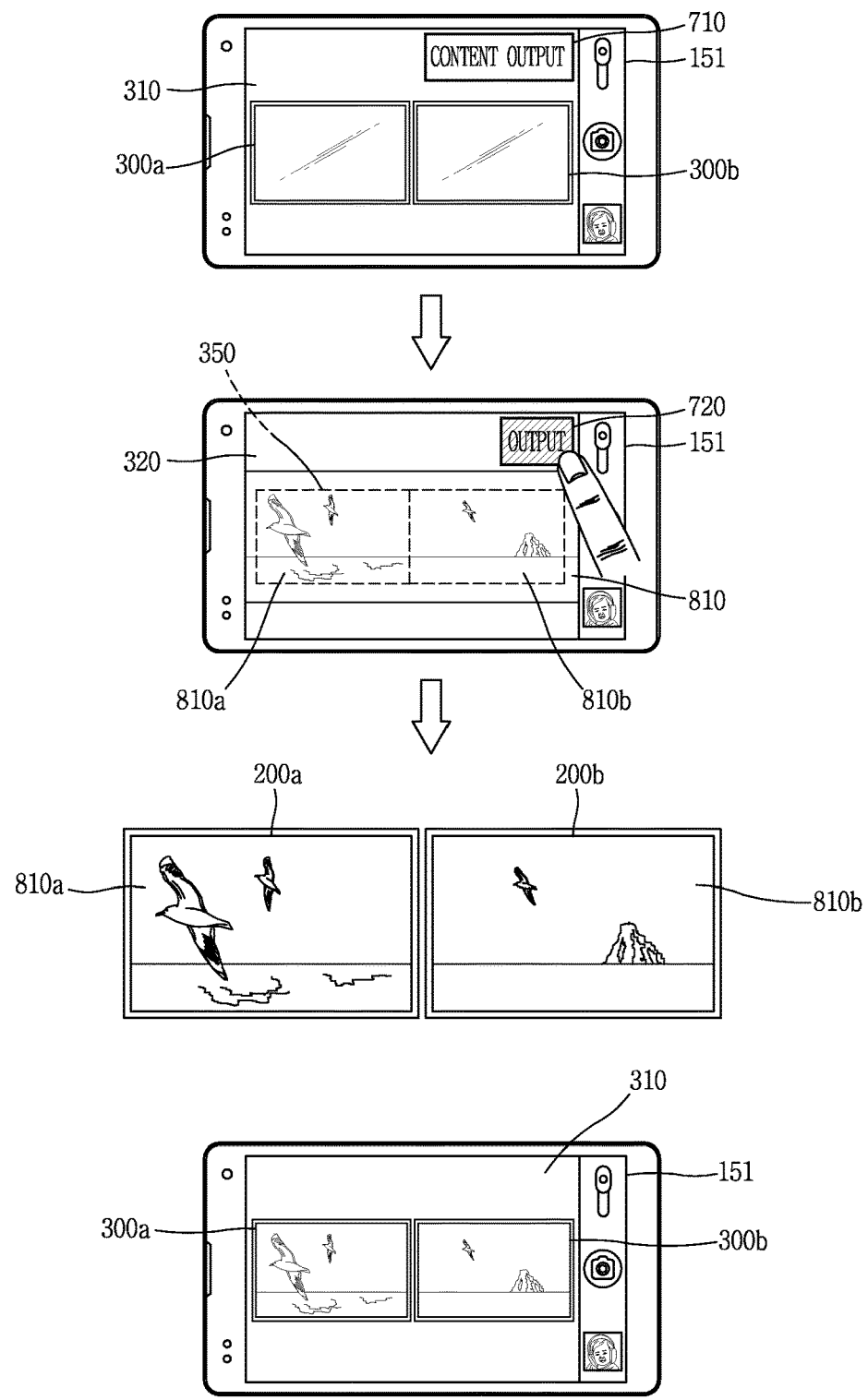

As illustrated in a first drawing of FIG. 18B, the display unit 151 of the mobile terminal 100 may output the icon 710 linked with the content output function. As described above, the icon 710 may be output when the preview image 310 is output, the images 300a and 300b corresponding to the plurality of image output devices are recognized in the preview image 310, at least one of the images 300a and 300b corresponding to the plurality of image output devices is selected or a preset touch is applied to the preview image 310.

When a touch is applied to the icon 710, the controller 180 may allow the user to select one content to be output on the plurality of image output devices 200 in a dividing manner. When the one content is selected, the controller 180 may output a screen 320 for selecting portions of the content to be output on the plurality of image output devices 200, as illustrated in a second drawing of FIG. 18B.

Specifically, the controller 180 may output the screen for selecting the portions of the content to be output on the plurality of image output devices, instead of the preview image 310, in response to a touch being applied to the icon 710 output on the display unit 151 in the state that the preview image 310 is output.

The screen 320 may output thereon the one content 810, guide lines 350 corresponding to the images 300a and 300b of the plurality of image output devices, and an output icon 720. Here, the one content 810 may include all kinds of data 720 that can be output on at least one of the mobile terminal and the image output devices. For example, the one content 810 may be an image, a video, a web page, or the like.

When the content 810 is a video, a still image corresponding to one point of the video may be displayed on the screen 320. On the other hand, without being subjected to this, the controller 180 may set portions output on the plurality of image output devices even while the video is reproduced on the screen 320.

The guide lines 350 may be formed to correspond to the images 300a and 300b corresponding to the plurality of image output devices included in the preview image 310. In detail, the guide lines 350 may be formed to correspond to the images 300a and 300b of the plurality of image output devices included in the preview image 310 immediately before the icon 710 linked with the content output function is selected.

As another example, when an image corresponding to at least one image output device of the images 300a and 300b corresponding to the plurality of image output devices is selected, the controller 180 may output the guide lines 350 corresponding to the selected image on the screen 320.

The controller 180 may move the content 810 or enlarge or reduce the size of the content 810, in response to a preset touch being applied to the content 810 output on the display unit 151. For example, the controller 180 may move the content 180, in response to a drag touch which starts from one point of an output area of the content 810. In addition, the controller 180 may reduce the content 810 based on a pinch-in touch applied to the output area of the content 810, or may be enlarged based on a pinch-out touch or a double tap touch applied to the output area of the content 810.

Meanwhile, the controller 180 may change a size of the guide line 350 based on a preset touch applied to the guide line 350. For example, the size of the guide line 350 may be varied based on a drag touch that starts from the guide line 350. Even if the size of the guide line 350 is varied, a size ratio of the guide line 350 may be maintained.

The controller 180 may decide portions 810a and 810b of the one content 810, which are output on each of the image output devices based on the images 300a and 300b corresponding to the image output devices included in the preview image 310. Specifically, the controller 180 may decide (set) the portions 810a and 810b of the one content 810, which are output on each of the image output devices 200a and 200b, using the guide lines 350 corresponding to the images 300a and 300b of the image output devices included in the preview image 310.

As illustrated in a second drawing of FIG. 18B, the controller 180 may set a content corresponding to the guide line 350, which corresponds to the image 300a of the first image output device of the guide lines 350, as the portion 810a of the one content to be output on the first image output device. Similar to this, the controller 180 may set a content corresponding to the guide line 350, which corresponds to the image 300b of the second image output device of the guide lines 350, as the portion 810b of the one content to be output on the second image output device.

Subsequently, the controller 180 may control the plurality of image output devices 200a and 200b to output the portions 810a and 810b of the one content, respectively, in response to a touch being applied to the output icon 720 which is output on the display unit 151.

As illustrated in the second drawing of FIG. 18B, the different portions 810a and 810b of the one content 810 may be output on the plurality of image output devices 200a and 200b, respectively. For example, the first image output device 200a may output the first portion 810a of the content corresponding to the guide line 350, which corresponds to the image 300a of the first image output device, of the guide lines 350 which are output on the mobile terminal. Similar to this, the second image output device 200a may output the second portion 810b different from the first portion 810a of the one content 810, which corresponds to the guide line 350 corresponding to the image 300b of the second image output device, of the guide lines 350 which are output on the mobile terminal.

The controller 180 may control the plurality of image output devices 200a and 200b to output the one content 810 thereon in the dividing manner. Specifically, the controller 180 may control the plurality of image output devices 200a and 200b to output the different portions of the content, respectively. For example, the controller 180 may transmit only the content corresponding to the first portion 810a of the one content to the first image output device 200a, and only the content corresponding to the second portion 810b of the one content 810 to the second output device 200b. As another example, the controller 180 may transmit the one content 810 to each of the plurality of image output devices 200a and 200b. The controller 180 may then transmit information related to the first portion 810a to the first image output device 200a and information related to the second portion 810b to the second image output device 200b, respectively. At this time, the first image output device 200a may output only the content corresponding to the first portion 810a of the one content 810 based on the information related to the first portion 810a. Similar to this, the second image output device 200b may output only the content corresponding to the second portion 810b of the one content 810 based on the information related to the second portion 810b.

When the corresponding content 810 is stored in the plurality of image output devices, the controller 180 of the mobile terminal 100 may transmit the information related to the first portion 810a to the first image output device 200a, and transmit the information related to the second portion 810b to the second image output device 200b.

On the other hand, the different portions 810a and 810b of the one content 810 may be output on the plurality of image output devices 200a and 200b, respectively, and the portions output on the plurality of image output devices may differ according to the arrangement of the plurality of image output devices 200a and 200b.

Figure 18C:
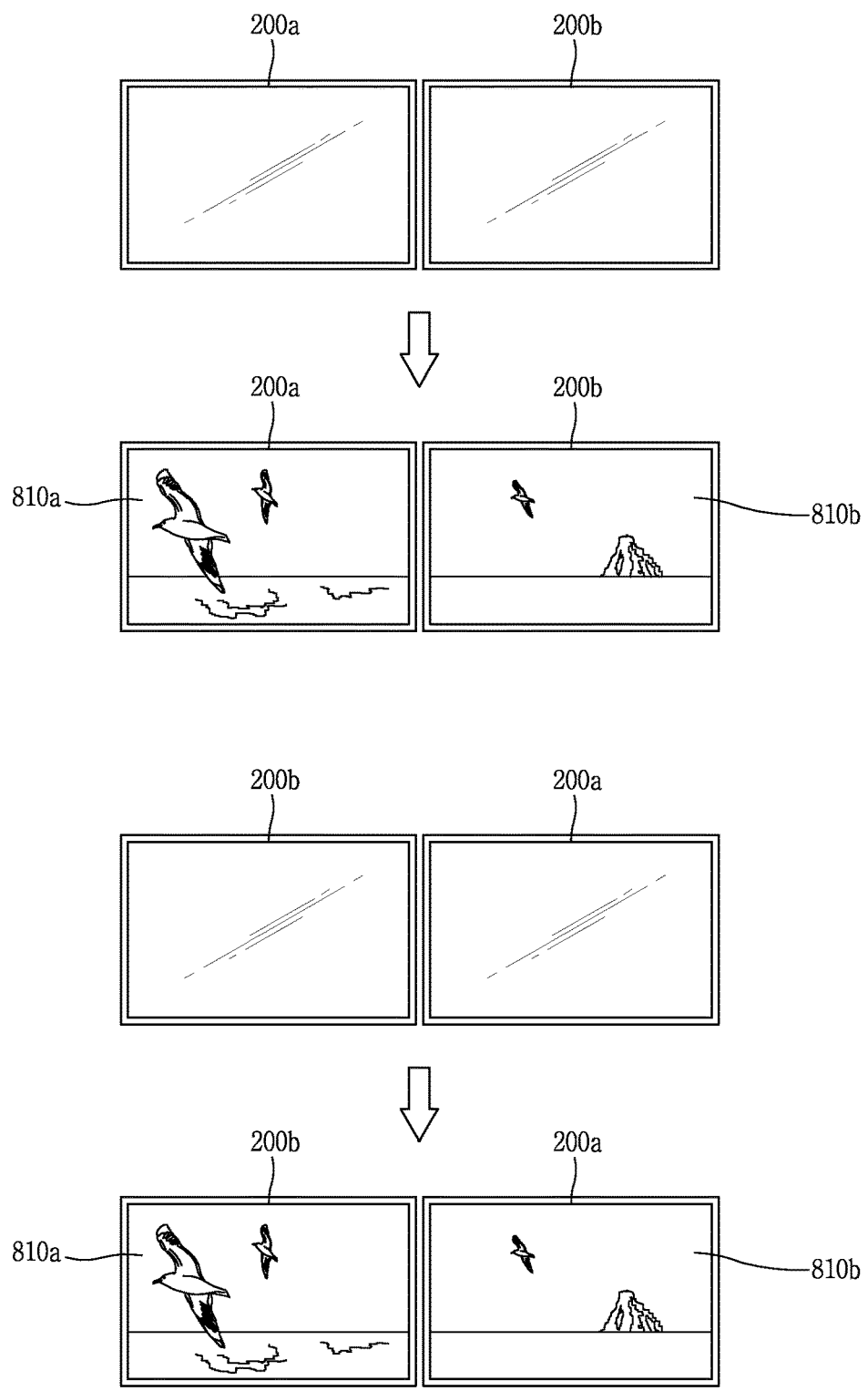

For example, as illustrated in a first drawing of FIG. 18C, when one (e.g., 200a) of the plurality of image output devices 200a and 200b is arranged at a first position, the one image output device 200a may output thereon the first portion 810a of the one content 810 based on the first position. On the other hand, when the one image output device 200a is arranged at a second position different from the first position, as illustrated in a second drawing of FIG. 18C, the one image output device 200a may output thereon the second portion 810b different from the first portion 810a of the one content 180 based on the second position.

In other words, when the first image output device 200a is located at a left side of the second image output device 200b, the first portion 810a of the one content 810 may be output on the first image output device 200a and the second portion 810b of the one content 810 may be output on the second image output device 200b. On the other hand, when the first image output device 200a is located at a right side of the second image output device 200b, the second portion 810b of the one content 810 may be output on the first image output device 200a and the first portion 810a of the one content 180 may be output one the second image output device 200b.

Meanwhile, when the plurality of image output devices 200a and 200b have the same screen size, the sizes of the portions 810a and 810b of the one content 810 output on each of the image output devices may vary depending on the relative arrangement of the plurality of image output devices.

In detail, when the first image output device 200a of the plurality of image output devices 200a and 200b is arranged closer to the mobile terminal 100 than the second image output device 200b different from the first image output device 200b, the size of the portion 810a output on the first image output device 200a may be larger than the size of the portion 810b output on the second image output device 200b.

Figure 18D:
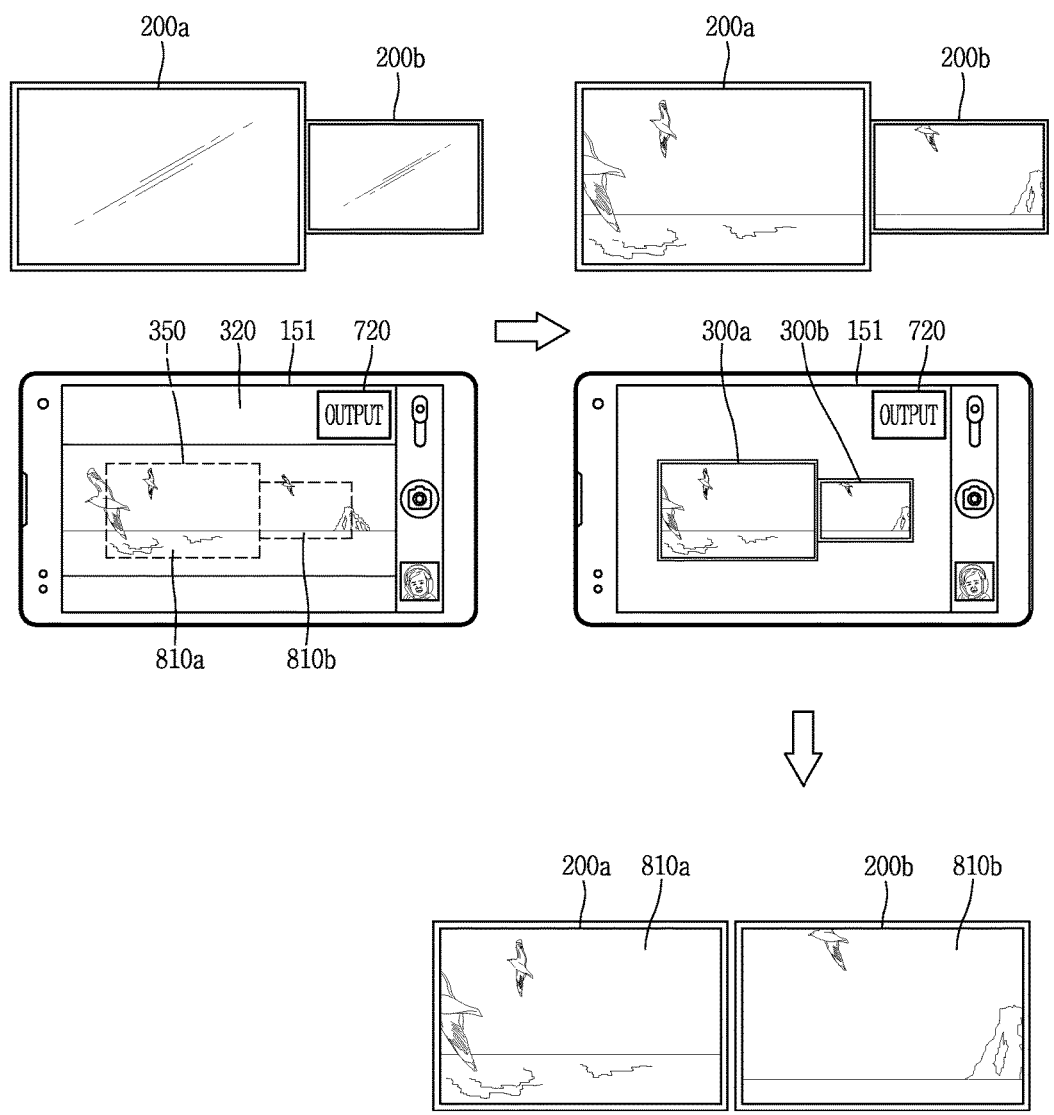

As illustrated in a first drawing of FIG. 18D, the display unit 151 of the mobile terminal 100 may output the screen 320 for selecting the portions (regions) of the one content, which are to be output on the plurality of image output devices 200a and 200b, respectively. The screen 320 may output the guide lines 350 corresponding to the images 300a and 300b of the plurality of image output devices, the one content 810, and the output icon 720.

The guide lines 350 may be output to correspond to the images 300a and 300b of the plurality of image output devices included in the preview image 310. That is, when the first image output device 200a is arranged closer to the mobile terminal 100 than the second image output device 200b, the image 300a corresponding to the first image output device included in the preview image 310 may be larger than the image 300b corresponding to the second image output device. The guide lines 350 may be output to correspond to the images 300a and 300b.

Afterwards, when a touch is applied to the output icon 720 output on the display unit 151, the controller 180 may control the plurality of image output devices 200a and 200b, such that the first portion 810a of the one content 810 is output on the first image output device 200a, and the second portion 810b smaller than the first portion 810a of the one content 810 is output on the second image output device 200b.

As illustrated in a third drawing of FIG. 18D, the first and second image output devices 200a and 200b may output the portions of the one content having the different sizes according to the relative arrangement of the first and second image output devices. That is, even though the first and second image output devices 200a and 200b have the same screen size, when the first image output device 200a is arranged closer to the mobile terminal 100 than the second image output device 200b, the portion 810a that is larger than the portion 810b of the one content output on the second image output device may be output on the first image output device 200b.

In other words, the portion 810b of the one content 810 that is smaller than the portion 810a output on the first image output device 200a may be output on the second image output device 200b.

Meanwhile, although not illustrated, the controller 180 of the mobile terminal may output a different content on each image output device. For example, when a first content is selected after the image 300a corresponding to the first image output device 200a is selected from the images 300a and 300b corresponding to the plurality of image output devices 200a and 200b included in the preview image 310, the controller 180 may output the first content on the first image output device 200a. Also, when a second content different from the first content is selected after the image 300b corresponding to the second image output device 200b is selected from the images 300a and 300b corresponding to the plurality of image output devices 200a and 200b, the second content may be output on the second image output device 200b.

Here, as illustrated in FIGS. 18B and 18D, when one of the first and second contents is selected, the controller 180 may output the screen 320 for selecting an area in which the selected content is to be output, and may select (set) a size (region) of a content output on each image output device by applying the configurations illustrated in FIGS. 18B and 18D in the same/like manner.

Although not illustrated, the above description may be applied in the same/like manner even when at least one of the plurality of image output devices is arranged horizontally or vertically or in an inclined manner. The foregoing description also applies to a case where one side of at least one of the plurality of image output devices is disposed closer or farther than another side of the mobile terminal based on the mobile terminal.

With this configuration, the present invention can output one content on a plurality of image output devices in a dividing manner, and decide sizes, shapes, positions and the like of portions of the one content to be output on the plurality of image output devices according to arrangement, relative arrangement, and postures of the plurality of image output devices. Therefore, the present invention can provide a user interface capable of outputting the one content through the plurality of image output devices without a sense of difference from a user's position (position of the mobile terminal).

Hereinafter, a method of synchronizing a plurality of image output devices using images corresponding to the plurality of image output devices included in a preview image will be described in more detail with reference to the accompanying drawings. FIGS. 19A, 19B, 19C and 19D are conceptual views illustrating a method of synchronizing a plurality of image output devices using a mobile terminal.

When a touch is applied to any one of the images 300a to 300b corresponding to the plurality of image output devices included in the preview image 310, the controller 180 of the mobile terminal may synchronize the plurality of image output devices 200a to 200d based on the image output device 200b corresponding to the touch-applied image 300b. The synchronized category may include at least one of streaming, image quality, and volume.

In the present invention, streaming may refer to a video (or music) reproduction time point. In detail, when one video is reproduced on the plurality of image output devices 200 disclosed herein, the reproduction time point of the video reproduced on each of the image output devices 200 may be referred to as streaming. Synchronizing the streaming may be understood to match time points of reproducing the video on the plurality of image output devices.

Figure 19A:
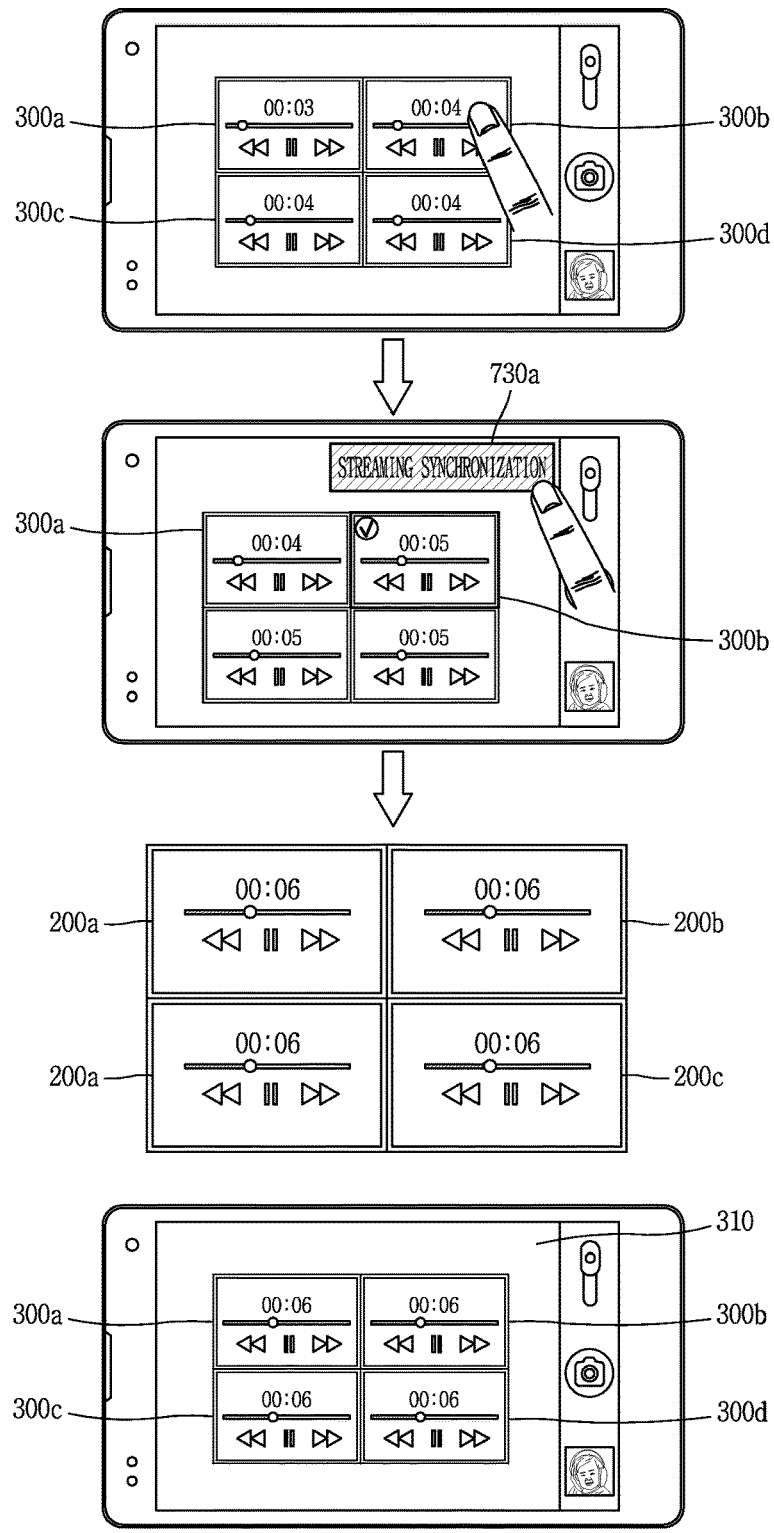
FIGS. 19A, 19B, 19C and 19D are conceptual views illustrating a method of synchronizing a plurality of image output devices using a mobile terminal.

As illustrated in a first drawing of FIG. 19A, one video may be reproduced (output) on the plurality of image output devices 200a to 200d in a dividing manner. When the one video is reproduced on the plurality of image output devices 200a to 200d in the dividing manner, as illustrated in the first drawing of FIG. 19A, the reproduction time point of the video reproduced on at least one (e.g., 200a) of the plurality of image output devices 200a to 200d may be different from the other of the image output devices 200b to 200d.

When the arrangement of the plurality of image output devices 200a to 200d is recognized, the controller 180 may set the image output device 200b corresponding to a touch-applied image 300b as a reference image output device, in response to the touch being applied to the one image 300b of the images 300a to 300d corresponding to the plurality of image output devices 200a to 200d included in the preview image.

Also, the controller 180, as illustrated in a second drawing of FIG. 19A, may output an icon 730a linked with a streaming synchronization function on the display unit 151, in response to a touch being applied to the one image 300b of the images 300a to 300d corresponding to the plurality of image output devices.

Also, an indicator indicating the reference image output device, as illustrated in the second drawing of FIG. 19A, may be output on the touch-applied image 300b corresponding to the reference image output device among the images 300a to 300d corresponding to the plurality of image output devices included in the preview image. In detail, when one image 300b of the images 300a to 300d corresponding to the plurality of image output devices included in the preview image 310 is selected, the controller 180 may overlap the indicator indicating the selection of the image 300b with the preview image 310.

Afterwards, when a touch is applied to the streaming synchronization button 730a, the controller 180 may synchronize the video reproduction time points of the plurality of image output devices 200a to 200d based on the video reproduction time point of the reference image output device 200b corresponding to the selected image 300b.

Also, the controller 180 may adjust image qualities of the plurality of image output devices 200a to 200d by using the images 300a to 300d corresponding to the plurality of image output devices included in the preview image.

Figure 19B:
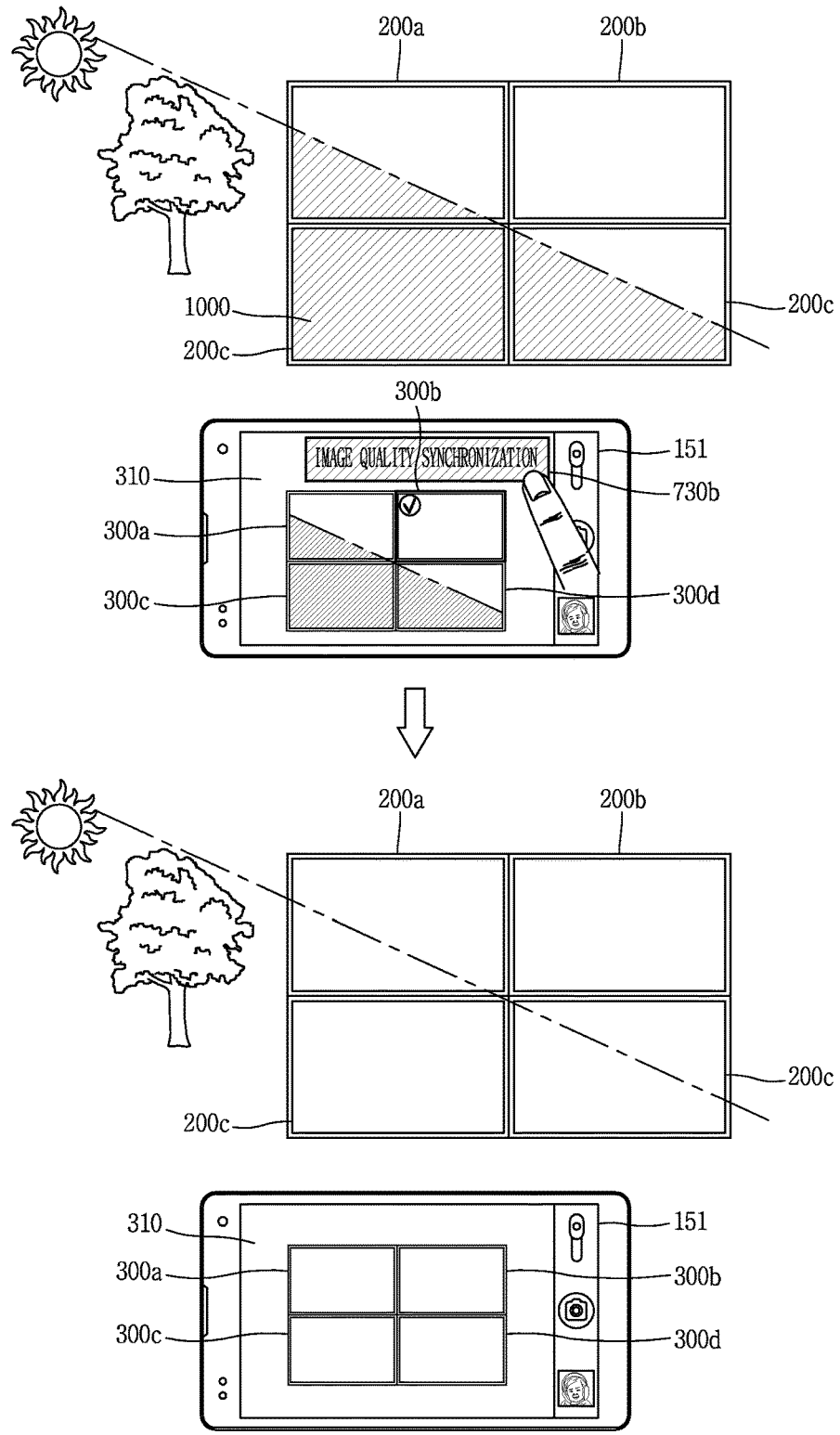

As illustrated in FIG. 19B, even though the plurality of image output devices 200a to 200d have the same setting value, the plurality of image output devices may have different image qualities due to an external environment. For example, the external environment 1000 may be shadow, lighting, or the like. On the other hand, the image qualities of the plurality of image output devices 200a to 200d may differ due to different setting values set for each image output device, or due to a difference of characteristics of product components even though the respective image output devices have set to the same setting value. In this case, the user may feel that the plurality of image output devices 200 have different image qualities.

In this case, the present invention may synchronize the image qualities of the plurality of image output devices 200 based on image qualities of the plurality of image output devices extracted by the mobile terminal 100.

For example, as illustrated in a first drawing of FIG. 19B, the plurality of image output devices 200a to 200d may have different image qualities when viewed from a position of an external entry (mobile terminal). In this case, when a touch is applied to any one of the images 300a to 300d corresponding to the plurality of image output devices 200a to 200d included in the preview image, the controller 180 may output an icon 730b linked with an image quality synchronization function.

Also, the controller 180 may set the image output device 200b corresponding to the touch-applied images 300b as a reference image output device.

Afterwards, the controller 180 may extract image quality information related to each of the plurality of image output devices using the images 300a to 300d corresponding to the plurality of image output devices included in the preview image 310.

The extracted image quality information may include at least one of backlight brightness, contrast, a color, brightness, chroma (hue), saturation, luminance, sharpness, tint, white balance, color temperature, RGB pixel values, and the like.

Then, when a touch is applied to the icon 730b linked with the image quality synchronization function, the controller 180 may adjust the image qualities of the plurality of image output devices 200a to 200d based on the image quality information extracted from the touched image 300b.

For example, as illustrated in a first drawing of FIG. 19B, in a state where the image qualities of the first to fourth image output devices 200a to 200d are different from one another, when the image 300b corresponding to the second image output device 200b is selected, the controller 180 may adjust the image qualities of the other image output devices 200a, 200c and 200d each having image quality information, which is different from image quality information extracted from the image 300b corresponding to the second image output device 200b, based on the extracted image quality information.

At this time, the controller 180 may transmit correction data which is generated based on the image quality information, which is extracted from each of the images 300a to 300d corresponding to the plurality of image output devices, to the image output devices 200a, 200b and 200d corresponding to image quality adjustment targets. The correction data may be the image quality information itself extracted from the image corresponding to each image output device, or an image quality difference value (e.g., a brightness difference value or a color temperature difference value) between the image quality information related to the image 300b corresponding to the reference image output device and the image quality information related to each of the images 300a, 300c and 300d corresponding to the image output devices.

The image output devices 200a, 200c and 200d that have received the correction data from the mobile terminal among the plurality of image output devices 200a to 200d may adjust the image qualities thereof based on the correction data.

At this time, as illustrated in a second drawing of FIG. 19B, when only portions of the first and fourth image output devices 200a and 200d have different image qualities from that of the reference image output device 200b, information related to the portions having the different image qualities may be included in the correction data.

The first and fourth image output devices 200a and 200d may adjust the image qualities of only the portions based on the information related to the portions having the different image qualities.

With this configuration, the present invention can control a plurality of image output devices to have the same image quality on the basis of the mobile terminal (or the user), so that the plurality of image output devices can output contents to the user without a sense of difference.

Meanwhile, when one (300a) of the images 300a and 300b corresponding to the plurality of image output devices included in the preview image 310 is selected, a button 730c linked with a volume synchronization function may be output.

Figure 19C:
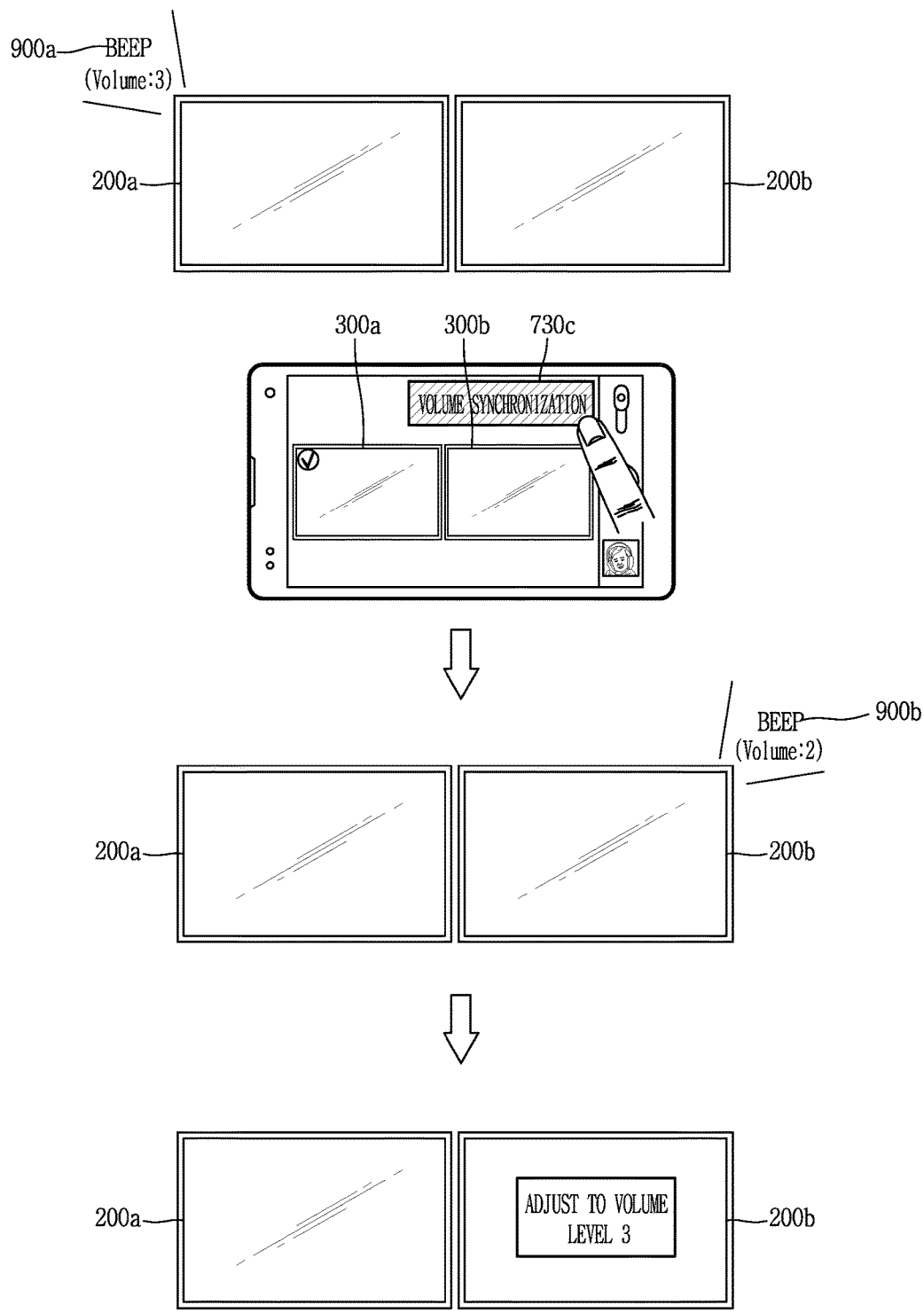

Afterwards, as illustrated in a first drawing of FIG. 19C, when the icon 730c linked with the volume synchronization function is selected, the controller 180 may request the plurality of image output devices 200a and 200b to output a preset sound (e.g., test sound). At this time, after requesting the first image output device 200a of the plurality of image output devices to output the preset sound, the controller 180 may request the second image output device 200b different from the first image output device 200a to output the preset sound. That is, the controller 180 may request the plurality of image output devices 200a and 200b to output the preset sound in a sequential manner other than a simultaneously manner. In this instance, the sequence of outputting the preset sound among the plurality of image output devices may be decided based on the arrangement of the plurality of image output devices.

As illustrated in a first drawing of FIG. 19C, when a preset sound 900a is output from the first image output device 200a based on a selection of the icon 730c linked with the volume synchronization function, the controller 180 may detect the output sound and determine a volume (e.g., volume: 3) of the first image output device 200a based on the detected sound.

Afterwards, as illustrated in a second drawing of FIG. 19C, after the preset sound 900a is output from the first image output device of the plurality of image output devices, when a preset sound 900a is output from the second image output device 200b different from the first image output device, the controller 180 may detect the output sound and determine a volume (e.g., volume: 2) of the second image output device 200b based on the detected sound.

Afterwards, the controller 180 may perform the volume synchronization on the basis of a volume of a reference image output device 200a among the plurality of image output devices 200a and 200b, according to the volumes of the first and second image output devices. The reference image output device 200a may be an image output device 200a corresponding to an image to which a touch is applied among the images corresponding to the plurality of image output devices included in the preview image.

In detail, the controller 180 may adjust the volume of the remaining image output device 200b excluding the reference image output device among the plurality of image output devices so as to be the same as the volume of the reference image output device 200a. For example, as illustrated in a third drawing of FIG. 19C, the controller 180 may adjust the volume of the second image output device to a volume level 3 (volume: 3).

On the other hand, when the synchronized category is volume, the controller 180 may control the plurality of image output devices so as to output sounds with different volumes based on the relative arrangement of the plurality of image output devices.

Figure 19D:
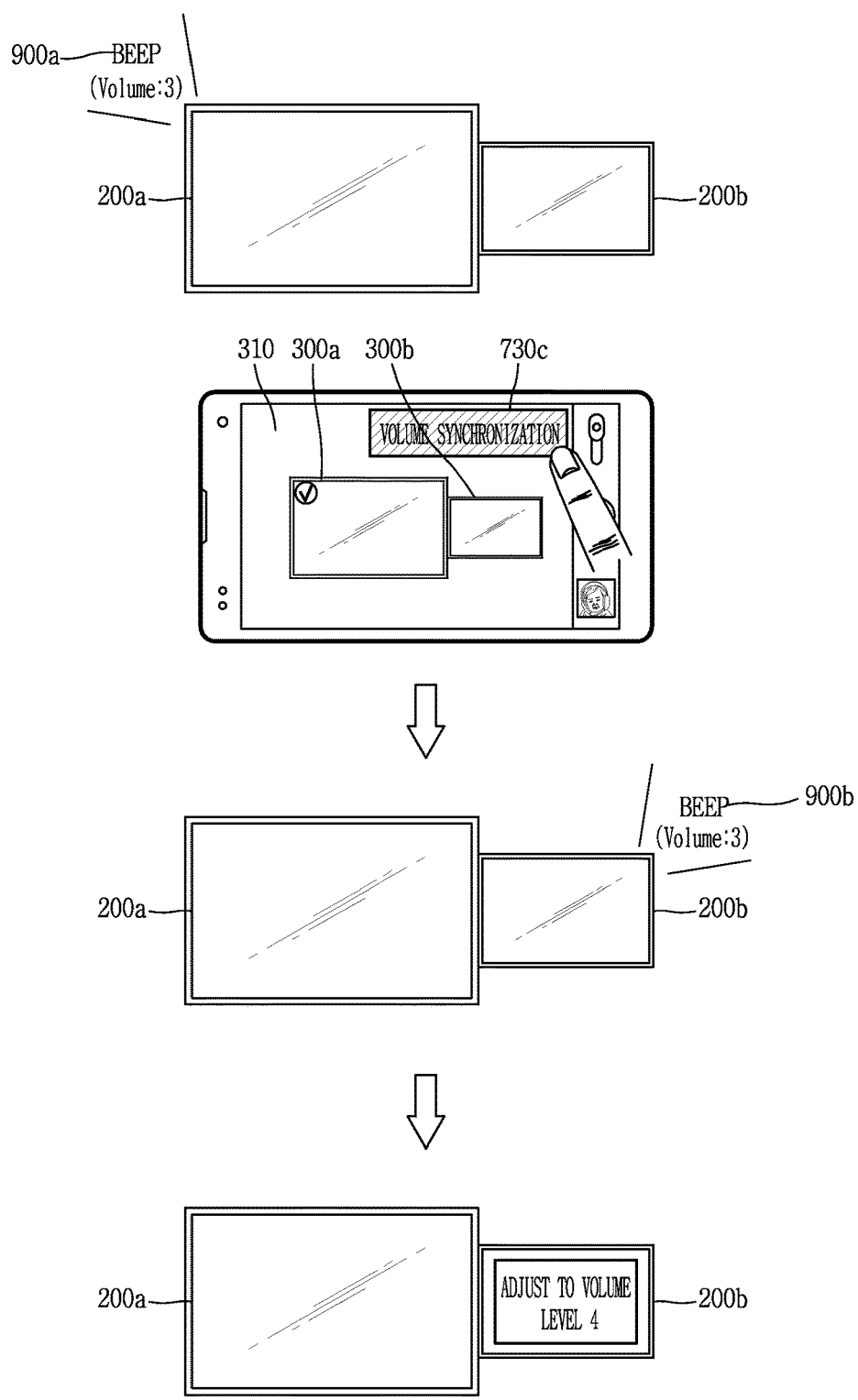

For example, as illustrated in a first drawing of FIG. 19D, the plurality of image output devices 200a and 200b may be arranged to have different distances with respect to the mobile terminal. Here, FIG. 19D exemplarily illustrates that the first image output device 200a is arranged closer to the mobile terminal 100 than the second image output device 200b.

As illustrated in a first drawing of FIG. 19C, when a touch is applied to the icon 730c linked with the volume synchronization function in the state that the reference image output device 200a is selected, the controller 180 may control the plurality of image output devices 200a and 200b to output the preset sounds 900a and 900b in a sequential manner. Here, the first and second image output devices may be all set to output sounds with the same volume level (for example, volume: 3).

However, the mobile terminal 100 may detect that the volume of the first image output device is higher than the volume of the second image output device. This is because the first image output device is disposed closer to the mobile terminal than the second image output device.

In this case, the controller 180 may adjust the volume of the image output device 200b which is different from the volume of the reference image output device 200a among the plurality of image output devices, on the basis of the detected volume level. That is, even if the same volume output value (for example, volume: 3) is set for the first and second image output devices 200a and 200b, the controller 180 may synchronize the plurality of image output devices based on the volume level detected by the mobile terminal.

Therefore, even if the volumes of the plurality of image output devices have the same volume output value, the controller 180 can increase a volume of an image output device 200b arranged at a relatively farther position than the reference image output device 200a, and reduce a volume of an image output device disposed at a relatively closer position.

On the other hand, the controller 180 may adjust the volumes of the plurality of image output devices in various ways based on the relative arrangement of the plurality of image output devices. For example, when the plurality of image output devices are arranged in a 3×3 configuration, even if the plurality of image output devices have the same volume output value, a volume level (volume output value) detected from an image output device arranged at a center may be lower than a volume level detected from another image output device. In this case, the controller 180 may increase the volume of the image output device arranged at the center.

Meanwhile, the controller 180 may control the volumes of the plurality of image output devices based on sound quality setting. Specifically, the controller 180 may increase a volume of an image output device, which is arranged at an outer region among the plurality of image output devices, and reduce a volume of an image output device, which is arranged at an inner region, in order to output sounds output from the plurality of image output devices with stereo sound qualities. That is, the controller 180 may control the volumes of the plurality of image output devices in various ways based on the sound quality setting, and the volume control method of the plurality of image output devices according to the sound quality setting may be decided by user setting.

In the foregoing description, the icon 730a linked with the streaming synchronization function, the icon 730b linked with the image quality synchronization function, and the icon 730c linked with the volume synchronization function are output one by one for convenience of explanation. However, the icons 730a to 730c may be output in a simultaneous manner or a selective manner according to user setting, in response to a preset touch being applied to the preview image 310 (e.g., a touch applied to one of the images corresponding to the plurality of image output devices).

In addition, the icons 730a to 730c may be selectively output based on a method of applying a touch to the preview image 310. For example, the controller 180 may output the icon 730a linked with the streaming synchronization function when a first touch is applied to the preview image 310, and output the icon 730a linked with the image quality synchronization function when a second touch different from the first touch is applied to the preview image 310. The first and second touches may employ the various touch methods described above, and a type of icon that is output according to the touch method may be decided by a user setting.

The operations of the image output device 200 described above may be understood to be performed by the controller 250 of the image output device 200. When a plurality of image output devices are connected to a control device and controlled by the control device (for example, when the image output device corresponds to a monitor and the control device is connected to a main body (a computer (PC) or a server), the configurations described above for the image output device may be understood to be performed by a controller (for example, a processor) provided in the control device (e.g., the computer (PC) or the server). That is, the aforementioned structure of the image output device may be applied in the same/like manner to a case where the controller provided in the control device controls the plurality of image output devices connected to the control device.

As described above, the present invention can recognize an arrangement of a plurality of image output devices using images corresponding to the plurality of image output devices included in a preview image received through a camera. In addition, the present invention can determine a number and positions of the plurality of image output devices using images corresponding to different identification information included in the images corresponding to the plurality of image output devices. Also, the present invention can determine relative arrangement and postures of the plurality of image output devices using images corresponding to screen information including preset grid patterns included in the images corresponding to the plurality of image output devices. Therefore, the present invention can solve the related art burdens of having to set the number, the arranged positions, the relative arrangement and the arranged postures of the image output devices one by one in order to control the plurality of image output devices.

Also, the present invention can control the plurality of image output devices to output one content in a dividing manner. At this time, the present invention can set portions of the one content to be output on each of the plurality of image output devices by using the images corresponding to the plurality of image output devices included in the preview image of the mobile terminal. Therefore, the present invention can provide a Graphic User Interface (GUI) optimized for outputting the content on the plurality of image output devices.

The present invention can also select one reference image output device using the images corresponding to the plurality of image output devices included in the preview image of the mobile terminal, and synchronize the plurality of image output devices based on the reference image output device. Therefore, the present invention can solve the related art burdens which have been caused due to an individual synchronization of each image output device, and also perform more optimized synchronization based on the mobile terminal, namely, a user.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method for controlling a mobile terminal to control a plurality of image output devices, the method comprising:
   requesting each of the plurality of image output devices to output different identification information;
   recognizing an arrangement of the plurality of image output devices using images corresponding to the different identification information included in a preview image received through a camera while the different identification information is output on each of the plurality of image output devices; and
   controlling the plurality of image output devices using images corresponding to the plurality of image output devices included in the preview image, when the arrangement of the plurality of image output devices is recognized,
   wherein the plurality of image output devices includes a first image output device and a second image output device, the first image output device is arranged closer to the mobile terminal than the second image output device, and the first and the second image output devices are set to output sounds at a same output volume level,
   the method further comprising controlling the plurality of image output devices to output sounds at different output volume levels when the plurality of image output devices are arranged at different distances from the mobile terminal,
   wherein controlling the plurality of image output devices to output sounds at different output volume levels comprises increasing the output volume of the second image output device and decreasing the output volume of the first image output device when a volume of output sound from the first image output device received at the mobile terminal is higher than a volume of output sound from the second image output device received at the mobile terminal.

2. The method of claim 1, wherein the recognizing the arrangement of the plurality of image output devices comprises:
   identifying a number and positions of the plurality of image output devices using the images corresponding to the different identification information included in the preview image;
   requesting each of the plurality of image output devices to output screen information including a preset grid pattern; and
   recognizing a relative arrangement of the plurality of image output devices using the images corresponding to the screen information included in the preview image when the screen information is output on each of the plurality of image output devices.

3. The method of claim 2, wherein the relative arrangement of the plurality of image output devices is recognized based on a size of the grid pattern included in the image corresponding to each of the plurality of image output devices included in the preview image.

4. The method of claim 3, wherein the recognizing the relative arrangement of the plurality of image output devices is configured to recognize that a first image output device is arranged at a closer position to the mobile terminal than a second image output device different from the first image output device, when a size of the grid pattern included in an image corresponding to the first image output device, among the grid patterns included in the images corresponding to the plurality of image output devices included in the preview image, is greater than a size of the grid pattern included in an image corresponding to the second output device.

5. The method of claim 2, wherein the recognizing the arrangement of the plurality of image output devices further comprises determining postures of the plurality of image output devices using the images corresponding to the screen information included in the preview image.

6. The method of claim 2, wherein the identification information is outputtable together with the screen information including the preset grid pattern.

7. The method of claim 1, wherein the controlling is configured to control the plurality of image output devices to output one content thereon in a dividing manner based on the arrangement of the plurality of image output devices.

8. The method of claim 7, wherein the controlling is configured to decide portions of the one content output on each of the image output devices based on the images corresponding to the plurality of image output devices included in the preview image.

9. The method of claim 7, wherein the plurality of image output devices output different portions of the one content, and
   wherein the portions output on each of the plurality of image output devices differ according to the arrangement of the plurality of image output devices.

10. The method of claim 9, wherein one of the plurality of image output devices outputs a first portion of the one content based on a first position when the one image output device is arranged at the first position, and
    wherein the one image output device outputs a second portion of the one content, different from the first portion, based on a second position when the one image output device is arranged at the second position different from the first position.

11. The method of claim 7, wherein sizes of the portions of the one content, output on each of the plurality of image output devices, differ according to the relative arrangement of the plurality of image output devices, when the plurality of image output devices have the same screen size.

12. The method of claim 11, wherein the size of the portion output on the first image output device of the plurality of image output devices is greater than the size of the portion output on the second image output device, when the first image output device is arranged closer to the mobile terminal than the second image output device.

13. The method of claim 1, wherein the controlling is configured to synchronize the plurality of image output devices based on an image output device corresponding to one of the images corresponding to the plurality of image output devices included in the preview image, when a touch is applied to the one image.

14. The method of claim 13, wherein a synchronized category includes at least one of streaming, image quality and volume.

15. A mobile terminal for controlling a plurality of image output devices, the terminal comprising:
 a camera;
 a display unit configured to output a preview image received through the camera; and
 a controller configured to recognize an arrangement of the plurality of image output devices using images corresponding to different identification information included in the preview image while the different identification information is output on each of the plurality of image output devices, and control the plurality of image output devices using images corresponding to the plurality of image output devices included in the preview image,
 wherein the plurality of image output devices includes a first image output device and a second image output device, the first image output device is arranged closer to the mobile terminal than the second image output device, and the first and the second image output devices are set to output sounds at a same output volume level, and
 wherein the controller is further configured to:
 control the plurality of image output devices to output sounds at different output volume levels when the plurality of image output devices are arranged at different distances from the mobile terminal; and
 wherein controlling the plurality of image output devices to output sounds at different output volume levels comprises increasing the output volume of the second image output device and decreasing the output volume of the first image output device when a volume of output sound from the first image output device received at the mobile terminal is higher than a volume of output sound from the second image output device received at the mobile terminal.

16. The terminal of claim 15, wherein each of the plurality of image output devices outputs screen information including a preset grid pattern based on a user request, and
 wherein the controller recognizes a relative arrangement of the plurality of image output devices using images corresponding to the screen information included in the preview image when the screen information is output on each of the plurality of image output devices.

17. The terminal of claim 15, wherein the controller controls the plurality of image output devices to output one content thereon in a dividing manner, on the basis of the arrangement of the plurality of image output devices.

18. The terminal of claim 17, wherein the controller decides portions of the one content output on each of the plurality of image output devices, on the basis of the images corresponding to the plurality of image output devices included in the preview image.

19. The terminal of claim 15, wherein the controller synchronizes the plurality of image output devices based on an image output device corresponding to one of the images corresponding to the plurality of image output devices included in the preview image, when a touch is applied to the one image.

* * * * *